US012102970B2

(12) United States Patent
Luharuka et al.

(10) Patent No.: US 12,102,970 B2
(45) Date of Patent: Oct. 1, 2024

(54) INTEGRATED PROCESS DELIVERY AT WELLSITE

(71) Applicant: Schlumberger Technology Corporation, Sugar Land, TX (US)

(72) Inventors: Rajesh Luharuka, Katy, TX (US); Hau Nguyen-Phuc Pham, Houston, TX (US); William Troy Huey, San Antonio, TX (US); Nikki Morrison, Houston, TX (US); Christopher Todd Shen, Houston, TX (US); Avinash Ramesh, Houston, TX (US); Garud Bindiganavale Sridhar, Sugar Land, TX (US); Laurent Yves Claude Coquilleau, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 89 days.

(21) Appl. No.: 14/709,798

(22) Filed: May 12, 2015

(65) Prior Publication Data

US 2015/0238914 A1 Aug. 27, 2015

Related U.S. Application Data

(63) Continuation-in-part of application No. 14/536,415, filed on Nov. 7, 2014, now Pat. No. 9,457,335, and a (Continued)

(51) Int. Cl.

*B01F 23/53* (2022.01)
*B01F 23/50* (2022.01)
(Continued)

(52) U.S. Cl.

CPC .............. *B01F 23/53* (2022.01); *B01F 23/59* (2022.01); *B01F 25/4331* (2022.01);
(Continued)

(58) Field of Classification Search

CPC .. B01F 3/1221; B01F 3/1271; B01F 13/1016; B01F 13/1019; B01F 2215/0081;
(Continued)

(56) References Cited

U.S. PATENT DOCUMENTS

| | | |
|---|---|---|
| 559,965 A | 5/1896 | Bierstadt |
| 896,233 A | 8/1908 | McQueen |

(Continued)

FOREIGN PATENT DOCUMENTS

| | | |
|---|---|---|
| CA | 2643743 C | 4/2011 |
| CN | 2601189 Y | 1/2004 |

(Continued)

OTHER PUBLICATIONS

Office Action issued in Chinese Patent Appl. No. 201580036796.9 on Oct. 25, 2018; 29 pages (with English translation).

(Continued)

*Primary Examiner* — Marc C Howell
(74) *Attorney, Agent, or Firm* — Michael L. Flynn

(57) ABSTRACT

A mixing unit comprising a frame, a rheology control portion, and a high-volume solids blending portion. The rheology control portion comprises means for receiving a first material from a first transfer mechanism, a dispersing/mixing system connected with the frame, and a first metering system to meter the first material from the first material receiving means to the dispersing/mixing system. The dispersing/mixing system disperses/mixes the metered first material with a fluid to form a first fluid mixture. The high-volume solids blending portion comprises means for receiving a second material from a second transfer mecha-
(Continued)

nism, a solids blending system connected with the frame, and a second metering system to meter the second material from the second material receiving means to the solids blending system. The solids blending system blends the metered second material with the first fluid mixture to form a second fluid mixture.

22 Claims, 19 Drawing Sheets

Related U.S. Application Data continuation-in-part of application No. 14/449,206, filed on Aug. 1, 2014, now Pat. No. 10,633,174, and a continuation-in-part of application No. 14/192,838, filed on Feb. 27, 2014, now Pat. No. 11,819,810.

(60) Provisional application No. 61/992,146, filed on May 12, 2014.

(51) Int. Cl.
*B01F 25/433* (2022.01)
*B01F 27/81* (2022.01)
*B01F 33/81* (2022.01)
*B01F 101/49* (2022.01)

(52) U.S. Cl.
CPC .......... *B01F 27/812* (2022.01); *B01F 33/811* (2022.01); *B01F 33/812* (2022.01); *B01F 2101/49* (2022.01)

(58) Field of Classification Search
CPC ........ B01F 23/53; B01F 23/59; B01F 33/811; B01F 33/812; B01F 2101/49
USPC .......................................................... 366/138
See application file for complete search history.

(56) References Cited

U.S. PATENT DOCUMENTS

| | | | | |
|---|---|---|---|---|
| 1,526,527 | A | | 2/1925 | Butler |
| 1,560,826 | A | | 11/1925 | Kirschbraun |
| 1,576,940 | A | | 3/1926 | Warner |
| 2,073,652 | A | | 3/1937 | Robb |
| 2,099,898 | A | | 11/1937 | Larkin |
| 2,357,583 | A | | 9/1944 | Franco |
| 2,735,839 | A | | 2/1956 | Schrenk |
| 2,774,497 | A | | 12/1956 | Martin |
| 2,792,262 | A | | 5/1957 | Hathorn |
| 2,858,950 | A | | 11/1958 | Martin |
| 3,155,248 | A | | 11/1964 | Haller |
| 3,170,560 | A | | 2/1965 | Obmascher |
| 3,208,616 | A | | 9/1965 | Haskins |
| 3,263,436 | A | | 8/1966 | Goldfarb |
| 3,314,557 | A | * | 4/1967 | Sackett, Sr. ............... B28C 9/00 366/18 |
| 3,378,152 | A | | 4/1968 | Warner et al. |
| 3,394,961 | A | | 7/1968 | Matte |
| 3,451,986 | A | | 6/1969 | Metais |
| 3,490,632 | A | | 1/1970 | McKinney |
| 3,497,327 | A | | 2/1970 | Kehse |
| 3,560,053 | A | | 2/1971 | Ortloff |
| 3,618,801 | A | | 11/1971 | Blanchard |
| 3,666,129 | A | | 5/1972 | Haskins |
| 3,687,319 | A | | 8/1972 | Adam et al. |
| 3,743,108 | A | | 7/1973 | Visser |
| 3,756,443 | A | | 9/1973 | Verschage et al. |
| 3,787,479 | A | | 1/1974 | Grehl |
| 3,842,910 | A | | 10/1974 | Zingg et al. |
| 3,883,019 | A | | 5/1975 | Hansen, Jr. |
| 3,883,148 | A | | 5/1975 | Miller |
| 3,894,645 | A | | 7/1975 | Verschage |
| 3,938,673 | A | | 2/1976 | Perry, Jr. |
| 3,974,602 | A | | 8/1976 | Pohl et al. |
| 3,985,254 | A | | 10/1976 | Grandury |
| 3,998,433 | A | | 12/1976 | Iwako |
| 4,026,441 | A | | 5/1977 | Jones |
| 4,077,612 | A | | 3/1978 | Ricciardi |
| 4,079,150 | A | | 3/1978 | Beck et al. |
| 4,090,623 | A | | 5/1978 | Noyon |
| 4,099,005 | A | | 7/1978 | Fullington et al. |
| 4,103,793 | A | | 8/1978 | Weaver |
| 4,111,314 | A | | 9/1978 | Nelson |
| 4,178,117 | A | | 12/1979 | Brugler |
| 4,187,047 | A | | 2/1980 | Squifflet, Sr. |
| 4,209,278 | A | | 6/1980 | Cooper et al. |
| 4,222,498 | A | | 9/1980 | Brock |
| 4,248,359 | A | | 2/1981 | Brock |
| 4,249,848 | A | | 2/1981 | Griffin et al. |
| 4,268,208 | A | | 5/1981 | Hankins et al. |
| 4,337,014 | A | | 6/1982 | Farnham |
| 4,348,146 | A | | 9/1982 | Brock |
| 4,373,857 | A | | 2/1983 | Giles |
| 4,375,343 | A | | 3/1983 | Butler |
| 4,400,126 | A | | 8/1983 | Desourdy |
| 4,427,133 | A | | 1/1984 | Kierbow et al. |
| 4,453,829 | A | | 6/1984 | Althouse |
| 4,465,420 | A | | 8/1984 | Dillman |
| 4,494,903 | A | | 1/1985 | Badicel et al. |
| 4,561,821 | A | | 12/1985 | Dillman |
| 4,579,496 | A | | 4/1986 | Gerlach |
| 4,601,628 | A | | 7/1986 | Lowing |
| 4,621,972 | A | | 11/1986 | Grotte |
| 4,624,357 | A | | 11/1986 | Oury et al. |
| 4,626,166 | A | | 12/1986 | Jolly |
| 4,671,665 | A | | 6/1987 | McIntire |
| 4,701,095 | A | | 10/1987 | Berryman et al. |
| 4,775,275 | A | | 10/1988 | Perry |
| 4,808,004 | A | | 2/1989 | McIntire et al. |
| 4,832,561 | A | | 5/1989 | Nijenhuis |
| 4,834,542 | A | | 5/1989 | Sherwood |
| 4,850,750 | A | | 7/1989 | Cogbill et al. |
| 4,855,960 | A | | 8/1989 | Janssen et al. |
| 4,883,363 | A | | 11/1989 | Pillon et al. |
| 4,899,832 | A | | 2/1990 | Bierscheid, Jr. |
| 4,907,712 | A | | 3/1990 | Stempin |
| 4,917,560 | A | | 4/1990 | Murray et al. |
| 4,925,358 | A | | 5/1990 | Cook |
| 4,944,646 | A | | 7/1990 | Edwards et al. |
| 5,006,034 | A | | 4/1991 | Bragg et al. |
| 5,018,932 | A | | 5/1991 | Croisier |
| 5,035,269 | A | | 7/1991 | Pytryga et al. |
| 5,046,856 | A | | 9/1991 | McIntire |
| 5,052,486 | A | | 10/1991 | Wilson |
| 5,121,989 | A | | 6/1992 | Horton et al. |
| 5,190,374 | A | | 3/1993 | Harms et al. |
| 5,195,861 | A | | 3/1993 | Handke |
| 5,201,498 | A | | 4/1993 | Akins |
| 5,236,261 | A | | 8/1993 | Hagenbuch |
| 5,339,996 | A | | 8/1994 | Dubbert et al. |
| 5,362,193 | A | | 11/1994 | Milstead |
| 5,382,411 | A | | 1/1995 | Allen |
| 5,387,736 | A | | 2/1995 | Salomone et al. |
| 5,413,154 | A | | 5/1995 | Hurst, Jr. et al. |
| 5,426,137 | A | | 6/1995 | Allen |
| 5,427,497 | A | | 6/1995 | Dillman |
| 5,571,281 | A | | 11/1996 | Allen |
| 5,667,298 | A | | 9/1997 | Musil et al. |
| 5,685,416 | A | | 11/1997 | Bonnet |
| 5,775,713 | A | | 7/1998 | Peterson et al. |
| 5,777,234 | A | | 7/1998 | Kosmal |
| 5,785,421 | A | | 7/1998 | Milek |
| 5,795,062 | A | | 8/1998 | Johnson |
| 5,822,930 | A | | 10/1998 | Klein |
| 5,964,566 | A | | 10/1999 | Stewart et al. |
| 6,000,840 | A | | 12/1999 | Paterson |
| 6,050,743 | A | | 4/2000 | Medinger |
| 6,186,195 | B1 | | 2/2001 | Anstotz |
| 6,186,654 | B1 | | 2/2001 | Gunteret, Jr. et al. |
| 6,193,402 | B1 | | 2/2001 | Grimland et al. |
| 6,286,986 | B2 | | 9/2001 | Grimland et al. |

(56) References Cited

U.S. PATENT DOCUMENTS 6,293,689 B1 9/2001 Guntert, Jr. et al.
6,447,674 B1 9/2002 Simon et al.
6,474,926 B2 11/2002 Weiss
6,491,421 B2 12/2002 Rondeau et al.
6,527,428 B2 3/2003 Guntert, Jr. et al.
6,832,851 B1 12/2004 von Wilcken
6,939,031 B2 9/2005 Pham et al.
6,948,535 B2 9/2005 Stegemoeller
7,048,432 B2 5/2006 Phillippi et al.
7,104,328 B2 9/2006 Phillippi et al.
7,214,028 B2 5/2007 Boasso et al.
7,258,522 B2 8/2007 Pham et al.
7,308,953 B2 12/2007 Barnes
7,419,296 B2 9/2008 Allen
7,424,943 B2 9/2008 Gausman et al.
7,614,451 B2 11/2009 Blaschke et al.
7,540,308 B2 12/2009 Pessin et al.
7,703,518 B2 4/2010 Phillippi et al.
7,815,222 B2 10/2010 Markham
7,836,949 B2 11/2010 Dykstra
7,837,427 B2 11/2010 Beckel et al.
7,841,394 B2 11/2010 McNeel et al.
7,845,413 B2 12/2010 Shampine et al.
7,866,881 B2 1/2011 El Kholy et al.
7,921,914 B2 4/2011 Bruins et al.
7,926,564 B2 4/2011 Phillippi et al.
7,931,088 B2 4/2011 Stegemoeller et al.
8,066,955 B2 11/2011 Pinchot
8,083,083 B1 12/2011 Mohns
8,127,844 B2 3/2012 Luharuka et al.
8,137,051 B2 3/2012 Glenn et al.
8,142,134 B2 3/2012 Lavoie et al.
8,146,665 B2 4/2012 Neal
8,313,269 B2 11/2012 Fisher et al.
8,354,602 B2 1/2013 Lucas et al.
8,585,341 B1 11/2013 Oren et al.
8,651,792 B2 2/2014 Friesen
8,661,743 B2 3/2014 Flusche
8,726,584 B1 5/2014 Nolte et al.
8,734,081 B2 5/2014 Stegemoeller et al.
8,834,012 B2 9/2014 Case et al.
8,926,252 B2 1/2015 McIver et al.
8,931,996 B2 1/2015 Friesen et al.
8,944,740 B2 2/2015 Teichrob et al.
9,017,001 B1 4/2015 Dueck
9,097,033 B2 8/2015 Margevicius et al.
9,457,335 B2 10/2016 Pham et al.
9,475,029 B2 10/2016 McSpadden et al.
9,663,303 B2 5/2017 Waldner et al.
9,688,178 B2 6/2017 Pham
2002/0034120 A1 3/2002 Guntert, Jr. et al.
2002/0147370 A1 10/2002 Hinz et al.
2003/0150494 A1* 8/2003 Morgan ................ B01F 25/421 137/574
2003/0161212 A1 8/2003 Neal et al.
2003/0196809 A1 10/2003 Willberg et al.
2003/0202869 A1 10/2003 Posch
2003/0227817 A1 12/2003 Martel et al.
2004/0008571 A1 1/2004 Coody et al.
2004/0209780 A1 10/2004 Harris et al.
2004/0256106 A1 12/2004 Phillippi et al.
2005/0028979 A1* 2/2005 Brannon .................. C09K 8/62 166/280.2
2005/0067351 A1 3/2005 Graham
2005/0091941 A1 5/2005 Baird
2005/0123385 A1 6/2005 Kirsch
2005/0185506 A1* 8/2005 Allen .................... B01F 25/433 366/182.2
2005/0201197 A1 9/2005 Duell et al.
2006/0028914 A1 2/2006 Phillippi et al.
2006/0065400 A1 3/2006 Smith
2006/0107998 A1 5/2006 Kholy et al.
2006/0146643 A1* 7/2006 Allen ...................... B01F 23/53 366/134
2006/0289166 A1 12/2006 Stromquist et al.
2007/0014653 A1 1/2007 Glenn et al.
2007/0114035 A1 5/2007 Parris et al.
2007/0179326 A1 8/2007 Baker
2007/0201305 A1 8/2007 Heilman et al.
2007/0277982 A1* 12/2007 Shampine ............... E21B 43/16 166/308.1
2008/0008562 A1 1/2008 Beckel et al.
2008/0066911 A1 3/2008 Luharuka et al.
2008/0073895 A1 3/2008 Herman et al.
2008/0179054 A1 7/2008 McGough et al.
2008/0264641 A1* 10/2008 Slabaugh ................ B01F 23/51 166/308.2
2009/0078410 A1 3/2009 Krenek et al.
2009/0078792 A1 3/2009 Vlasak
2009/0090504 A1 4/2009 Weightman et al.
2010/0038077 A1 2/2010 Heilman et al.
2010/0071284 A1 3/2010 Hagan et al.
2010/0188926 A1 7/2010 Stegemoeller et al.
2010/0243251 A1 9/2010 Luharuka et al.
2010/0243252 A1 9/2010 Luharuka et al.
2010/0243255 A1 9/2010 Luharuka et al.
2010/0278621 A1 11/2010 Redekop
2010/0319921 A1* 12/2010 Eia ........................ E21B 21/062 166/305.1
2010/0329072 A1 12/2010 Hagan et al.
2011/0003720 A1 1/2011 Sullivan
2011/0026358 A1 2/2011 Cheio De Oliveira et al.
2011/0061855 A1 3/2011 Case et al.
2011/0063942 A1 3/2011 Hagan et al.
2011/0127178 A1 6/2011 Claussen
2011/0197536 A1 8/2011 Clark
2012/0024738 A1 2/2012 Herman et al.
2012/0048537 A1 3/2012 Rettie et al.
2012/0127820 A1 5/2012 Noles, Jr.
2012/0127822 A1 5/2012 Noles, Jr.
2012/0128449 A1 5/2012 Fikes et al.
2012/0134772 A1 5/2012 Herman et al.
2012/0167485 A1 7/2012 Trevithick et al.
2012/0219291 A1 8/2012 Chiku et al.
2012/0219391 A1* 8/2012 Teichrob .............. B65G 63/008 414/293
2012/0255734 A1* 10/2012 Coli ........................ E21B 43/26 166/305.1
2012/0273206 A1 11/2012 Zamora et al.
2012/0298210 A1 11/2012 Pham et al.
2013/0105166 A1 5/2013 Medvedev et al.
2013/0142601 A1 6/2013 McIver et al.
2013/0150268 A1 6/2013 Oldham
2013/0269735 A1 10/2013 Roetzel et al.
2013/0288934 A1 10/2013 Powell et al.
2013/0309052 A1 11/2013 Luharuka et al.
2013/0324444 A1 12/2013 Esko et al.
2014/0041317 A1 2/2014 Pham et al.
2014/0041319 A1 2/2014 Pham et al.
2014/0041322 A1 2/2014 Pham et al.
2014/0044508 A1 2/2014 Luharuka et al.
2014/0166647 A1 6/2014 Sheesley et al.
2014/0255265 A1 9/2014 Kulkarni et al.
2014/0364346 A1 12/2014 Weinstein et al.
2015/0044003 A1 2/2015 Pham
2015/0044004 A1 2/2015 Pham et al.
2015/0064077 A1 3/2015 McSpadden et al.
2015/0166260 A1 6/2015 Pham et al.
2015/0238912 A1 8/2015 Luharuka et al.
2015/0238913 A1 8/2015 Luharuka et al.
2015/0240148 A1 8/2015 Luharuka et al.
2016/0129418 A1 5/2016 Pham et al.
2016/0130924 A1 5/2016 Pham et al.
2017/0327309 A1 11/2017 Hunter et al.

FOREIGN PATENT DOCUMENTS

CN 2693601 Y 4/2005
CN 101434836 A 5/2009
CN 201317413 Y 9/2009
CN 201458370 U 5/2010
CN 201610285 U 10/2010
CN 202398329 U 8/2012

(56) References Cited

FOREIGN PATENT DOCUMENTS

| | | | |
|---|---|---|---|
| CN | 202506322 | U | 10/2012 |
| CN | 203486442 | U | 3/2014 |
| CN | 103721619 | A | 4/2014 |
| CN | 204109871 | U | 1/2015 |
| EP | 0048312 | A1 | 3/1982 |
| EP | 0241056 | A1 | 10/1987 |
| EP | 2609999 | A1 | 7/2013 |
| FR | 2655007 | A1 | 5/1991 |
| JP | 57015828 | | 1/1982 |
| JP | S5715828 | A | 1/1982 |
| KR | 100589613 | B1 | 6/2006 |
| RU | 10418 | U1 | 7/1999 |
| RU | 2228842 | C2 | 1/2004 |
| SU | 1341161 | A1 | 9/1987 |
| WO | 8500046 | A1 | 1/1985 |
| WO | 1985000046 | | 1/1985 |
| WO | 0244517 | A1 | 6/2002 |
| WO | 03087182 | A2 | 10/2003 |
| WO | 2007022300 | A2 | 2/2007 |
| WO | 2007098606 | A1 | 9/2007 |
| WO | 2010070599 | A1 | 6/2010 |
| WO | 2011061503 | A1 | 5/2011 |
| WO | 2011088493 | A1 | 7/2011 |
| WO | 2012121896 | A2 | 9/2012 |
| WO | 2012166590 | A1 | 12/2012 |
| WO | 2013099826 | A1 | 7/2013 |
| WO | 2013134624 | A1 | 9/2013 |
| WO | 2014028317 | A1 | 2/2014 |

OTHER PUBLICATIONS

Office Action issued in Russian Patent Appl. No. 2015117758 on Dec. 5, 2018; 13 pages (with English translation).

Office Action issued in Russian Patent Appl. No. 2015117770 on Nov. 16, 2018; 16 pages (with English Translation).

Office Action issued in Chinese Patent Appl. NO. 201580010979.3 on Sep. 12, 2018; 39 pages (with English translation).

Office Action issued in Chinese Patent Appl. No. 201580032114.7 on Jul. 18, 2018; 15 pages.

Office Action issued in Eurasian Patent Appl. No. 201691737/31 on Mar. 19, 2018; 4 pages (with English translation).

International Search Report and Written Opinion issued in PCT/US2015/030287 on Jul. 29, 2015; 14 pages.

Extended Search Report issued in European Patent Appl. No. 15755550.9 on Oct. 9, 2017; 8 pages.

International Search Report and Written Opinion issued in PCT/US2015/017175 on May 28, 2015, 16 pages.

International Search Report and Written Opinion issued in PCT/US2015/059177 on Feb. 17, 2016; 14 pages.

International Search Report and Written Opinion issued in PCT/US2015/059182 on Feb. 29, 2016; 13 pages.

Decision on Grant issued in Russian Patent Appl. No. 2014132435 on Sep. 20, 2018; 24 pages (with English translation).

Office Action issued in Chinese Patent Appl. No. 201580034894.9 on Jul. 3, 2018; 9 pages (with English translation).

Decision on Grant issued in Russian Patent Appl. No. 2017102359 on Jul. 27, 2018; 16 pages (with English translation).

Office Action issued in Russian Patent Application No. 2014132435 on Apr. 3, 2018; 9 pages.

Office Action issued in Russian Patent Application No. 2017102359 on Mar. 7, 2018; 11 pages.

Examination Report issued on Dec. 19, 2018 in corresponding AU Application No. 2015259393; 4 pages.

"Practical Technical Manuel for Dairy Product Engineer", Gu Ming editor, China Light Industry Press, Jan. 2009, pp. 605-607.

Office Action issued in U.S. Appl. No. 16/859,188 dated Sep. 27, 2021, 54 pages.

Exam Report issued in Australian Patent Application No. 2019283869 dated Oct. 15, 2021, 2 pages.

Examiner's Report issued in Canadian Patent Application No. 2858452 dated Oct. 25, 2021, 4 pages.

Office Action 97624 issued in Mexican Patent Application No. MX/a/2016/014601 on Oct. 22, 2021, 7 pages.

Office Action issued in Canadian Patent Application No. 2948002 dated May 31, 2021, 3 pages.

Substantive Examination issued in Bahrain Patent Applicationi No. 20160114 dated Jan. 10, 2022, 10 pages with English translation.

Office Action issued in U.S. Appl. No. 16/859,188 dated Jan. 18, 2022, 12 pages.

Office Action issued in U.S. Appl. No. 14/192,838 dated Jan. 20, 2022, 13 pages.

Examination Report issued in Saudi Arabia Patent Application No. 516380275 on Feb. 28, 2022; 7 pages (with English translation).

Re-examination report issued in Chinese Patent Application No. 201580036796.9 on Mar. 30, 2022; 18 pages (with English Translation).

Substantive Examination issued in Bahrain Patent Application No. 20160114 dated Apr. 25, 2022, 9 pages with English translation.

Office Action issued in U.S. Appl. No. 16/859,188 dated May 3, 2022, 16 pages.

First Substantive Examination issued in Mexican Patent Application MX/a/2016/014690 dated Mar. 17, 2022, 16 pages with English translation.

Re-examination report issued in Chinese Patent Application No. 201580036796.9 on Jul. 7, 2022; 40 pages with English translation.

2nd Substantive Examination issued in Mexican Patent Application No. MX/a/2016/014690 dated Nov. 23, 2022, 14 pages with English translation.

Notice of Allowance issued in U.S. Appl. No. 14/192,838 dated Jul. 25, 2023, 10 pages.

* cited by examiner

INTEGRATED PROCESS DELIVERY AT WELLSITE

CROSS-REFERENCE TO RELATED APPLICATIONS

This application claims the benefit of and priority to U.S. Provisional Application No. 61/992,146 entitled "Integrated Process Delivery at Wellsite," filed May 12, 2014, the entire disclosure of which is hereby incorporated herein by reference.

This application is also a continuation-in-part of U.S. application Ser. No. 14/192,838 entitled "Mixing Apparatus with Stator and Method," filed Feb. 27, 2014, the entire disclosure of which is hereby incorporated herein by reference.

This application is also a continuation-in-part of U.S. application Ser. No. 14/536,415, entitled "Hydration Apparatus and Method," filed Nov. 7, 2014, the entire disclosure of which is hereby incorporated herein by reference.

This application is also a continuation-in-part of U.S. application Ser. No. 14/449,206, entitled "Mobile Oilfield Material Transfer Unit," filed Aug. 1, 2014, the entire disclosure of which is hereby incorporated herein by reference.

BACKGROUND OF THE DISCLOSURE

High viscosity fluid mixtures or gels comprising hydratable material and/or additives mixed with water and/or other hydrating fluid are utilized in fracturing and other subterranean well treatment operations. These high viscosity fluid mixtures are formulated at the wellsite or transported to the wellsite from a remote location. Hydration is a process by which the hydratable material solvates, absorbs, and/or otherwise reacts with hydrating fluid to create the high viscosity fluid mixture. The level of hydration of the hydratable material may be increased by maintaining the hydratable material in the hydrating fluid during a process step referred to as residence time, such as may take place in one or more hydration tanks.

Hydration and the associated increase in viscosity take place over a time span corresponding to the residence time of the hydratable material in the hydrating fluid. Hence, the rate of hydration of the hydratable material is a factor in the gelling operations, and scrutinized in continuous gelling operations by which the high viscosity fluid mixture is continuously produced at the job site during the course of wellsite operations. To achieve sufficient hydration and/or viscosity, long tanks or a series of large tanks are utilized to provide the hydratable material with sufficient volume and, thus, residence time in the hydrating fluid. Such tanks are transported to or near the wellsite. For example, the hydratable material may be mixed with the hydrating fluid before being introduced into a series of tanks and, as the fluid mixture passes through the series of tanks, the hydratable material may hydrate to a sufficient degree.

A typical gravity-flow hydration tank cannot handle a high concentration fluid mixture. Therefore, other tanks having large volumes are utilized to sufficiently dilute the fluid mixture to a sufficiently low viscosity to permit the fluid mixture to pass through the gravity-flow hydration tank. Hydration tanks having large volumes comprise large footprints, are difficult to transport, and/or may not be transportable. High power mixers are then utilized to mix or blend the high viscosity fluid mixtures with proppant materials, solid additives, and liquid additives during blending operations to form other fluid mixtures, such as fracturing fluids.

Prior to blending, the proppant material and the solid additives are transported to the wellsite via delivery vehicles and fed into the mixers during the blending operations. To avoid interruptions in material supply, the delivery vehicles repeatedly arrive at the wellsite, creating vehicle congestion. Furthermore, a limited number of delivery vehicles can be parked on the wellsite adjacent the mixers as the materials are unloaded and fed into the mixers during blending operations.

Separate pieces of equipment are utilized for performing gelling and blending operations. Such a functional split between equipment lends itself to inefficiencies, reduced reliability, exposure to non-standard rig-up, and poor process controllability. With equipment division of the gelling and blending units, duplicate pieces of equipment are often utilized to deliver the combined process, which increases the wellsite footprint and complexity.

Each piece of equipment may also comprise its own engine, generator, and/or other power source, which is independently refueled, and which increases maintenance activities. Safety and environmental concerns are also higher, such as may be attributable to the large and numerous hoses, pipes, and/or other conduits connecting the various blending and mixing components, each of which is susceptible to leaks and non-standard rig-ups.

The gelling and blending operations are also becoming more complex as they are being tailored to specific subterranean reservoirs. This also adds to the burden on the field personnel and organization, increasing the multiple pieces of equipment that are controlled and maintained. Moreover, because the gelling and blending controls are highly manual, the field personnel and organization increasingly includes experienced, highly-trained operators.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a mixing unit having a frame, a rheology control portion, and a high-volume solids blending portion. The rheology control portion includes means for receiving a first material from a first transfer mechanism, a dispersing and/or mixing system connected with the frame, and a first metering system to meter the first material from the first material receiving means to the dispersing and/or mixing system. The dispersing and/or mixing system is operable to disperse and/or mix the metered first material with a fluid to form a first fluid mixture. The high-volume solids blending portion includes means for receiving a second material from a second transfer mechanism, a solids blending system connected with the frame, and a second metering system to meter the second material from the second material receiving means to the solids blending system. The solids blending system is operable to blend the metered second material with the first fluid mixture to form a second fluid mixture. The second material may be a high-volume solids material, such as proppant or other particulate material.

The present disclosure also introduces a method in which first transfer mechanisms are operated to transfer corresponding materials received from corresponding delivery vehicles to corresponding containers. Each of the materials has a different composition. Second transfer mechanisms are operated to transfer corresponding ones of the materials from corresponding ones of the containers to a mixing unit. The mixing unit is operated to at least partially form a subterranean formation fracturing fluid utilizing each of the materials received from each of the second transfer mechanisms.

The present disclosure also introduces an apparatus that includes a wellsite system for utilization in a subterranean fracturing operation. The wellsite system includes a mobile base frame having an open area extending at least partially therethrough, and multiple containers disposed on the mobile base frame over the open area. The containers are for containing high-volume solid materials. The wellsite system also includes a mixing unit having first and second mixers. The mixing unit is operable to move within the open area such that, within the open area, a receiving means of the first mixer is aligned with a gravity-fed discharge of the high-volume solid materials from at least one of the containers.

The present disclosure also introduces a method that includes deploying a mobile base frame at a wellsite. The mobile base frame includes an open area extending at least partially therethrough. Multiple containers are erected on the mobile base frame. The containers are for containing high-volume solid materials. A mixing unit is transported into the open area such that material receiving means of the mixing unit align with a gravity-fed discharge of the high-volume solid materials from at least one of the containers. The mixing unit includes a frame, a first mixer connected with the frame, and a second mixer connected with the frame and in fluid communication with the first mixer. The material receiving means receive and direct gravity-fed discharge of the high-volume solid materials to at least one of the first and second mixers.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
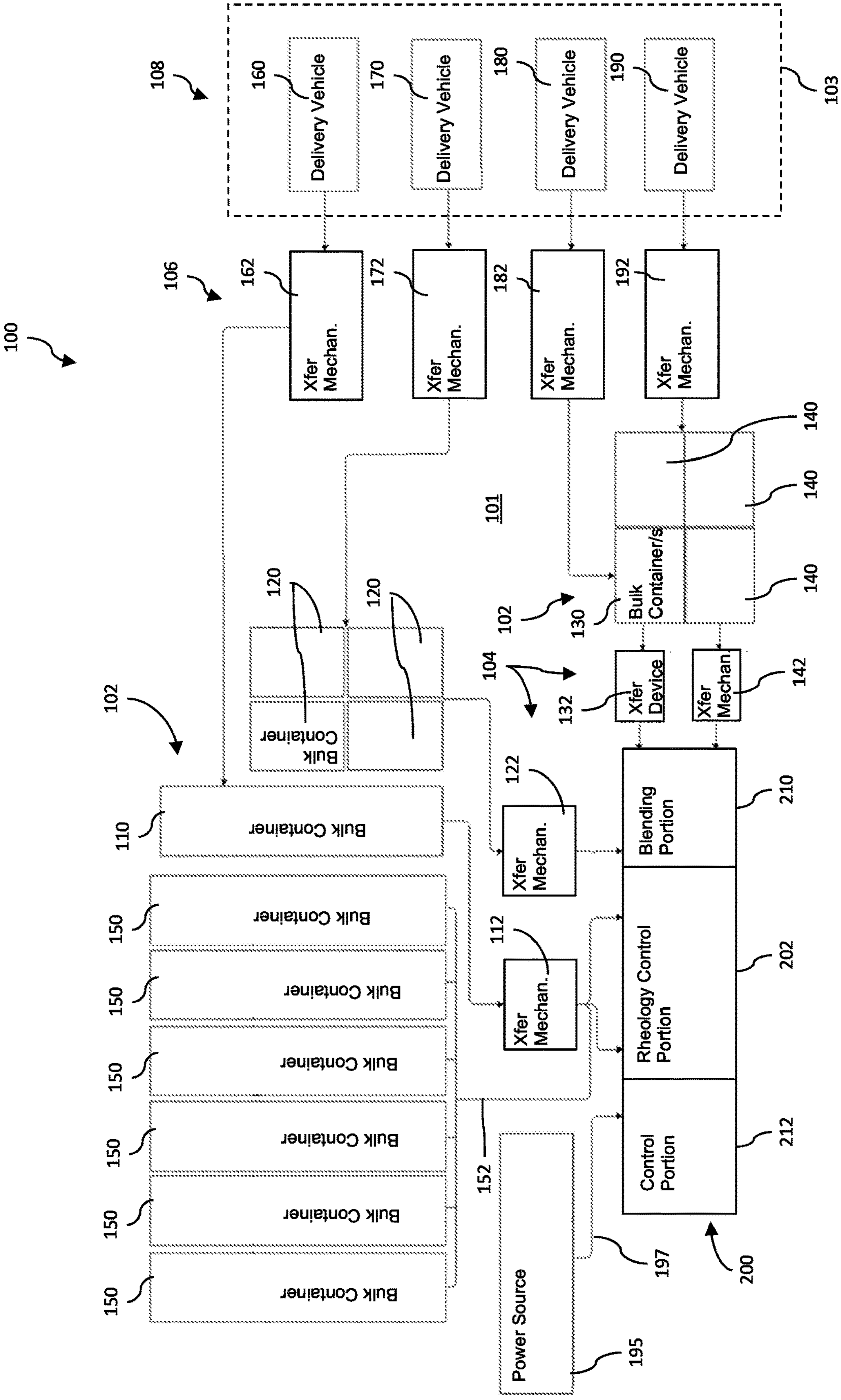
FIG. 1 is a schematic view of at least a portion of an example implementation of apparatus according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various implementations and/or configurations discussed. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example wellsite system 100 located on a wellsite surface 101 according to one or more aspects of the present disclosure. The wellsite system 100 comprises a mixing unit 200 operatively connected with a plurality of bulk containers 102 storing various fluids, solids, additives, particulate materials, and/or other materials (hereinafter referred to collectively as "plurality of materials") via a plurality of transfer mechanisms 104. The transfer mechanisms 104 are operable to transfer or otherwise convey the plurality of materials from corresponding ones of the bulk containers 102 to the mixing unit 200. The mixing unit 200 is operable to receive and mix or otherwise blend the plurality of materials to form one or more fluid mixtures, such as may form at least a portion of a substantially continuous stream of fracturing fluid utilized in subterranean formation fracturing operations.

For example, the wellsite system 100 may comprise a bulk container 110, such as a silo or tank, for containing a hydratable material, such as gelling agents, guar, polymers, synthetic polymers, galactomannan, polysaccharides, cellulose, and clay, among other examples. The bulk container 110 may be operatively connected with the mixing unit 200 via a transfer mechanism 112 extending between the bulk container 110 and the mixing unit 200. The transfer mechanism 112 may include a metering feeder, a screw feeder, an auger, a conveyor, and/or the like, and may extend between the bulk container 110 and the mixing unit 200 such that an inlet of the transfer mechanism 112 may be positioned generally below the bulk container 110 and an outlet may be positioned generally above the mixing unit 200. A blade extending along a length of the transfer mechanism 112, for example, may be operatively connected with a motor operable to rotate the blade. As the mixing unit 200 is operating, the rotating blade may move the hydratable material from the inlet to the outlet, whereby the hydratable material may be dropped, fed, or otherwise introduced into the mixing unit 200.

The transfer mechanism 112 may also or instead include a pneumatic conveyance system, wherein pressurized gas, such as air, is utilized to move the hydrating material from the bulk container 110 to the mixing unit 200. The pneumatic conveyance system may comprise a vacuum pump, which may generate a vacuum operable to draw the hydrating material from the bulk container 110 and transfer the hydrating material into the mixing unit 200 via a conduit system.

The bulk container 110 may be a mobile container or trailer, such as may permit its transportation to the wellsite surface 101. However, the bulk container 110 may be skidded or otherwise stationary, and/or may be temporarily or permanently installed at the wellsite surface 101.

The wellsite system 100 may further comprise a bulk container 120, which may include a plurality of tanks for storing liquid additives, such as crosslinkers, breakers, surfactants, clay stabilizers, hydrochloric acid, and friction reducers, among other examples. The bulk container 120 may be operatively connected with the mixing unit 200 via a transfer mechanism 122 extending between one or more of the bulk containers 120 and the mixing unit 200. The transfer mechanism 122 may include one or more fluid conduits extending between the bulk container 120 and the mixing unit 200. The transfer mechanism 122 may further comprise one or more fluid pumps operable to transfer the liquid additive from the bulk container 120 to the mixing unit 200.

The bulk container 120 may form a portion of a mobile container or trailer, such as may permit transportation to the wellsite surface 101. However, the bulk container 120 may be skidded or otherwise stationary, and/or may be temporarily or permanently installed at the wellsite surface 101.

The wellsite system 100 may also comprise a bulk container 130, which may include a silo or bin for storing a high volume or bulk material (hereinafter referred to as a solid additive). The solid additive may be dry or partially dry and may include fibrous materials, such as fiberglass, phenol formaldehydes, polyesters, polylactic acid, cedar bark, shredded cane stalks, mineral fiber, and hair, among other examples. The solid additive may be packaged into small encapsulations, such as pouches, pellets, bags, and/or other packaging means, which may improve handling during the transfer process and/or flow inside the bulk container 130, and which may decrease dust generation. The packaging means may dissolve or break up upon introduction into the mixing unit 200.

The bulk container 130 may be operatively connected with the mixing unit 200 via a transfer mechanism 132 extending between the bulk container 130 and the mixing unit 200. The transfer mechanism 132 may include a metering feeder, a screw feeder, an auger, a conveyor, and/or the like, and may extend between the bulk container 130 and the mixing unit 200 such that an inlet of the transfer mechanism 132 may be positioned generally below the bulk container 130 and an outlet may be positioned generally above the mixing unit 200. A blade extending along a length of the transfer mechanism 132, for example, may be operatively connected with a motor operable to rotate the blade. As the mixing unit 200 is operating, the rotating blade may move the solid additive from the inlet to the outlet, whereby the solid additive may be dropped, fed, or otherwise introduced into the mixing unit 200.

The transfer mechanism 132 may also or instead include a gravity conveyance mechanism. For example, a lower portion of the bulk container 130 may comprise a tapered configuration terminating with a chute disposed generally above the mixing unit 200 or within a hopper or another material receiving portion of the mixing unit 200. During mixing operations, the chute may be opened and closed by an actuator to permit the solid additives to be dropped, fed, or otherwise introduced into the mixing unit 200. The bulk container 130 may be vertically oriented and disposed at an elevated position above the mixing unit 200, such as may permit the mixing unit 200 to be positioned at least partially underneath the bulk container 130. Such implementation may permit the chute of the bulk container 130 to be disposed above the mixing unit 200 or within the material receiving portion of the mixing unit 200 to permit the solid additives to be dropped, fed, or otherwise introduced into the receiving portion of the mixing unit 200. The bulk container 130 may be a mobile container or trailer, such as may permit its transportation to the wellsite surface 101. However, the bulk container 130 may be skidded or otherwise stationary, and/or may be temporarily or permanently installed at the wellsite surface 101.

The wellsite system 100 may also comprise a bulk container 140, which may include a plurality of silos or bins for storing particulate material. The particulate material may be or comprise a solid and/or dry material, such as a proppant material, including sand, sand-like particles, silica, and quartz, among other examples. The particulate material may also or instead comprise mica and/or fibrous materials. The particulate material may also be encapsulated as described above with respect to the solid additive materials. The particulate material is also referred to herein as high-volume solids.

The bulk container 140 may be operatively connected with the mixing unit 200 via a transfer mechanism 142 extending between the bulk container 140 and the mixing unit 200. The transfer mechanism 142 may include a metering feeder, a screw feeder, an auger, a conveyor, and the like, and may extend between the bulk container 140 and the mixing unit 200 such that an inlet of the transfer mechanism 142 may be positioned generally below the bulk container 140 and an outlet may be positioned generally above the mixing unit 200. A blade extending along a length of the transfer mechanism 142, for example, may be operatively connected with a motor operable to rotate the blade. As the mixing unit 200 is operating, the rotating blade may move the particulate material from the inlet to the outlet, whereby the particulate material may be dropped, fed, or otherwise introduced into the mixing unit 200.

The transfer mechanism 142 may also or instead include a gravity conveyance mechanism. For example, a lower portion of the bulk container 140 may comprise a tapered configuration terminating with a chute disposed generally above the mixing unit 200 or within a hopper or another material receiving portion of the mixing unit 200. During mixing operations, the chute may be opened and closed by an actuator to permit the particulate material to be dropped, fed, or otherwise introduced into the mixing unit 200. The bulk container 140 may be vertically oriented and disposed at an elevated position above the mixing unit 200, such as may permit the mixing unit 200 to be positioned at least partially underneath the bulk container 140. Such configuration may permit the chute of the bulk container 140 to be disposed above the mixing unit 200 or within the material receiving portion of the mixing unit 200 to permit the particulate material to be dropped, fed, or otherwise introduced into the receiving portion of the mixing unit 200.

The bulk container 140 may be a mobile container or trailer, such as may permit its transportation to the wellsite surface 101. However, the bulk container 140 may be skidded or otherwise stationary, and/or may be temporarily or permanently installed at the wellsite surface 101.

The wellsite system 100 may also comprise a bulk container 150, which may include a plurality of tanks for storing hydrating fluid, such as an aqueous fluid or an aqueous solution comprising water, among other examples. The bulk container 150 may be fluidly connected with the mixing unit 200 via a transfer mechanism 152 operable to transfer the hydrating fluid from the bulk container 150 to the mixing unit 200. The transfer mechanism 152 may comprise one or more fluid conduits extending between the bulk container 150 and the mixing unit 200. The transfer mechanism 152 may further comprise one or more fluid pumps operable to transfer the hydrating fluid from the bulk container 150 to the mixing unit 200.

The bulk container 150 may be a mobile container or trailer, such as may permit its transportation to the wellsite surface 101. However, the bulk container 150 may be skidded or otherwise stationary, and/or may be temporarily or permanently installed at the wellsite surface 101.

The wellsite system 100 may further comprise a plurality of additional transfer mechanisms 106 operable to transfer or otherwise convey ones of the plurality of materials from corresponding ones of a plurality of delivery vehicles 108 to the corresponding bulk containers. In the example implementation depicted in FIG. 1, the transfer mechanisms 106 include a transfer mechanism 162, a transfer mechanism 172, a transfer mechanism 182, and a transfer mechanism 192. During mixing operations, the delivery vehicles 108 may enter a material delivery area 103 of the wellsite surface 101 for unloading of the plurality of materials. The material delivery area 103 may be located adjacent each of the transfer mechanisms 106 and away from the mixing unit 200 and/or the bulk containers 102. The bulk containers 102 may be located between the mixing unit 200 and the material delivery area 103.

The hydratable material may be periodically delivered to the wellsite surface 101 via a delivery vehicle 160 comprising a container storing the hydratable material. During delivery, the delivery vehicle 160 may be positioned adjacent the transfer mechanism 162, such as may permit the hydratable material to be conveyed by the transfer mechanism 162 from the delivery vehicle 160 to the bulk container 110. For example, each delivery vehicle 160 may comprise a container having a lower portion with a tapered configuration terminating in one or more chutes. During delivery, the chutes may be disposed above the inlet portion of the transfer mechanism 162 and then opened to permit the hydratable material to be dropped, fed, or otherwise introduced into the transfer mechanism 162.

The transfer mechanism 162 may include a metering feeder, a screw feeder, an auger, a bucket conveyor, and/or the like. The transfer mechanism 162 may extend between the delivery vehicle 160 and the bulk container 110 such that an inlet of the transfer mechanism 162 may be positioned generally below the delivery vehicle 160 and an outlet of the transfer mechanism 162 may be positioned generally above the bulk container 110. A blade extending along a length of the transfer mechanism 162, for example, may be operatively connected with a motor operable to rotate the blade, which may move the hydratable material from the inlet to the outlet, whereby the hydratable material may be dropped, fed, or otherwise introduced into the bulk container 110.

The transfer mechanism 162 may also or instead include a pneumatic conveyance system, wherein pressurized gas, such as air, is utilized to move the hydratable material from the delivery vehicle 160 to the bulk container 110. The pneumatic conveyance system may comprise a vacuum generator, such as may generate a vacuum operable to draw the hydratable material from the delivery vehicle 160 and transfer the hydratable material into the bulk container 110 via a conduit system.

The container of the delivery vehicle 160 may be the bulk container 110. For example, the delivery vehicle 160 may deliver a full bulk container 110 to the wellsite surface 101 to be replaced or swapped out with an empty bulk container 110.

The liquid additive may be periodically delivered to the wellsite surface 101 via a delivery vehicle 170 comprising a container storing the liquid additive. During delivery, the delivery vehicle 170 may be positioned adjacent the transfer mechanism 172, such as may permit the liquid additive to be conveyed by the transfer mechanism 172 from the delivery vehicle 170 to the bulk container 120.

The transfer mechanism 172 may include one or more fluid conduits extending between the delivery vehicle 170 and the bulk container 120. The transfer mechanism 172 may further comprise one or more fluid pumps operable to transfer the liquid additive from the delivery vehicle 170 to the bulk container 120.

The solid additive may be periodically delivered to the wellsite surface 101 via a delivery vehicle 180 comprising a container storing the solid additive. During delivery, the delivery vehicle 180 may be positioned adjacent the transfer mechanism 182, such as may permit the solid additive to be conveyed by the transfer mechanism 182 from the delivery vehicle 180 to the bulk container 130. For example, each delivery vehicle 180 may comprise a container having a lower portion with a tapered configuration terminating in one or more chutes. During delivery, the chutes may be disposed above the inlet portion of the transfer mechanism

182 and then opened to permit the solid additives to be dropped, fed, or otherwise introduced into the transfer mechanism 182.

The transfer mechanism 182 may include a dust free conveying mechanism, a metering feeder, a screw feeder, an auger, a bucket conveyor, and/or the like, and may extend between the delivery vehicle 180 and the bulk container 130 such that an inlet of the transfer mechanism 182 may be positioned generally below the delivery vehicle 180, and an outlet of the transfer mechanism 182 may be positioned generally above the bulk container 130. A blade extending along a length of the transfer mechanism 182, for example, may be operatively connected with a motor operable to rotate the blade, which may move the solid additive from the inlet to the outlet, whereby the solid additive may be dropped, fed, or otherwise introduced into the bulk container 130.

The transfer mechanism 182 may also or instead include a pneumatic conveyance system, wherein pressurized gas, such as air, is utilized to move the solid additive from the delivery vehicle 180 to the bulk container 130. The pneumatic conveyance system may comprise a vacuum generator, such as may generate a vacuum operable to draw the solid additive from the delivery vehicle 180 and transfer the solid additive into the bulk container 130 via a conduit system.

The particulate material may be periodically delivered to the wellsite surface 101 via a delivery vehicle 190 comprising a container storing the particulate material. During delivery, the delivery vehicle 190 may be positioned adjacent the transfer mechanism 192, such as may permit the particulate material to be conveyed by the transfer mechanism 192 from the delivery vehicle 190 to the bulk container 140. For example, each delivery vehicle 190 may comprise a container having a lower portion with a tapered configuration terminating in one or more chutes. During delivery, the chutes may be disposed above the inlet portion of the transfer mechanism 192 and then opened to permit the particulate material to be dropped, fed, or otherwise introduced into the transfer mechanism 192.

The transfer mechanism 192 may include a metering feeder, a screw feeder, an auger, a bucket conveyor, and/or the like, and may extend between the delivery vehicle 190 and the bulk container 140 such that an inlet of the transfer mechanism 192 may be positioned generally below the delivery vehicle 190, and an outlet of the transfer mechanism 192 may be positioned generally above the bulk container 140. A blade extending along a length of the transfer mechanism 192, for example, may be operatively connected with a motor operable to rotate the blade, which may move the particulate material from the inlet to the outlet, whereby the particulate material may be dropped, fed, or otherwise introduced into the bulk container 140.

The transfer mechanism 192 may also or instead include a pneumatic conveyance system, wherein pressurized gas, such as air, is utilized to move the particulate material from the delivery vehicle 190 to the bulk container 140. The pneumatic conveyance system may comprise a vacuum generator, such as may generate a vacuum operable to draw the particulate material from the delivery vehicle 190 and transfer the particulate material into the bulk container 140 via a conduit system.

Although FIG. 1 shows each of the delivery vehicles 160, 170, 180, 190 as being larger than some of the corresponding bulk containers 110, 120, 130, 140, it is to be understood that each of the bulk containers 110, 120, 130, 140 may have a storage capacity that may be about equal to or greater than a storage capacity of the corresponding delivery vehicle 160, 170, 180, 190. Accordingly, each of the bulk containers 110, 120, 130, 140 may be operable to receive therein an entire quantity of the corresponding material transported by the corresponding delivery vehicle 160, 170, 180, 190.

Furthermore, as the bulk containers 110, 120, 130, 140 may be operable to store the plurality of materials, the mixing unit 200 may be operable to substantially continuously form the one or more fluid mixtures when one or more of the transfer mechanisms 106 is not transferring a corresponding material from a corresponding delivery vehicle 160, 170, 180, 190. In other words, each of the transfer mechanisms 106 may be operable to periodically or intermittently transfer the corresponding materials from the delivery vehicles 160, 170, 180, 190 to the corresponding bulk containers 110, 120, 130, 140 while, at the same time, the transfer mechanisms 104 may be operable to substantially continuously transfer the corresponding materials from the corresponding bulk containers 110, 120, 130, 140 to the mixing unit 200.

The wellsite system 100 may also comprise a power source 195, such as may be operable to provide centralized electric power distribution to the mixing unit 200 and/or other components of the wellsite system 100. The power source 195 may be or comprise an engine-generator set, such as may include a gas turbine generator, an internal combustion engine generator, and/or other sources of electric power. Electric power may be communicated between the power source 195 and the mixing unit 200 and/or other components of the wellsite system 100 via various electric conductors 197. The power source 195 may be disposed on a corresponding truck, trailer, and/or other mobile carrier, such as may permit its transportation to the wellsite surface 101. However, the power source 195 may be skidded or otherwise stationary, and/or may be temporarily or permanently installed at the wellsite surface 101.

The wellsite system 100 may include more than one power source 195, such as may permit each power source 195 to be positioned at a closer proximity to the point of power utilization. For example, one power source 195 may be utilized to power one or more of the plurality of transfer mechanisms 106, while another power source 195 may be utilized to power the mixing unit 200 and/or one or more of the other plurality of transfer mechanisms 104. Two or more power sources 195 may also provide redundancy to the wellsite system 100.

The mixing unit 200 comprises a rheology control portion 202. For example, the rheology control portion 202 may be operable disperse and hydrate the hydratable material within the hydrating fluid to form a first fluid mixture, such as may be or comprise that which is known in the art as a gel or a slurry.

The mixing unit 200 further comprises a high-volume solids blending portion 210. For example, the high-volume solids blending portion 210 may be operable to blend the discharge from the rheology control portion 202 with the liquid additives, the solid additives, and/or the particulate material to form a second fluid mixture, such as may be or comprise that which is known in the art as a fracturing fluid. The second fluid mixture may then be discharged from the mixing unit 200, such as for further processing and/or injection into a wellbore during fracturing and/or other wellsite operations.

The mixing unit 200 may further comprise a control portion 212. For example, the control portion 212 may be operable to monitor and control operational parameters of the plurality of components of the mixing unit 200, and perhaps other components of the wellsite system 100, to form the first and second fluid mixtures.

The wellsite system 100 is depicted in FIG. 1 and described above as being operable to store and mix the plurality of materials to form a fracturing fluid. However, it is to be understood that the wellsite system 100 may be operable to mix other fluids and materials to form other mixtures that may be pressurized and/or individually or collectively injected into the wellbore during other oilfield operations, such as drilling, cementing, acidizing, and/or water jet cutting operations, among other examples.

Figure 2:
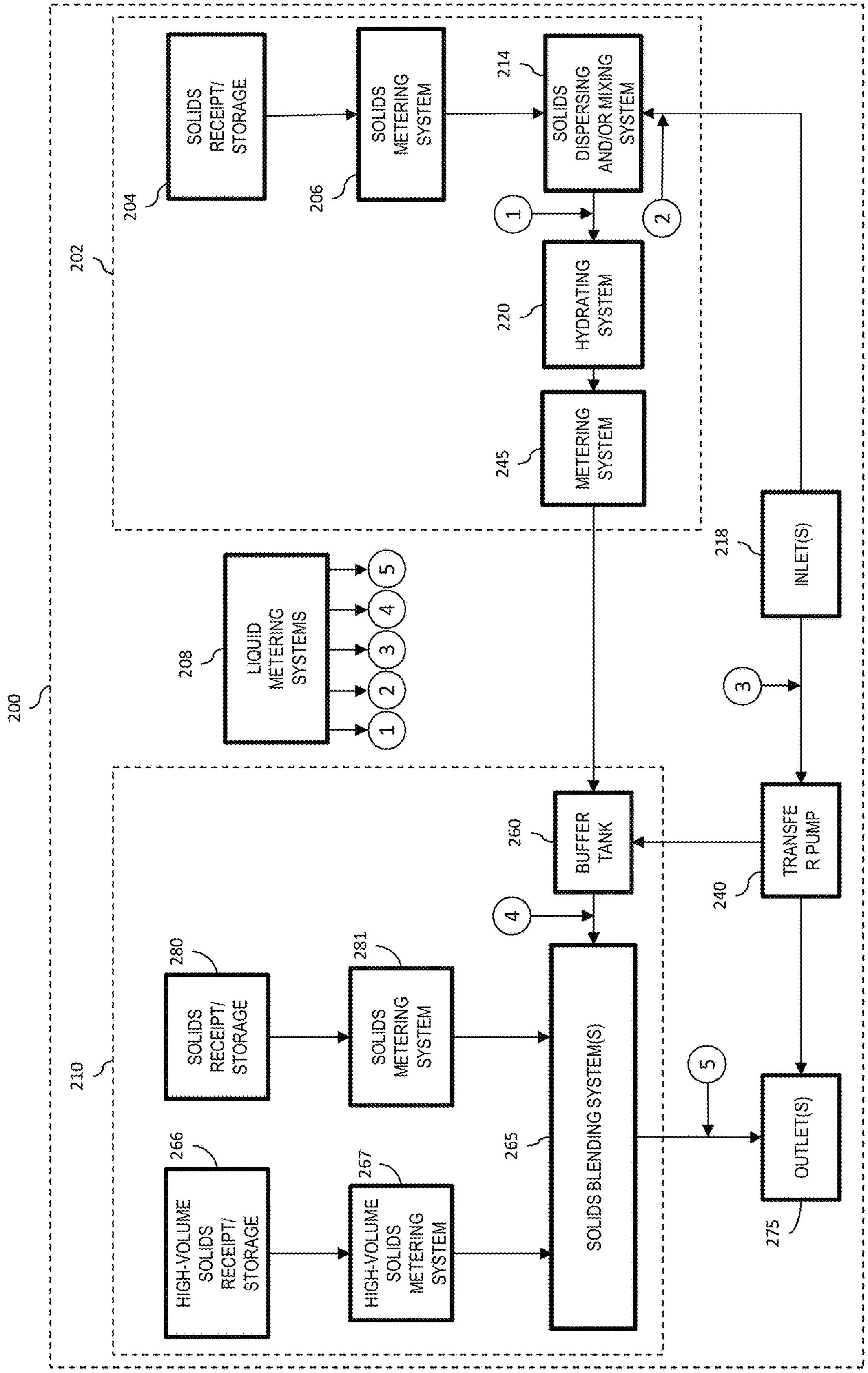
FIG. 2 is a schematic view of at least a portion of an example implementation of apparatus according to one or more aspects of the present disclosure.

FIG. 2 is a schematic view of at least a portion of an example implementation of the mixing unit 200 according to one or more aspects of the present disclosure. The mixing unit 200 may be utilized in various implementations of a wellsite. However, for the sake of clarity and ease of understanding, the mixing unit 200 is described below in the context of the wellsite system 100 shown in FIG. 1. Thus, the following description refers to FIGS. 1 and 2, collectively.

The mixing unit 200 may comprise means 204 for receiving and/or storing a first solid material. The first solid material may be directed to the receiving and/or storing means 204 via conventional and/or future-developed means. For example, the first solid material may be hydratable material received from the bulk container 110 via the transfer mechanism 112.

The first solid material may then be transferred to a solids dispersing and/or mixing system 214. Such transfer may be at a predetermined rate, such as via utilization of a solids metering system 206.

Water and/or other fluid may also be transferred to the solids dispersing and/or mixing system 214. For example, such fluid may be drawn or otherwise transferred from a suction manifold and/or other inlet(s) 218 of the mixing unit 200.

The solids dispersing and/or mixing system 214 may then be operated to disperse the first solid material within the fluid received from one or more of the inlets 218. For example, in implementations in which the first solid material is guar or other hydratable material, the solids dispersing and/or mixing system 214 may mix the hydratable material with water to form the first fluid mixture described above.

The fluid discharged from the solids dispersing and/or mixing system 214 may then be directed towards a hydrating system 220. For example, the hydrating system 220 may be a first-in-first-out (FIFO) tank system comprising one or more hydration tanks, and the first fluid mixture discharged from the solids dispersing and/or mixing system 214 may be directed through the one or more hydration tanks of the hydrating system 220 to permit hydration of the first fluid mixture.

In the example implementation depicted in FIGS. 1 and 2, the rheology control portion 202 of the mixing unit 200 includes the container 204, the solids metering system 206, the solids dispersing and/or mixing system 214, and the hydrating system 220. The rheology control portion 202 may also include a metering system 245 for metering the discharge of the rheology control portion 202. However, the hydrating system 220 and the metering system 245 are optional components, and may be omitted in some implementations of the rheology control portion 202.

The fluid discharged from the rheology control portion 202 may be transferred to the high-volume solids blending portion 210 of the mixing unit 200. For example, the fluid discharged from the rheology control portion 202 may be transferred into a buffer tank 260 of the high-volume solids blending portion 210. The mixing unit 200 may also comprise a transfer pump 240 operable to direct additional water (or other fluid from one or more of the inlets 218) to the buffer tank 260. The transfer pump 240 may also discharge to one or more outlets 275 of the mixing unit 200.

The high-volume solids blending portion 210 may comprise means 266 for receiving and/or storing high-volume solids. The high-volume solids may be directed to the receiving and/or storing means 266 via gravity feeding, such as from a storage silo located above the receiving and/or storing means 266. For example, the high-volume solids may be particulate material received from the bulk container 140.

The high-volume solids may then be transferred to a solids blending system 265. Such transfer may be at a predetermined rate, such as via utilization of a high-volume solids metering system 267. The high-volume solids blending portion 210 may include more than one solids blending system 265, and the transfer of the high-volume solids via the high-volume solids metering system 267 may be to one or more of the solids blending systems 265.

The high-volume solids blending portion 210 may also comprise means 280 for receiving and/or storing a second solid material. The second solid may be directed to the receiving and/or storing means 280 conventional or future-developed means. For example, the second solid material may be received from the bulk container 130 via the transfer mechanism 132.

The second solid material may then be transferred to one or more of the solids blending systems 265. Such transfer may be at a predetermined rate, such as via utilization of another solids metering system 281.

One or more of the solids blending systems 265 may then be operated to blend two or more of: the discharge from the rheology control portion 202 (such as via the buffer tank 260); the high-volume solids, and the second solid material. For example, in implementations in which the discharge from the rheology control portion 202 is hydrated gel and the high-volume solids comprise proppant or other particulate material, one or more of the solids blending systems 265 may mix the hydrated gel with the particulate material to form the second fluid mixture described above.

The fluid discharged from the high-volume solids blending portion 210 may be discharged from the mixing unit 200 via one or more of the outlets 275. Different ones of the outlets 275 may be utilized for different mixtures discharged by the solids blending systems 265. The mixtures discharged from the solids blending systems 265 may be combined or kept separate prior to communication to the one or more outlets 275 for discharge from the mixing unit 200.

The mixing unit 200 may also comprise one or more liquid metering systems 208 for selectively introducing one or more liquid additives into the operations described above. For example, the liquid metering systems 208 may selectively introduce one or more liquid additives into the fluid flowing from one or more of the inlets 218 into the solids dispersing and/or mixing system 214. The liquid metering systems 208 may also or instead selectively introduce one or more liquid additives into the first fluid mixture discharged from the solids dispersing and/or mixing system 214, such as upstream of the hydrating system 220. The liquid metering systems 208 may also or instead selectively introduce one or more liquid additives into the fluid flowing from one or more of the inlets 218 into the transfer pump 240. The liquid metering systems 208 may also or instead selectively introduce one or more liquid additives into the fluid discharged from the rheology control portion 202 for utilization in one or more of the solids blending systems 265, such as downstream of the buffer tank 260. The liquid metering systems 208 may also or instead selectively introduce one or more liquid additives into the fluid discharged from the high-volume solids blending portion 210. However, these are merely examples, and the liquid metering systems 208 may introduce one or more liquid additives at locations other than as described above and shown in FIG. 2.

Figure 3:
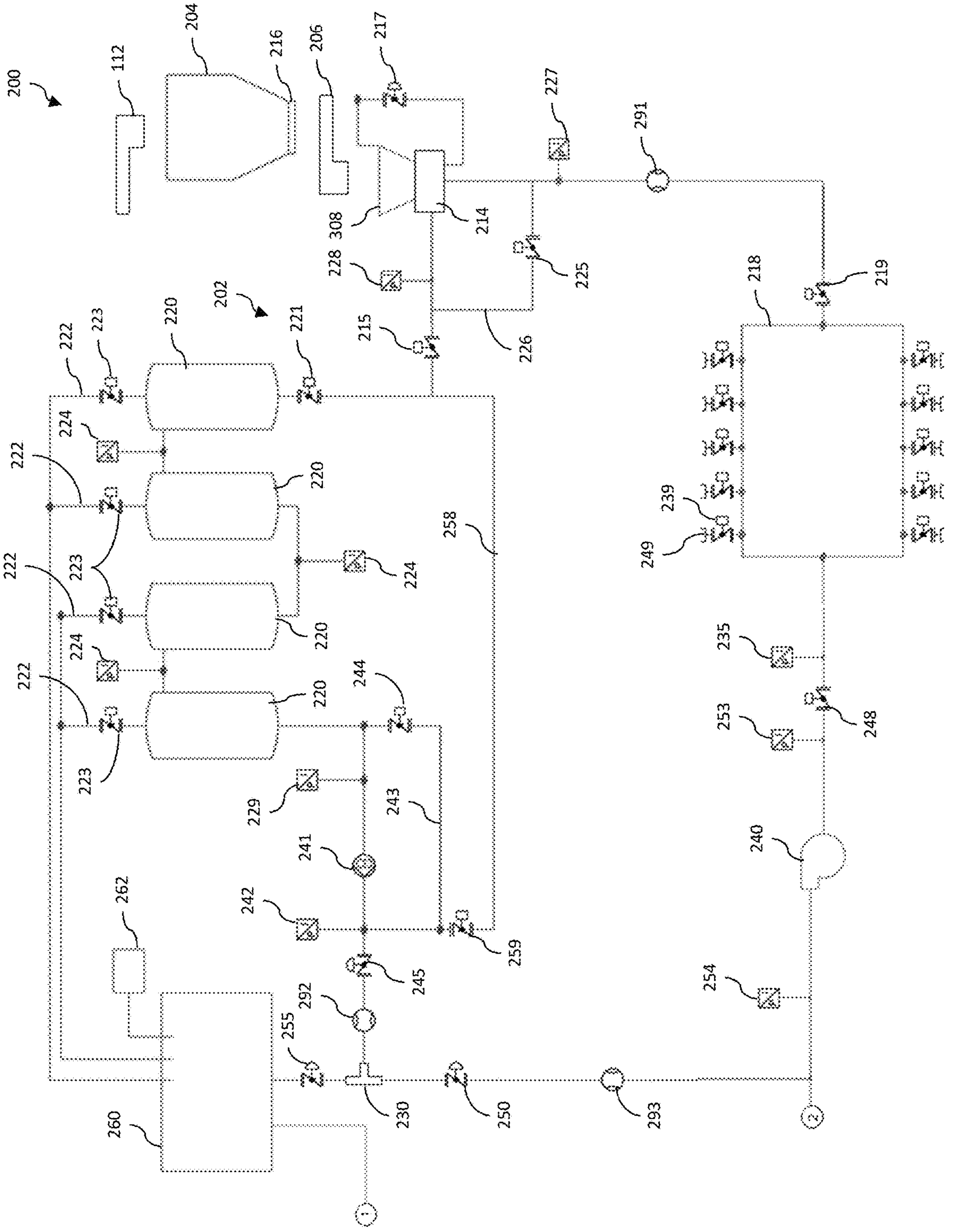
FIG. 3 is a schematic view of a portion of an example implementation of the apparatus shown in FIG. 2 according to one or more aspects of the present disclosure.
Figure 4:
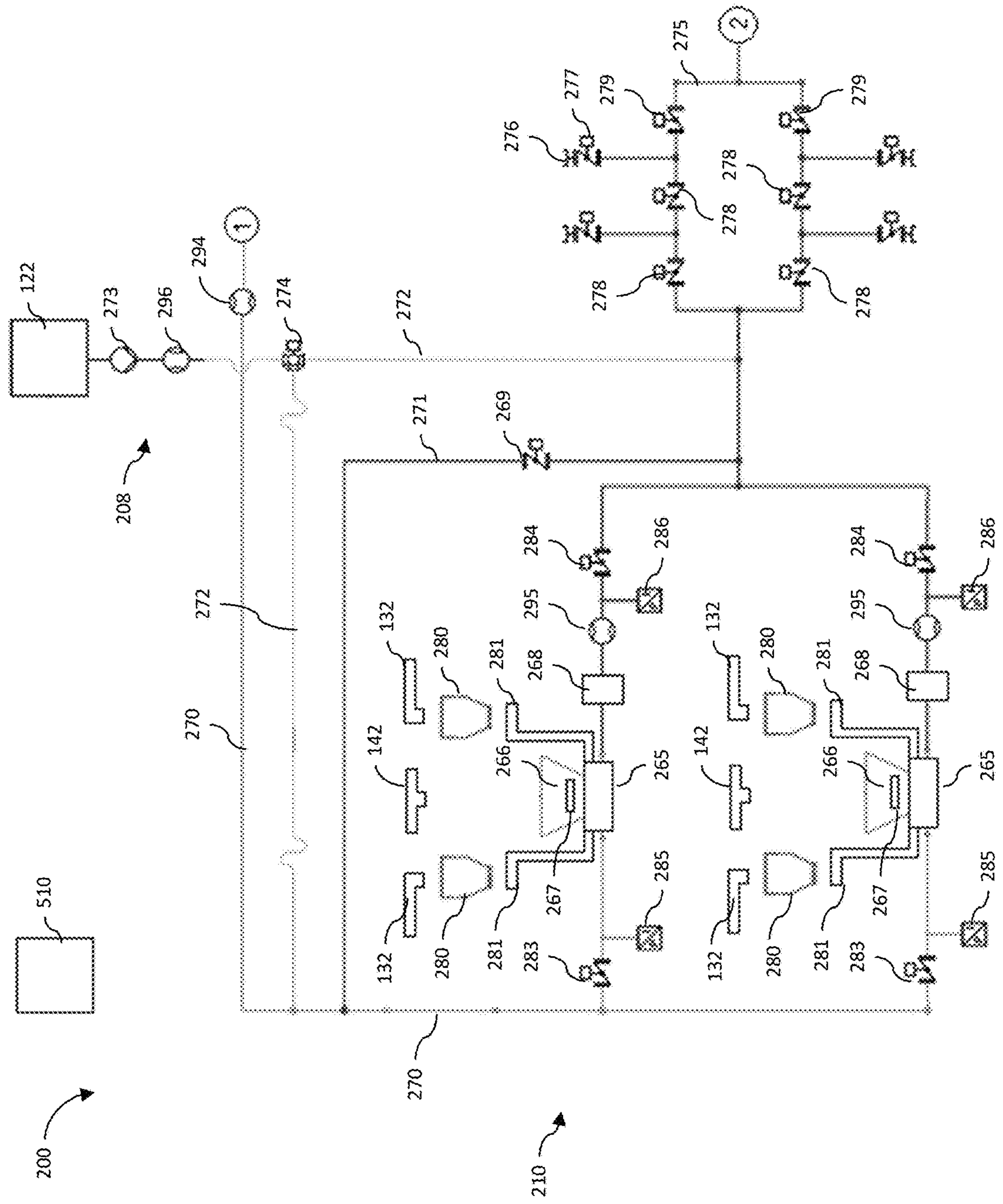
FIG. 4 is a schematic view of a portion of an example implementation of the apparatus shown in FIG. 2 according to one or more aspects of the present disclosure.

FIGS. 3 and 4 are collectively a schematic view of at least a portion of an example implementation of the mixing unit 200 shown in FIG. 2. FIG. 3 generally depicts the rheology control portion 202, and FIG. 4 generally depicts the high-volume solids blending portion 210. For the sake of clarity and ease of understanding, the mixing unit 200 is also described below in the context of the wellsite system 100 shown in FIG. 1. Thus, the following description refers to FIGS. 1-4, collectively.

FIG. 3 depicts the receiving and/or storing means 204 as being implemented as a hydratable material container 204, depicts the solids metering system 206 as being implemented as a hydratable material transfer device 206, and depicts the solids dispersing and/or mixing system 214 as being implemented as a first mixer 214 operable to receive and mix hydratable material and hydrating fluid. For example, the hydratable material may be mixed with the hydrating fluid at a rate of about 120 pounds of hydratable material per about 1000 pounds of hydrating fluid, thus forming a 120-pound first fluid mixture. However, the fluid formed and discharged by the first mixer 214 may have between about 80 and about 300 pounds of hydratable material per 1000 gallons of hydrating fluid, among other ratios also within the scope of the present disclosure.

The first mixer 214 may receive the hydratable material from the hydratable material container 204. The hydratable material container 204 may comprise a silo, bin, hopper, and/or another container that may permit storage of the hydratable material so as to provide a substantially continuous supply of the hydratable material to the first mixer 214. A lower portion of the hydratable material container 204 may have a tapered configuration terminating with a gate or other outlet permitting the hydratable material to be gravity fed and/or otherwise substantially continuously transferred into the first mixer 214. The hydratable material may be continuously or intermittently transported to the hydratable material container 204 from the bulk container 110 via the transfer mechanism 112.

The hydratable material may be metered and/or otherwise transferred to the first mixer 214 via the hydratable material transfer device 206. For example, if the hydratable material substantially comprises a liquid, the hydratable material transfer device 206 may comprise a metering pump and/or a metering valve, such as may be operable to control the flow rate at which the hydratable material is introduced into the first mixer 214.

However, if the hydratable material substantially comprises solid or encapsulated particles, the hydratable material transfer device 206 may comprise a volumetric or mass dry metering device operable to control the volumetric or mass flow rate of the hydratable material fed from the hydratable material container 204 to the first mixer 214. In such implementations, the hydratable material transfer device 206 may include a metering feeder, a screw feeder, an auger, a conveyor, and/or the like, and may extend between the hydratable material container 204 and the first mixer 214 such that an inlet of the hydratable material transfer device 206 may be positioned generally below the hydratable material container 204, and an outlet of the hydratable material transfer device 206 may be positioned generally above the first mixer 214. A blade extending along a length of the hydratable material transfer device 206, for example, may be operatively connected with a motor operable to rotate the blade. As the first mixer 214 is operating, the rotating blade may move the hydratable material from the inlet to the outlet, whereby the hydratable material may be dropped, fed, or otherwise introduced into the first mixer 214.

In implementations in which the first mixer 214 is utilized to mix hydratable material and hydrating fluid to form a gel, for example, the first mixer 214 may be a vortex type mixer as further described below. However, as generally described above with respect to FIG. 2, it is to be understood that the first mixer 214 may be implemented as a chemical mixer or other "rheology modifier" operable to mix various rheology modifying materials, such as may include additives that provide high viscosity at low shear rates. Such rheology modifiers may include the hydratable material utilized to form gel, as described above. The rheology modifiers may also include additives like fiber, nanoscale particles, dry friction reducers, dimeric and trimeric fatty acids, imidazolines, amides, and/or synthetic polymers, among other examples within the scope of the present disclosure. In such implementations, the first mixer 214 may be a vortex type mixer and/or other types of mixers.

Although not depicted in FIG. 3, the mixing unit 200 may comprise more than one hydratable material container 204 and corresponding transfer devices 206. For example, the mixing unit 200 may comprise a first hydratable material container 204 storing hydratable material that substantially comprises liquid, and a second hydratable material container 204 storing hydratable material that substantially comprises solid particles. In such implementations, the hydratable material transfer device 206 corresponding to the first hydratable material container 204 may comprise a metering pump and/or a metering valve, and the hydratable material transfer device 206 corresponding to the second hydratable material container 204 may comprise a volumetric or mass dry metering device.

The hydratable material container 204 may comprise one or more force sensors 216, such as load cells and/or other sensors operable to generate information related to mass or another parameter indicative of the quantity of the hydratable material within the hydratable material container 204. Such information may be utilized to monitor the actual transfer rate of the hydratable material from the hydratable material container 204 into the first mixer 214, to monitor the accuracy of the hydratable material transfer device 206, and/or to control the transfer rate of the hydratable material discharged from the hydratable material container 204 and/or the hydratable material transfer device 206 for feeding to the first mixer 214.

FIG. 3 depicts the one or more inlets 218 of the mixing unit 200 as being implemented as a hydrating fluid source 218, such as may be operable to receive the hydrating fluid from the bulk container 150 via the transfer mechanism 152. The hydrating fluid source 218 may comprise a receptacle, storage tank, reservoir, conduit, manifold, and/or other component for storing and/or receiving the hydrating fluid. For example, the hydrating fluid source 218 may comprise a plurality of inlet ports 249, such as may be operable to fluidly connect with the transfer mechanism 152 and receive the hydrating fluid from the bulk container 150.

The supplied hydrating fluid may be drawn into the first mixer 214 via a suction force generated by an impeller and/or other internal component of the first mixer 214. The suction force may be sufficient to communicate the hydrating fluid from the hydrating fluid source 218 to the first mixer 214. However, communication of the hydrating fluid from the hydrating fluid source 218 to the first mixer 214 may instead or also be facilitated by a pump (not shown), such as may be operable to pressurize and/or move the hydrating fluid from the hydrating fluid source 218 to the first mixer 214.

The mixing unit 200 may further comprise a plurality of valves operable to control flow of the hydrating fluid, a concentrated first fluid mixture discharged from the first mixer 214, or a diluted supply of the first fluid mixture, depending on their location. The valves may comprise ball valves, globe valves, butterfly valves, and/or other types of valves operable to shut off fluid flow or otherwise control fluid flow therethrough. The valves may be actuated remotely by an electric actuator, such as a solenoid or motor, or by a fluid actuator, such as a pneumatic cylinder or rotary actuator. The valves may also be manually actuated by a human operator. For example, the inlet ports 249 may be selectively opened and closed by a plurality of corresponding valves 239 disposed at each of the inlet ports 249, such as may selectively permit the transfer of hydrating fluid into the hydrating fluid source 218. Similarly, another valve 219 may be fluidly connected between the hydrating fluid source 218 and the first mixer 214, such as may be operable to shut off or otherwise control the flow of the hydrating fluid to the first mixer 214.

The mixing unit 200 may further comprise a plurality of pressure sensors operable to generate electric signals or information related to pressure of the hydrating fluid, the concentrated first fluid mixture, or the diluted first fluid mixture, at various locations on the mixing unit 200. For example, a pressure sensor 227 may be disposed at the inlet of the first mixer 214, such as may be operable to generate signals or information related to pressure of the hydrating fluid at the inlet of the first mixer 214.

The mixing unit 200 may also comprise a plurality of flow meters operable to generate electric signals or information related to flow rates of selected fluids at a plurality of locations on the mixing unit 200. For example, a flow meter 291 may be disposed between the hydrating fluid source 218 and the first mixer 214, such as may facilitate monitoring the flow rate of the hydrating fluid introduced into the first mixer 214.

Figure 5:
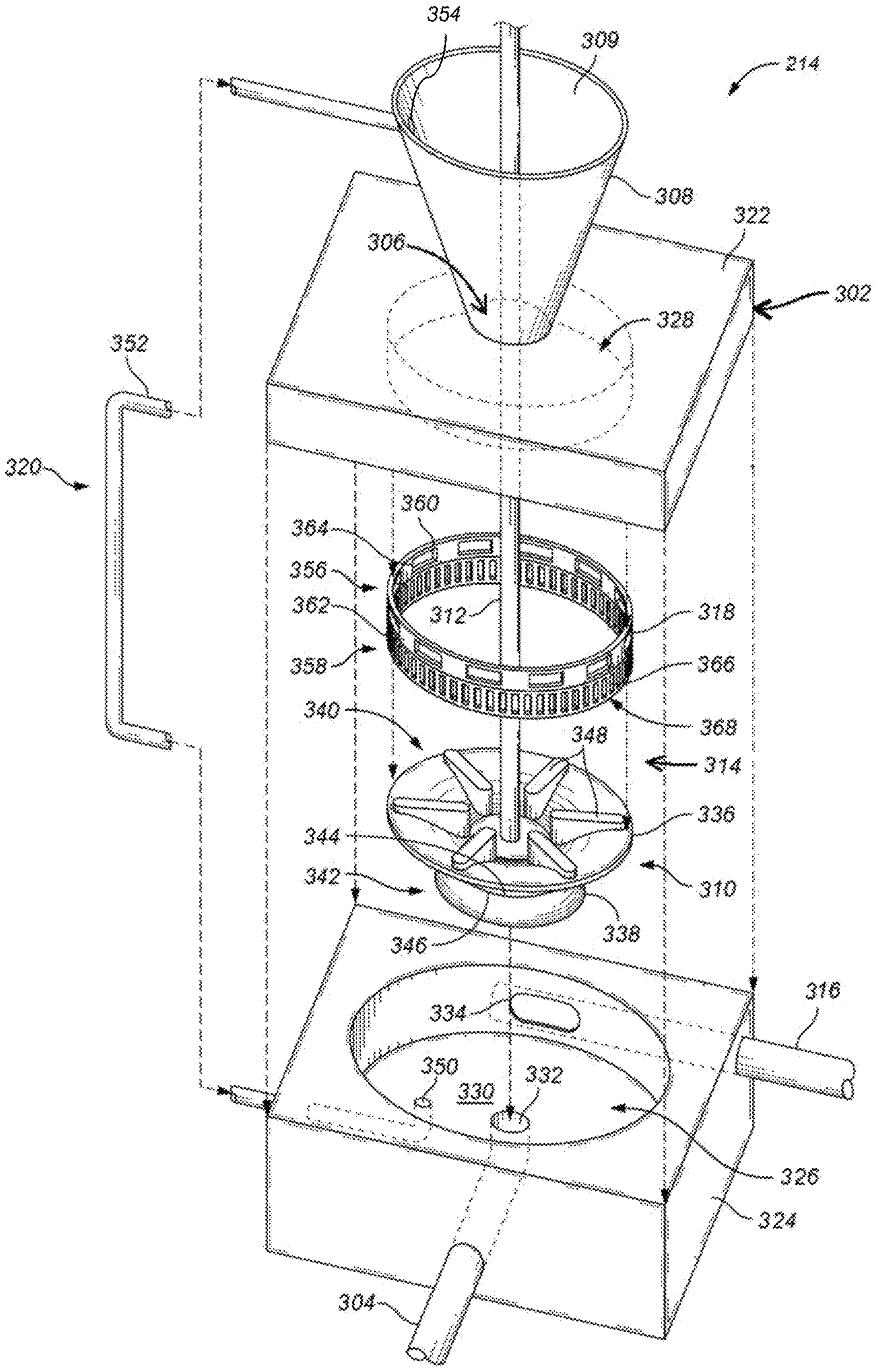
FIG. 5 is an expanded view of an example implementation of a portion of the apparatus shown in FIG. 2 according to one or more aspects of the present disclosure.

The first mixer 214 may be operable to mix the hydratable material and the hydrating fluid, and to pressurize the resulting first fluid mixture sufficiently to pump the first fluid mixture through the hydrating system 220. FIG. 5 is an expanded view of an example implementation of at least a portion of the first mixer 214 according to one or more aspects of the present disclosure. The following description refers to FIGS. 3 and 5, collectively.

The first mixer 214 may include a housing 302, a fluid inlet 304, and a material inlet 306 extending into the housing 302. The fluid inlet 304 may be fluidly connected with the hydrating fluid source 218 for receiving hydrating fluid therefrom. The material inlet 306 may generally include or operate in conjunction with a receiving structure 308, which may be or include a cone, chamber, bowl, hopper, or the like. The receiving structure 308 may have an inner surface 309 that receives materials (such as hydratable material transferred from the hydratable material container 204 via the hydratable material transfer device 206) for transfer into the housing 302. The materials may be dry, partially dry, crystallized, fluidic, pelletized, encapsulated, and/or packaged materials, or may be liquid or slurry materials, and/or other materials to be dispersed within and/or otherwise mixed within the first mixer 214. The materials received through the material inlet 306 may also be pre-wetted, perhaps forming a partial slurry, such as to avoid fisheyes and/or material buildup.

The first mixer 214 may further comprise an impeller/slinger assembly 310 driven by a shaft 312. The housing 302 may define a mixing chamber 314 in communication with the inlets 304, 306, and the impeller/slinger assembly 310 may be disposed in the mixing chamber 314. Rotation of the impeller/slinger assembly 310 may draw the hydrating fluid from the fluid inlet 304, mix the drawn hydrating fluid with the material fed from the material inlet 306 within the mixing chamber 314, and pump the resulting first fluid mixture through the outlet 316. The outlet 316 may direct the first fluid mixture through one or more fluid conduits into the hydrating system 220.

The shaft 312 may extend upward through the inlet 306 and out of the receiving structure 308 for connection with an electric motor and/or other prime mover (not shown in FIG. 5). The shaft 312 may be connected with the impeller/slinger assembly 310 such that rotation of the shaft 312 rotates the impeller/slinger assembly 310 within the mixing chamber 314.

The first mixer 214 may also include a stator 318 disposed around the impeller/stator assembly 310. The stator 318 may be in the form of a ring or arcuate portion, example details of which are described below.

The first mixer 214 may further comprise a flush line 320 fluidly connected between the receiving structure 308 and an area of the mixing chamber 314 that is proximal to the impeller/slinger assembly 310. The flush line 320 may tap the hydrating fluid from the mixing chamber 314 at an area of relatively high pressure and deliver it to the inner surface 309 of the receiving structure 308, which may be at a reduced (e.g., ambient) pressure. In addition to being at the relatively high pressure, the hydrating fluid tapped by the flush line 320 may be relatively "clean" (i.e., relatively low additives content, as will be described below). As such, the hydrating fluid tapped by the flush line 320 may be utilized to pre-wet the receiving structure 308 and promote the avoidance of clumping of the material being fed through the receiving structure 308. The flush line 320 may provide the pre-wetting fluid without utilizing additional pumping devices (apart from the pumping provided by the impeller/slinger assembly 310) or additional sources of hydrating fluid or lines from the hydrating fluid source 218. However, one or more pumps may be provided in addition to or in lieu of tapping the hydrating fluid from the mixing chamber 314.

The housing 302 may comprise an upper housing portion 322 and a lower housing portion 324. Connection of the upper and lower housing portions 322, 324 may define the mixing chamber 314 therebetween. The lower housing portion 324 may define a lower mixing area 326, and the upper housing portion 322 may define an upper mixing area 328 (shown in phantom lines) that may be substantially aligned with the lower mixing area 326. The mixing areas 326, 328 may together define the mixing chamber 314 in which the impeller/slinger assembly 310 and the stator 318 may be disposed. The lower housing portion 324 may also include an interior surface 330 defining the bottom of the lower mixing area 326.

The upper housing portion 322 may be connected with the receiving structure 308, and may provide the material inlet 306. The lower housing portion 324 may include the fluid inlet 304, which may extend through the lower housing portion 324 to a generally centrally disposed opening 332.

The opening 332 may be defined in the interior surface 330. The outlet 316 may extend from an opening 334 communicating with the lower mixing area 326.

The impeller/slinger assembly 310 may include a slinger 336 and an impeller 338. The slinger 336 and the impeller 338 may have inlet faces 340, 342, respectively, and backs 344, 346, respectively. The inlet faces 340, 342 may be each be open (as shown) or at least partially covered by a shroud (not shown), which may form an inlet in the radially inner part of the slinger 336 and/or impeller 338. The backs 344, 346 may be disposed proximal to one another and connected together, such that, for example, the impeller 338 and the slinger 336 may be disposed in a "back-to-back" configuration. Thus, the inlet face 340 of the slinger 336 may face the material inlet 306, while the inlet face 342 of the impeller 338 may face the fluid inlet 304. Accordingly, the inlet face 342 of the impeller 338 may face the interior surface 330, and the opening 332 defined on the interior surface 330 may be aligned with a radially central portion of the impeller 338.

The slinger 336 may substantially define a saucer-shape generally having a flatter (or flat) middle portion with arcuate or slanted sides, collectively forming at least a portion of the inlet face 340. The sides may be formed, for example, as similar to or as part of a torus that extends around the middle of the slinger 336. The slinger 336 may also be bowl-shaped (e.g., generally a portion of a sphere). The slinger 336 includes six slinger blades 348 on the inlet face 340, although other numbers of blades 348 are also within the scope of the present disclosure. The blades 348 may extend radially in a substantially straight or curved manner. As the slinger 336 rotates, the material received from the material inlet 306 is propelled radially outward, by interaction with the blades 348, and axially upward, as influenced by the shape of the inlet face 340.

Although obscured from view in FIG. 5, the impeller 338 may also include one or more blades on the inlet face 342. Rotation of the impeller 338 may draw hydrating fluid through the opening 332 and then expel the hydrating fluid axially downward and radially outward. Consequently, a region of relatively high pressure may develop between the lower housing portion 324 and the impeller 338, which may act to drive the hydrating fluid around the mixing chamber 314 and toward the slinger 336.

The flush line 320 may include an opening 350 defined in the lower housing portion 324 proximal to this region of high pressure. For example, the opening 350 may be defined in the interior surface 330 at a position between the outer radial extent of the impeller 338 and the opening 332 of the fluid inlet 304. The flush line 320 may be or comprise a conduit 352 fluidly connected with an inlet 354 of the receiving structure 308, for example, such that hydrating fluid is transported from the opening 350 into the receiving structure 308 via the conduit 352. The hydrating fluid may then travel along a generally helical path along the inner surface 309 of the receiving structure 308, as a result of the rotation of the slinger 336 and/or the shaft 312, until the hydrating fluid travels through the material inlet 306 to the slinger 336. Thus, the hydrating fluid received through the inlet 354 may generally form a wall of fluid along the inner surface 309 of the receiving structure 308.

The flow rate of the hydrating fluid through the conduit 352 and, thus, along the inner surface 309 of the receiving structure 308, may be increased and decreased by a flow control device 217 (shown in FIG. 3). The flow control device 217 may comprise one or more of various types of flow control valves, including needle valves, metering valves, butterfly valves, globe valves, or other valves operable to control the rate of fluid flow.

During operation, a pressure gradient may develop between the impeller 338 and the lower housing portion 324, with the pressure in the fluid increasing radially outward from the opening 332. Another gradient related to the concentration of the material (from the material inlet 306) in the hydrating fluid may also develop in this region, with the concentration of material increasing radially outward. In some cases, a high-pressure head and low concentration may be the intended, so as to provide a flow of relatively clean fluid through the flush line 320, propelled by the impeller/slinger assembly 310. Accordingly, the opening 350 for the flush line 320 may be disposed at a point along this region that realizes an optimal tradeoff between pressure head of the hydrating fluid and concentration of the material from inlet 306 in the hydrating fluid received into the flush line 320.

The stator 318 may form a shearing ring extending around the impeller/slinger assembly 310 within the mixing chamber 314. For example, the stator 318 may be held generally stationary with respect to the rotatable impeller/slinger assembly 310, such as via fastening with the upper housing portion 322. However, the stator 318 may instead be supported by the impeller/slinger assembly 310 and may rotate therewith. In either of these example implementations, the stator 318 may ride on the inlet face 340 of the slinger 336, or may be separated therefrom.

The stator 318 may include first and second annular portions 356, 358, which may be formed integrally or as discrete components connected together. The first annular portion 356 may minimize flow obstruction and may include a shroud 360 and posts 362 defining relatively wide slots 364, such as to permit relatively free flow of fluid therethrough. In contrast, the second annular portion 358 may maximize flow shear, such as to promote turbulent mixing. For example, the second annular portion 358 may comprise a series of stator vanes 366 that are positioned closely together, in contrast to the wide spacing of the posts 362 of the first annular portion 356. Thus, narrow flowpaths 368 may be defined between the stator vanes 366, in contrast to the wide slots 364 of the first annular portion 356.

The sum of the areas of the flowpaths 368 may be less than the sum of the areas of the stator vanes 366. The ratio of the collective flow-obstructing area of the stator vanes 366 to the collective flow-permitting area of the flowpaths 368 may be about 1.5:1, for example. However, the ratio may range between about 1:2 and about 4:1, among other examples within the scope of the present disclosure. The flow-obstructing area of each stator vane 366 may be greater than the flow-permitting area of each flowpath 368.

The stator vanes 366 may be disposed at various pitch angles with respect to the circumference of the stator 318. For example, the axially extending surfaces of the stator vanes 366 may be substantially straight (e.g., substantially parallel to the diameter of the stator 318) or slanted (e.g., to increase shear), whether in or opposite the direction of rotation of the impeller/slinger assembly 310.

Returning to FIG. 3, the first mixer 214 may discharge the first fluid mixture, hereinafter referred to as a concentrated first fluid mixture, under pressure into the hydrating system 220. The hydrating system 220 is depicted in FIG. 3 as being implemented as a plurality of first containers 220. A valve 215 may be fluidly connected downstream from the first mixer 214, such as may be operable to fluidly isolate the first mixer 214 from other portions of the mixing unit 200 and/or to control the flow of the concentrated first fluid mixture discharged from the first mixer 214. Another valve 225 may be fluidly connected along a fluid bypass conduit 226, such as may permit hydrating fluid or other fluid to bypass the first mixer 214 during mixing or other operations, such as during flushing operations. Another valve 221 may be fluidly connected upstream from the first containers 220, such as may be operable to control the flow of the concentrated first fluid mixture into the first containers 220. A pressure sensor 228 may be disposed at the outlet of the first mixer 214, such as may be operable to generate signals or information related to pressure of the concentrated first fluid mixture at the outlet of the first mixer 214.

Each of the first containers 220 may be or comprise a continuous flow channel or pathway for communicating or conveying the concentrated first fluid mixture over a period of time sufficient to permit adequate hydration to occur, such that the concentrated first fluid mixture may reach a predetermined level of hydration and/or viscosity. Each first container 220 may have a first-in-first-out mode of operation, and may comprise a vessel-type outer housing enclosing a receptacle having an elongated flow pathway or space operable to store and communicate the concentrated first fluid mixture therethrough.

Figure 6:
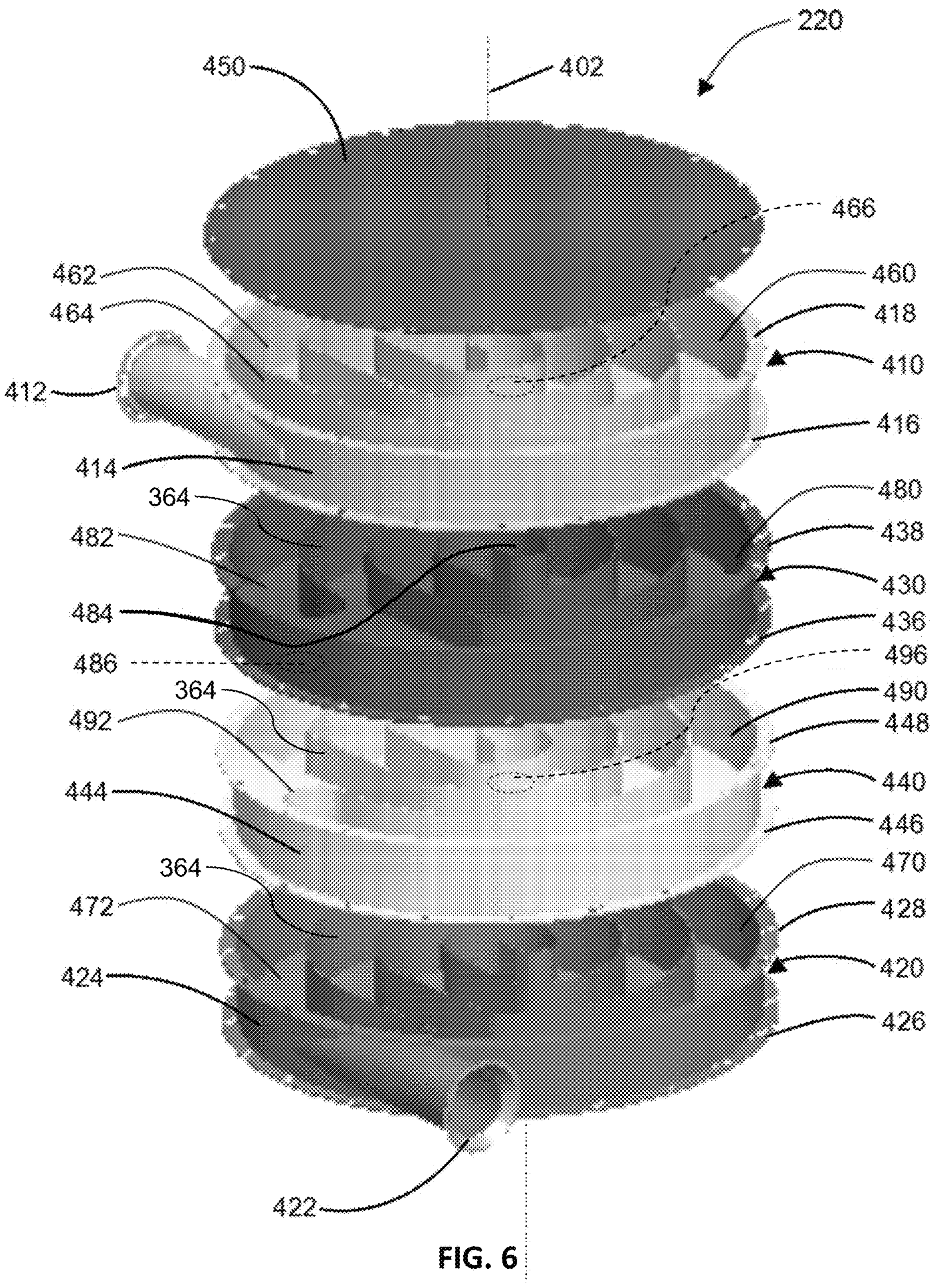
FIG. 6 is an expanded view of an example implementation of a portion of the apparatus shown in FIG. 2 according to one or more aspects of the present disclosure.

FIG. 6 is an expanded view of an example implementation of the first container 220 according to one or more aspects of the present disclosure. The first container 220 may comprise a plurality of enclosures 410, 420, 430, 440, which include a first enclosure 410, a second enclosure 420, and one or more intermediate enclosures 430, 440. The first container 220 may further comprise a first port 412 disposed on an outer wall 414 of the first enclosure 410 and operable to receive the concentrated first fluid mixture, and a second port 422 disposed on an outer wall 424 of the second enclosure 420 and operable to discharge the concentrated first fluid mixture after hydration. The ports 412, 422 may be flush with or extend outward from the outer walls 414, 424, including implementations in which the ports 412, 422 extend outward in a tangential direction relative to the outer walls 414, 424.

The enclosures 410, 420, 430, 440 may comprise separate chambers through which the concentrated first fluid mixture may travel a distance over a time period sufficient for adequate hydration to occur. The enclosures 410, 420, 430, 440 may collectively be in fluid communication, such as may permit the concentrated first fluid mixture to be introduced into the first container 220 via the first port 412 and then flow successively through the first enclosure 410, the intermediate enclosure 430, the intermediate enclosure 440, and the second enclosure 420, and then be discharged through the second port 422.

The first container 220 may further comprise a first plate 450 connected to the first enclosure 410, such as to confine the concentrated first fluid mixture within the first enclosure 410 while passing through the first enclosure 410. The first plate 450 may be connected to the first enclosure 410 by various means, including removable fasteners attaching with a flange 418 of the first enclosure 410, welding, and/or other means, or may be formed as an integrated portion of the first enclosure 410. The enclosures 410, 420, 430, 440 may be connected with one another by same or similar means. For example, each of the enclosures 410, 420, 430, 440 may comprise a flange 416, 418, 426, 428, 436, 438, 446, 448 extending along the top and bottom of the outer walls 414, 424, 434, 444, such as for receiving threaded fasteners and/or other means for securing the enclosures 410, 420, 430, 440 with one another.

Each of the enclosures 410, 420, 430, 440 may comprise an interior space 460, 470, 480, 490. Each interior space 460, 470, 480, 490, may be or define at least one continuous fluid flow channel or other passageway 462, 472, 482, 492, respectively, each having a length greater than the circumferential length of the corresponding outer wall 414, 424, 434, 444. For example, each passageway 462, 472, 482, 492 may be defined within the corresponding interior space 460, 470, 480, 490 by a spiral or otherwise shaped wall 464. The passageways 462, 472, 482, 492 may be orientated and connected such that the first and second ports 412, 422 are in fluid communication.

For example, during hydration operations, the concentrated first fluid mixture may be introduced into the first port 412, travel through the passageway 462, and exit or otherwise discharge from the first enclosure 410 at a substantially central port 466 (shown in phantom lines). The concentrated first fluid mixture may then flow into the first intermediate enclosure 430 at a central end 484 of the passageway 482, travel through the passageway 482, and exit from the first intermediate enclosure 430 into the second intermediate enclosure 440 through a port 486 (shown in phantom lines) extending vertically through the first intermediate enclosure 430. The concentrated first fluid mixture may then travel through the passageway 492 and exit from the second intermediate enclosure 440 into the second enclosure 420 through a port 496 (shown in phantom lines) extending vertically through the second intermediate enclosure 440. The concentrated first fluid mixture may then flow though the passageway 472 and exit through the second port 422.

Although FIG. 6 shows four enclosures 410, 420, 430, 440, the first container 220 may comprise one, two, three, five, or more enclosures within the scope of the present disclosure. Furthermore, although FIG. 3 shows four first containers 220, the mixing unit 200 may comprise one, two, three, five, or more first containers 220, which may be connected in parallel and/or series if, for example, additional flow rates and/or longer hydration times are intended.

When multiple first containers 220 are utilized, the mixing unit 200 may comprise a plurality of pressure sensors 224 operable to generate signals or information related to pressure between instances of the first containers 220. The information generated by the pressure sensors 224 may be utilized to determine the concentration, viscosity, and/or hydration level of the concentrated first fluid mixture as it is conveyed through the first containers 220. Another pressure sensor 229 may be disposed at the outlet of the most downstream first container 220, such as may be operable to generate signals or information related to pressure of the concentrated first fluid mixture at the outlet of the most downstream first container 220. Each of the first containers 220 may further comprise a relief or overflow conduit 222, which may be selectively opened and closed by a corresponding valve 223. When opened, each relief or overflow conduit 222 may be operable to relieve pressure or convey the concentrated first fluid mixture from a corresponding first container 220 into a second container 260.

In implementations of the mixing unit 200 that utilize multiple instances of the first containers 220, one or more in-line shearing and/or other mixing devices (not shown) may be fluidly connected between the first containers 220, such as to increase the rate of hydration within one or more of the first containers 220. Heat rejected from one or more components of the mixing unit 200 and/or other components of the wellsite system 100, such as engines or motors, may also or instead be transferred to one or more of the first containers 220, such as to heat the concentrated first fluid mixture within the one or more first containers 220 to expedite hydration.

Although the mixing unit 200 is shown comprising the hydrating system/first containers 220, some implementations of the mixing unit 200 may omit the hydrating system/first containers 220. For example, certain jobs or applications utilize solid materials or rheology modifiers that do not utilize hydration or hydration time. Accordingly, the concentrated first fluid mixture discharged from the first mixer 214 may bypass the hydrating system/first containers 220, or the hydrating system/first containers 220 may be omitted from the mixing unit 200.

Figure 7:
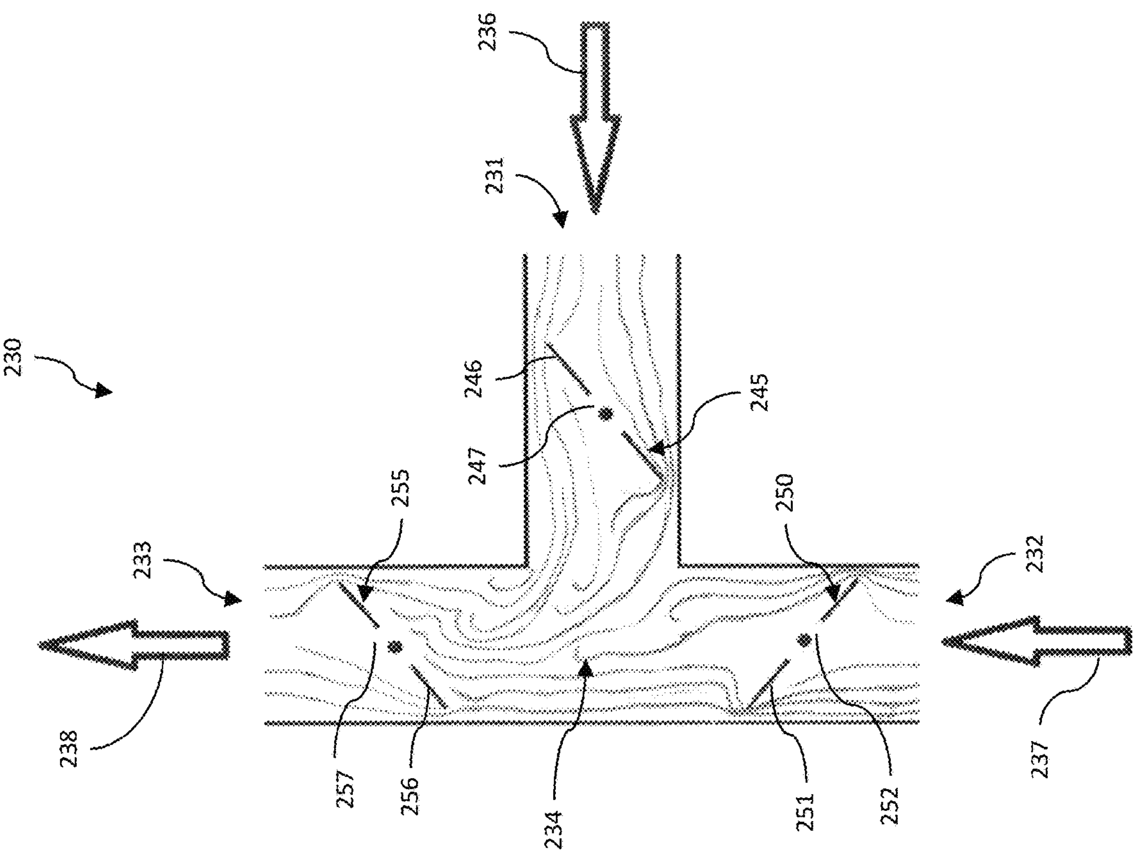
FIG. 7 is a schematic view of an example implementation of a portion of the apparatus shown in FIG. 3 according to one or more aspects of the present disclosure.

After the concentrated first fluid mixture is discharged from the first containers 220, the concentrated first fluid mixture may be transferred or communicated through a diluter 230. FIG. 7 is a schematic view of an example implementation of the diluter 230 according to one or more aspects of the present disclosure. Referring to FIGS. 3 and 7, collectively, the diluter 230 may be operable to mix or otherwise combine the concentrated first fluid mixture with additional hydrating fluid or other aqueous fluid to dilute the concentrated first fluid mixture or otherwise reduce the concentration of the hydratable material in the concentrated first fluid mixture to a predetermined concentration level. The diluter 230 may be or comprise a fluid junction, a tee connection, a wye connection, an eductor, a mixing valve, an inline mixer, and/or another device operable to combine and/or mix two or more fluids.

As depicted in the example implementation of FIG. 7, the diluter 230 may comprise a first passage 231 operable to receive a substantially continuous supply of the concentrated first fluid mixture, a second passage 232 operable to receive a substantially continuous supply of the hydrating fluid, and a third passage 233 operable to discharge a substantially continuously supply of a diluted first fluid mixture. The first passage 231 may be fluidly connected with the outlet port 422 of the most downstream first container 220 directly or via one or more conduits permitting the concentrated first fluid mixture to be transferred into the diluter 230, as indicated by arrow 236. The second passage 232 may be fluidly connected with the hydrating fluid source 218 via one or more conduits permitting the hydrating fluid to be transferred into the diluter 230, as indicated by arrow 237. The third passage 233 may be fluidly connected with an inlet of the second container 260 by one or more conduits permitting the diluted first fluid mixture to be transferred into the second container 260, as indicated by arrow 238.

The hydrating fluid may be communicated to the diluter 230 by the transfer pump 240, which may be operable to pressurize and/or move the hydrating fluid from the hydrating fluid source 218 to the diluter 230. The transfer pump 240 may be or comprise a centrifugal pump or another type of pump operable to transfer or otherwise substantially continuously move the hydrating fluid from the source 218 to the diluter 230 and/or other locations within the mixing unit 200. For example, the transfer pump 240 may move the hydrating fluid from the source 218 at a flow rate ranging between about zero barrels per minute (BPM) and about 150 BPM. However, the mixing unit 200 is scalable, and the transfer pump 240 may be operable at other flow rates.

The mixing unit 200 may also comprise a pressure sensor 235 at the outlet of the hydrating fluid source 218, such as may be operable to generate signals or information related to pressure of the hydrating fluid at the outlet of the hydrating fluid source 218. Another pressure sensor 253 may be disposed at the inlet of the transfer pump 240, such as may be operable to generate signals or information related to pressure of the hydrating fluid at the inlet of the transfer pump 240. A valve 248 may be fluidly connected between the transfer pump 240 and the hydrating fluid source 218, such as may be operable to control the flow of the hydrating fluid from the hydrating fluid source 218 to the transfer pump 240 and/or to fluidly isolate the hydrating fluid source 218 from the transfer pump 240. A pressure sensor 254 may also be disposed at the outlet of the transfer pump 240, such as may be operable to generate signals or information related to pressure of the hydrating fluid at the outlet of the transfer pump 240.

The ratio of the concentrated first fluid mixture and the hydrating fluid fed to the diluter 230, which determines the concentration of the resulting diluted first fluid mixture, may be controlled by adjusting the metering system 245, which is depicted in FIG. 3 as being implemented as a first flow control device 245 operable to control the flow of the concentrated first fluid mixture into the diluter 230. The ratio of the concentrated first fluid mixture and the hydrating fluid fed to the diluter 230 may also or instead be controlled by adjusting a second flow control device 250 operable to control the flow of the hydrating fluid into the diluter 230. For example, if the concentration of the diluted first fluid mixture is selected to be decreased for use downstream, relative to the current concentration of the diluted first fluid mixture being discharged from the diluter 230, the concentration of the diluted first fluid mixture may be decreased by decreasing the flow rate of the concentrated first fluid mixture into the diluter 230, via operation of the first flow control device 245, and/or by increasing the flow rate of the hydrating fluid into the diluter 230, via operation of the second flow control device 250. The flow rate of the concentrated first fluid mixture into the diluter 230 may be decreased by closing or otherwise reducing the flow area of the first flow control device 245, and the flow rate of the hydrating fluid into the diluter 230 may be increased by opening or otherwise increasing the flow area of the second flow control device 250.

Similarly, if the concentration of the diluted first fluid mixture is selected to be increased for use downstream, relative to the current concentration of the diluted first fluid mixture being discharged from the diluter 230, the concentration of the diluted first fluid mixture may be increased by increasing the flow rate of the concentrated first fluid mixture into the diluter 230 and/or by decreasing the flow rate of the hydrating fluid into the diluter 230. The flow rate of the concentrated first fluid mixture into the diluter 230 may be increased by opening or otherwise increasing the flow area of the first flow control device 245, and the flow rate of the hydrating fluid into the diluter 230 may be decreased by closing or otherwise decreasing the flow area of the second flow control device 250.

The first and second flow control devices 245, 250 may comprise various types of flow control valves, including needle valves, metering valves, butterfly valves, globe valves, or other valves operable to control the rate of fluid flow therethrough. Each of the flow control devices 245, 250 may comprise a flow-disrupting member 246, 251, such as may be a plate or other member having a substantially circular configuration, and perhaps having a central opening or passageway 247, 252 extending therethrough. The flow-disrupting members 246, 251 may be selectively rotatable relative to the passages 231, 232 to selectively change the effective flow area and/or rates of the passages 231, 232. Such rotation may be via operation of corresponding solenoids, motors, and/or other actuators (not shown). The flow-disrupting members 246, 251 may also be utilized to introduce turbulence in the passing fluid flow, such as may aid in mixing and/or further hydrating the diluted first fluid mixture discharged from the diluter 230.

FIG. 7 depicts the concentrated first fluid mixture being introduced into the diluter 230 via the first passage 231 of the diluter 230, and the hydrating fluid being introduced into the diluter 230 via the second passage 232. However, the concentrated first fluid mixture may instead be introduced via the second passage 232, and the hydrating fluid may instead be introduced via the first fluid passage 231.

As further shown in FIG. 3, a flow meter 292 may be disposed upstream of the first passage 231 of the diluter 230, such as may be operable to generate signals or information related to the flow rate of the concentrated first fluid mixture being introduced into the diluter 230. Another flow meter 293 may be disposed upstream of the second passage 232 of the diluter 230, such as may be operable to generate signals or information related to the flow rate of the hydrating fluid being introduced into the diluter 230.

The mixing unit 200 may comprise a metering pump 241 upstream or downstream of the first flow control device 245, such as may be operable to transfer the concentrated first fluid mixture from the first container 220 to the diluter 230 at a predetermined flow rate. The metering system 245 shown in FIG. 2 may include both the first flow control device 245 and the metering pump 241 shown in FIG. 3. In other implementations, however, the metering system 245 shown in FIG. 2 may include the metering pump 241 in lieu of the flow control device 245 shown in FIG. 3.

The metering pump 241 may be a lobe pump, a gear pump, a piston pump, or another type of positive displacement pump operable to move liquids at a selected flow rate. A pressure sensor 242 may be disposed at the outlet of the metering pump 241, such as may be operable to generate signals or information related to pressure of the concentrated first fluid mixture at the outlet of the metering pump 241.

The mixing unit 200 may further comprise a fluid bypass conduit 243 that may permit the concentrated first fluid mixture or other fluid to bypass the metering pump 241 during mixing or other operations, such as during flushing operations. A valve 244 may be fluidly connected along the fluid bypass conduit 243 to selectively open and close the fluid bypass conduit 243.

During mixing or other operations, the concentrated first fluid mixture may be recirculated through the first containers 220 via a recirculation flow path 258 comprising one or more pipes, hoses, and/or other fluid flow conduits, such as when an excess supply of the diluted first fluid mixture exists in the buffer tank 260, or to provide additional hydration time for the concentrated first fluid mixture. Accordingly, a valve 259 may be selectively opened to permit the concentrated first fluid mixture to recirculate through the recirculation flow path 258 and then the first containers 220. During such recirculation operations, the metering pump 241 may be operable to recirculate or otherwise move the concentrated first fluid mixture through the recirculation flow path 258 and the first containers 220.

A third flow control device 255 may be disposed at the discharge or downstream of the diluter 230. The third flow control device 255 may be operable to increase or decrease the output rate of the diluted first fluid mixture discharged from the diluter 230 and introduced into the buffer tank 260. It is noted that the combination of the first flow control device 245 and the metering pump 241 shown in FIG. 3, and/or other implementations of the metering system 245 shown in FIG. 2, may be further operable to increase and decrease the residence time of the concentrated first fluid mixture in the first containers 220 and, thus, increase the level of hydration and viscosity of the concentrated first fluid mixture discharged by the first containers 220. For example, slower flow rates may permit the concentrated first fluid mixture to remain in the first containers 220 for a longer period of time prior to introduction into the diluter 230 and/or the buffer tank 260.

Similarly to the first and second flow control devices 245, 250, the third flow control device 255 may comprise a flow-disrupting member 256, such as may comprise a plate or other member having a substantially circular configuration, and perhaps having a central opening or passageway 257 extending therethrough. The flow-disrupting member 256 may be selectively rotatable relative to the third passage 233 to selectively change the effective flow area and/or rate of the third passage 233, perhaps in a manner similar to the selective rotation of the flow-disrupting members 246, 251. The flow-disrupting member 256 may also be utilized to introduce turbulence in the passing fluid flow, such as may aid in mixing and/or further hydrating the diluted first fluid mixture communicated to the second container 260.

The diluted first fluid mixture discharged by the diluter 230 may be communicated to the buffer tank 260, such as for storing a supply of the diluted first fluid mixture prior to being utilized in the high-volume solids blending portion 210. The buffer tank 260 may also permit the diluted first fluid mixture to further hydrate prior to being discharged. The buffer tank 260 may be an open or enclosed vessel or tank comprising one or more spaces operable to receive and contain the diluted first fluid mixture. However, the buffer tank 260 may be omitted if sufficient hydration and/or viscosity level is achieved via one or more instances of the first container 220 and/or the diluter 230. In such implementations, the diluted first fluid mixture may be communicated directly to the high-volume solids blending portion 210.

The buffer tank 260 may comprise the same or similar structure and/or function as the first containers 220, or the buffer tank 260 may be implemented as another type of first-in-first-out vessel or tank, such as may provide additional hydration time for the diluted first fluid mixture. The buffer tank 260 may also comprise one or more fluid level sensors 262, such as may be operable to generate signals or information related to the amount of diluted first fluid mixture contained within the buffer tank 260.

As described above, FIG. 4 generally depicts high-volume solids blending portion 210 of the mixing unit 200. FIG. 4 depicts the solids blending systems 265 as being implemented as two second mixers 265 fluidly connected with the buffer tank 260 via one or more supply conduits 270. Each of the second mixers 265 may comprise the same or similar structure and/or function as the first mixer 214, depicted in FIG. 5 and described above. However, the second mixers 265 may omit the stator 218 and/or the flush line 320. The mixing unit 200 may also comprise one or more than two instances of the second mixers 265 within the scope of the present disclosure.

Similarly to the first mixer 214, each second mixer 265 may be operable to receive fluid and solid materials and mix or otherwise blend the fluid and solid materials to form a fluid mixture. For example, the second mixers 265 may be operable to receive the diluted first fluid mixture from the rheology control portion 202, the solid additives from the bulk container 130, and the high-volume solids from the bulk container 140 to form the second fluid mixture. As described above, the second fluid mixture may include a fracturing fluid utilized in subterranean formation fracturing operations, a fluid mixture utilized in the fracturing fluid, and/or other fluid mixtures.

The diluted first fluid mixture may be communicated from the buffer tank 260 to the second mixers 265 through the one or more supply conduits 270 extending therebetween. The diluted first fluid mixture may be drawn through the supply conduits 270 and into a fluid material inlet of the second mixers 265 via a suction force generated by the second mixers 265. A flow meter 294 may be disposed along the supply conduit 270 downstream of the second container 260, such as may be operable to generate signals or information related to the flow rate of the diluted first fluid mixture being introduced into the second mixers 265 from the second container 260.

The second mixers 265 may receive the high-volume solids from the transfer mechanism 142 via the receiving and/or storing means 266. The receiving and/or storing means 266 are depicted in FIG. 4 as being implemented as hoppers, bins, and/or other containers operable to capture and/or store the high-volume solids discharged by outlet portions of the transfer mechanism 142. A lower portion of the receiving and/or storing means 266 may be tapered or otherwise permitting the high-volume solids to be gravity fed and/or otherwise substantially continuously transferred into a mixing chamber (not shown) of the second mixers 265.

Prior to being introduced to the mixing chamber, the high-volume solids metering system 267 may meter and/or otherwise transfer the high-volume solids at a selected rate. The high-volume solids metering system 267 may be disposed within the receiving and/or storing means 266, and may include a metering feeder, a screw feeder, an auger, a conveyor, and the like, such as may permit a predetermined flow of the high-volume solids into the mixing chamber of the second mixers 265. The high-volume solids metering system 267 may include metering gates within the containers of the receiving and/or storing means 266, such as may be selectively opened or closed to selectively adjust the flow rate of the high-volume solids into the mixing chamber. The transfer mechanism 142 may be or comprise a lower portion of the bulk container 140 terminating within the receiving and/or storing means 266, such as may permit the high-volume solids to be gravity fed into the receiving and/or storing means 266.

The second mixers 265 may receive the solid additives from the transfer device 132 via the receiving and/or storing means 280. The receiving and/or storing means 280 are depicted in FIG. 4 as being implemented as hoppers, bins, and/or other containers be operable to capture and/or store the solid additives discharged by outlet portions of the transfer device 132. A lower portion of the receiving and/or storing means 280 may have a tapered configuration terminating with a gate or other outlet permitting the solid additives to be gravity fed and/or otherwise substantially continuously transferred into the solids metering system 281, which may be operable to meter and/or otherwise transfer the solid additive to the second mixers 265. The solids metering system 281 may include a screw feeder, an auger, a conveyor, and the like, and may extend between the receiving and/or storing means 280 and a solid material inlet of the second mixers 265.

The mixing unit 200 may further comprise pressure sensors 285, 286 located at the inlets and the outlets of the second mixers 265, such as may be operable to generate signals or information related to fluid pressures at the inlets and outlets of the second mixers 265. Valves 285, 286 may be fluidly connected at the inlets and outlets of the second mixers 265, such as may be operable to control the flow of the diluted first fluid mixture and the second fluid mixture through the second mixers 265, and/or to fluidly isolate one or both of the second mixers 265 from other portions of the mixing unit 200.

The mixing unit 200 may further comprise a densitometer 268 connected at the outlets of the second mixers 265. The densitometer 268 may be operable to generate signals or information related to density or the amount of particles in the second fluid mixture, which may include the amount of solid additive and high-volume solids. The densitometer 268 may emit radiation that is absorbed by different particles in the second fluid mixture. Different absorption coefficients may exist for different particles, which may then be utilized to translate the signals or information to determine a density measurement.

The mixing unit 200 may also comprise flow meters 295 disposed at the outlets of the second mixers 265. The flow meters 295 may be operable to generate signals or information related to the flow rate of the second fluid mixture being discharged from each of the second mixers 265.

The liquid injection systems 208 shown in FIG. 2 are generally depicted in FIG. 4 as comprising one or more liquid additive supply conduits 272 for introducing liquid additives to the diluted first fluid mixture upstream from the second mixers 265 and/or to the second fluid mixture downstream from the second mixers 265. The liquid injection system 208 may be fluidly connected with the transfer mechanism 122 to receive the liquid additive from the bulk container 120. The liquid additive may be transferred or otherwise moved through the liquid additive supply conduit 272 by a liquid additive pump 273. A three-way valve 274 may be fluidly connected along the liquid additive supply conduit 272, such as may be operable to selectively control whether the liquid additive is introduced to the diluted first fluid mixture upstream of the second mixers 265 or to the second fluid mixture downstream of the second mixers 265. A flow meter 296 may be fluidly connected downstream of the liquid additive pump 273, such as may be operable to generate signals or information related to flow rate of the liquid additive being introduced to the diluted first fluid mixture or the second fluid mixture.

The liquid injection system 208 may comprise additional liquid additive supply conduits 272, pumps 273, and/or flow meters 296, which may be utilized when additional and/or different liquid additives are intended to be introduced into the diluted first fluid mixture or the second fluid mixture. The additional liquid additive supply conduits 272, pumps 273, and/or flow meters 296 may be operable to introduce the liquid additives at different locations along the mixing unit 200. For example, the liquid additives may be introduced at the inlet and/or outlet of the first mixer 214, at the inlet to the pump 240, at the outlets of the hydrating fluid source 218, and at the inlets and/or outlets of the second mixers 265. For example, the liquid injection system 208 may be utilized to introduce a chemical into the hydrating fluid source 218 to modify the pH and other properties of the hydrating fluid, such as water.

The mixing unit 200 may further comprise a fluid bypass conduit 271, such as may permit the first diluted fluid mixture or other fluid to bypass the second mixers 265 during mixing or other operations, such as during flushing operations. A valve 269 may be fluidly connected along a fluid bypass conduit 271 to selectively open and close the fluid bypass conduit 271.

As the second mixers 265 form the second fluid mixture, the second fluid mixture may be substantially continuously discharged by the second mixers 265 and communicated to a discharge manifold or other outlets 275 before being injected downhole. Although the mixing unit 200 is shown comprising two second mixers 265, both second mixers 265 may not be utilized simultaneously and/or utilized to mix the same materials. For example, the second mixers 265 may be used to mix two different fluid mixtures, such as two different fracturing fluid chemistries, and discharge them out of the mixing unit 200 separately or together. Such "split stream operations" may be performed where one of the second mixers 265 discharges a clean fluid (i.e., without proppant material), while the other one of the second mixers 265 discharges a dirty fluid (i.e., with proppant material). Other operations include feeding compatible chemicals to both second mixers 265 separately and then mixing them downstream to create highway type proppant packs in slick water applications. Such application may create, for example, crosslink fluid islands full of proppant material within water like base fluid.

The outlets 275 may comprise a plurality of outlet ports 276 operable to discharge the second fluid mixture and/or other mixtures from the mixing unit 200. The outlet ports 276 may be selectively opened and closed by a plurality of corresponding valves 277 disposed at each of the outlet ports 276.

The outlets 275 may further comprise a plurality of additional valves 278, 279, such as may be operable to selectively isolate one or more of the outlets 275 and/or to select the source of fluid being discharged therefrom. For example, when the valves 278 are open and the valves 279 are closed, the outlets 275 may be operable to discharge the second fluid mixture discharged from the second mixers 265. However, when the valves 279 are open and the valves 278 are closed, the outlets 275 may be operable to discharge the hydrating fluid discharged from the transfer pump 240.

The flow meters 291-296, the level sensors 262, the force sensors 216, the densitometer 268, and the pressure sensors may generate signals or information related to corresponding operational parameters (hereinafter referred to collectively as "parameter information"), as described above, and communicate the parameter information to a controller 510. The parameter information may be utilized by the controller 510 as feedback signals, such as may facilitate a closed-loop control of the mixing unit 200. For example, the parameter information may be utilized to determine accuracy of the pumps 240, 241, 273 and/or the flow control devices 245, 250, 255 and to adjust the flow rates of selected fluids, such that the concentrations and flow rates of the concentrated first fluid mixture, the diluted first fluid mixture, and second fluid mixture match setpoint values, which may be predetermined, selected by a human operator, and/or determined by the controller 510 during mixing operations.

Figure 8:
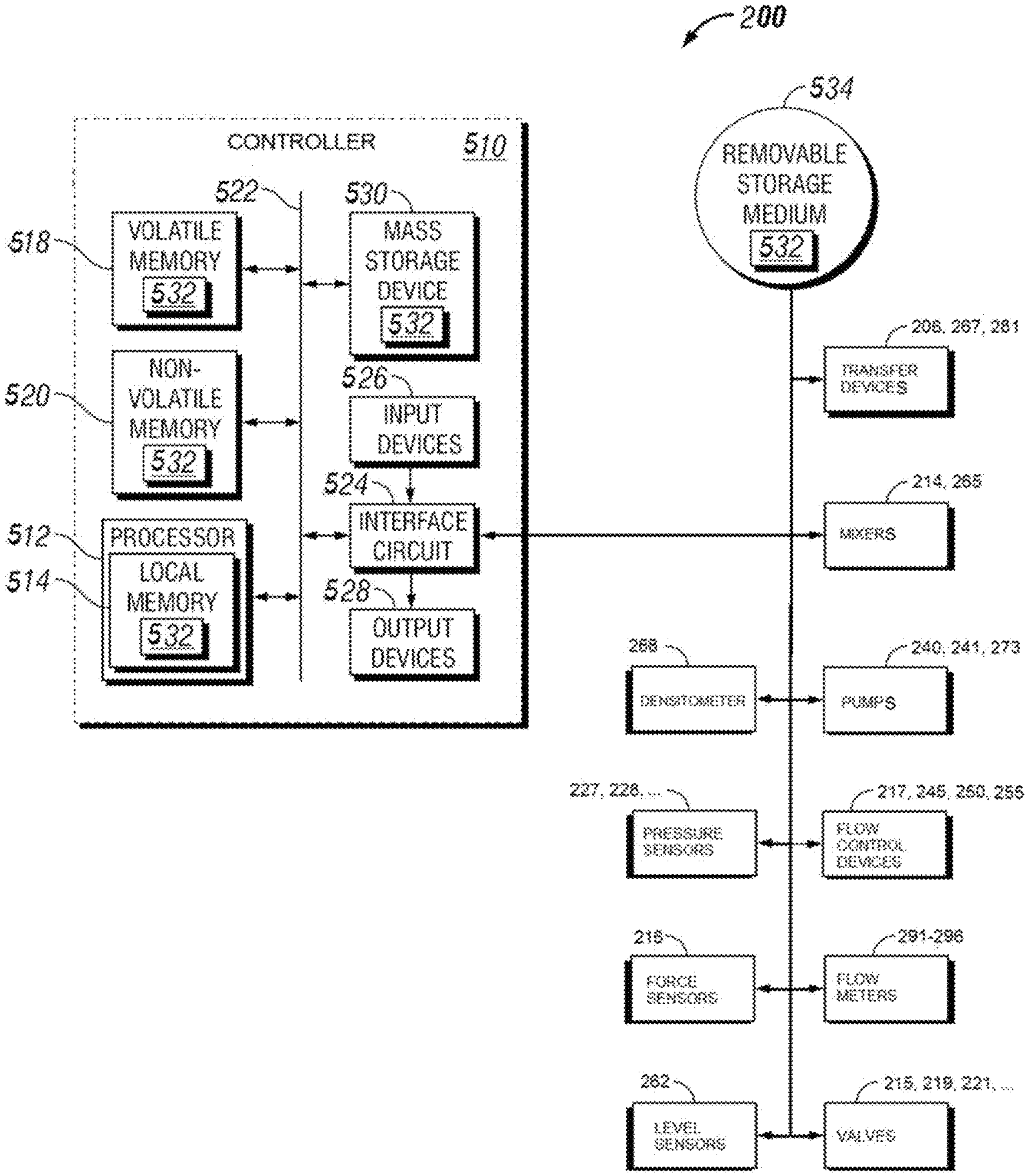
FIG. 8 is a schematic view of at least a portion of an example implementation of an apparatus according to one or more aspects of the present disclosure.

FIG. 8 is a schematic view of at least a portion of an example implementation of the controller 510 in communication with the transfer devices 206, 267, 281, the mixers 214, 265, the pumps 240, 241, 273, the flow control devices 217, 245, 250, 255, the flow meters 291-296, the valves, the force sensors 216, the level sensors 262, the pressure sensors, and the densitometer 268 (hereinafter referred to collectively as "mixing unit components"), according to one or more aspects of the present disclosure. Such communication may be via wired and/or wireless communication means. However, for clarity and ease of understanding, such communication means are not depicted in FIG. 4, and a person having ordinary skill in the art will appreciate that myriad means for such communication means are within the scope of the present disclosure.

The controller 510 may be operable to execute example machine-readable instructions to implement at least a portion of one or more of the methods and/or processes described herein, and/or to implement a portion of one or more of the example oilfield devices described herein. The controller 510 may be or comprise, for example, one or more processors, special-purpose computing devices, servers, personal computers, personal digital assistant (PDA) devices, smartphones, internet appliances, and/or other types of computing devices.

The controller 510 may comprise a processor 512, such as a general-purpose programmable processor. The processor 512 may comprise a local memory 514, and may execute coded instructions 532 present in the local memory 514 and/or another memory device. The processor 512 may execute coded instructions 532 that, among other examples, may include machine-readable instructions or programs to implement the methods and/or processes described herein. The processor 512 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or the non-volatile memory 520. The processor 512 may be further operable to cause the controller 510 to receive, collect, and/or record the concentration and flow setpoints and/or other information generated by the mixing unit system components and/or other sensors onto the main memory.

The controller 510 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 524 may also comprise a graphics driver card. The interface circuit 524 may also comprise a communication device, such as a modem or network interface card, such as to facilitate exchange of data with external computing devices via a network (e.g., via Ethernet connection, digital subscriber line (DSL), a telephone line, a coaxial cable, a cellular telephone system, a satellite, etc.).

One or more of the mixing unit components may be connected with the controller 510 via the interface circuit 524, such as may facilitate communication therebetween. For example, one or more of the mixing unit components may comprise a corresponding interface circuit (not shown), which may facilitate communication with the controller 510. Each corresponding interface circuit may permit signals or information generated by the mixing unit components to be sent to the controller 510 as feedback signals for monitoring and/or controlling operation of one or more of the mixing unit components, or perhaps the entirety of the mixing unit 200. Each corresponding interface circuit may permit control signals to be received from the controller 510 by the various motors, drives, solenoids, and/or other actuators (not shown) associated with ones of the mixing unit components to control operation of the corresponding mixing unit components, such as to control operation of the entirety of the mixing unit 200.

One or more input devices 526 may also be connected to the interface circuit 524. The input devices 526 may permit a human operator to enter data and commands into the processor 512, such as may include a setpoint corresponding to a predetermined concentration of the hydratable material in the diluted first fluid mixture (hereinafter referred to as the "first concentration setpoint"), a setpoint corresponding to a predetermined concentration of the particulate material in the second fluid mixture (hereinafter referred to as the "second concentration setpoint"), and a setpoint corresponding to a predetermined flow rate of the diluted first fluid mixture formed by the mixing unit 200 (hereinafter referred to as the "flow setpoint"). The input devices 526 may be, comprise, or be implemented by a keyboard, a mouse, a touchscreen, a track-pad, a trackball, an isopoint, and/or a voice recognition system, among other examples. One or more output devices 528 may also be connected to the interface circuit 524, such as to display the first and second concentration setpoints and the flow setpoint and information generated by one or more of the mixing unit components. The output devices 528 may be, comprise, or be implemented by visual display devices (e.g., a liquid crystal display (LCD) or cathode ray tube display (CRT), among others), printers, and/or speakers, among other examples.

The controller 510 may also connect with one or more mass storage devices 530 and/or a removable storage medium 534, such as may be or include floppy disk drives, hard drive disks, compact disk (CD) drives, digital versatile disk (DVD) drives, and/or USB and/or other flash drives, among other examples. The setpoints and parameter information may be stored on the one or more mass storage devices 530 and/or the removable storage medium 534.

The coded instructions 532 may be stored in the mass storage device 530, the volatile memory 518, the non-volatile memory 520, the local memory 514, and/or the removable storage medium 534. Thus, components of the controller 510 may be implemented in accordance with hardware (perhaps implemented in one or more chips including an integrated circuit, such as an application specific integrated circuit), or may be implemented as software or firmware for execution by one or more processors. In the case of firmware or software, the implementation may be provided as a computer program product including a computer readable medium or storage structure embodying computer program code (i.e., software or firmware) thereon for execution by the processor 512.

The coded instructions 532 may include program instructions or computer program code that, when executed by the processor 512, cause the mixing unit 200 (or at least components thereof) to perform tasks as described herein. For example, the coded instructions 532, when executed, may cause the controller 510 to receive and process the first and second concentration setpoints and the flow setpoint and, based on the setpoints, cause the mixing unit 200 to form the diluted first fluid mixture having the predetermined concentration of hydratable material, the diluted first fluid mixture having the predetermined concentration of particulate material, and the second fluid mixture at the predetermined flow rate. When executed, the coded instructions 532 may cause the controller 510 to receive the parameter information generated by mixing unit components and process the parameter information as feedback signals, such as may facilitate a closed-loop control of the mixing unit 200 and/or the mixing unit components. For example, the information may be utilized determine accuracy of the pumps 240, 241, 273, and/or the flow control devices 245, 250, 255 and to adjust the flow rates of selected fluids, such that the concentrations and flow rates of the concentrated first fluid mixture, the diluted first fluid mixture, and second fluid mixture match setpoint values selected by an operator and/or other setpoint values determined by the controller 510 during mixing operations.

Although flow and concentration setpoints are discussed herein, it is to be understood that the controller 510 may receive and process other setpoints within the scope of the present disclosure. The controller 510 may also monitor and control other parameters and operations of the mixing unit 200, such as may be implemented to form the second fluid mixture.

FIGS. 9-12 are flow-chart diagrams of at least portions of an example control process 600 stored as coded instructions 532 and executed by the controller 510 and/or one or more other controllers associated with the mixing unit components according to one or more aspects of the present disclosure. The following description refers to FIGS. 3, 4, and 8-12, collectively.

The process 600 may be implemented by the mixing unit 200 to form the diluted first fluid mixture having the predetermined concentration of hydratable material, the second fluid mixture having the predetermined concentration of particulate material, and the diluted first fluid mixture at the predetermined flow rate based on the first and second concentration setpoints and the flow setpoint entered into the controller 510. FIGS. 9-12 show portions of the process 600, which may comprise a series of interrelated stages or sub-processes 610, 620, 630, 640, 650, 660, 670, 680, wherein each such sub-process may employ a separate control loop, such as a proportional-integral-derivative (PID) control loop. For example, one or more of the sub-processes 610, 620, 630, 640, 650, 660, 670, 680 may utilize a control loop to achieve an intended output or result. The sub-processes 610, 620, 630, 640, 650 may be interrelated as depicted by arrows 622, 632, 642, 652 or otherwise.

The sub-process 610 may comprise a determination of a concentrated first fluid mixture ("CFFM") concentration setpoint and a dilution ratio. Inputs to this sub-process may include a first diluted fluid mixture ("DFFM") concentration setpoint 612 (hereinafter "concentration setpoint") and a maximum first diluted fluid mixture flow rate setpoint 614 (hereinafter "flow setpoint"), which may be compared with the information generated by the flow meter 294. The concentration and flow setpoints 612, 614 may be predetermined or selected parameters that are specific to a wellsite operation to be executed utilizing the wellsite system 100, such as a hydraulic fracturing operation. The concentration and flow setpoints 612, 614 may be determined based on other information that is relevant to the wellsite operation, such as characteristics of a subterranean formation (e.g., size, location, content, etc.) into which the diluted first fluid mixture discharged by the mixing unit 200 is to be injected.

The concentration and flow setpoints 612, 614 may be entered into the controller 510 in a suitable manner, such as via the input devices 526. The controller 510 may then determine and output parameters, such as may be utilized during hydration operations based on the entered concentration and flow setpoints 612, 614 and/or other inputs. The controller 510 may then communicate the other parameters to one or more equipment controllers (not shown) associated with the mixing unit components, which in turn, may implement additional sub-processes.

The sub-process 620 may comprise the control of the hydratable material transfer device 206 for transferring hydratable material to the first mixer 214. Inputs to the sub-process 620 may include one or more outputs (i.e., setpoints) generated by the sub-process 610, along with an actual hydrating fluid flow rate 626 into the first mixer 214, as determined by the flow meter 291. Signals generated by the one or more force sensors 216, such as load cells that support the hydratable material container 204, may be utilized in the sub-process 620 to ensure that an appropriate amount of hydratable material is being introduced into the first mixer 214, and/or to compare the expected amount of hydratable material with an actual amount of hydratable material introduced into the first mixer 214.

Figure 9:
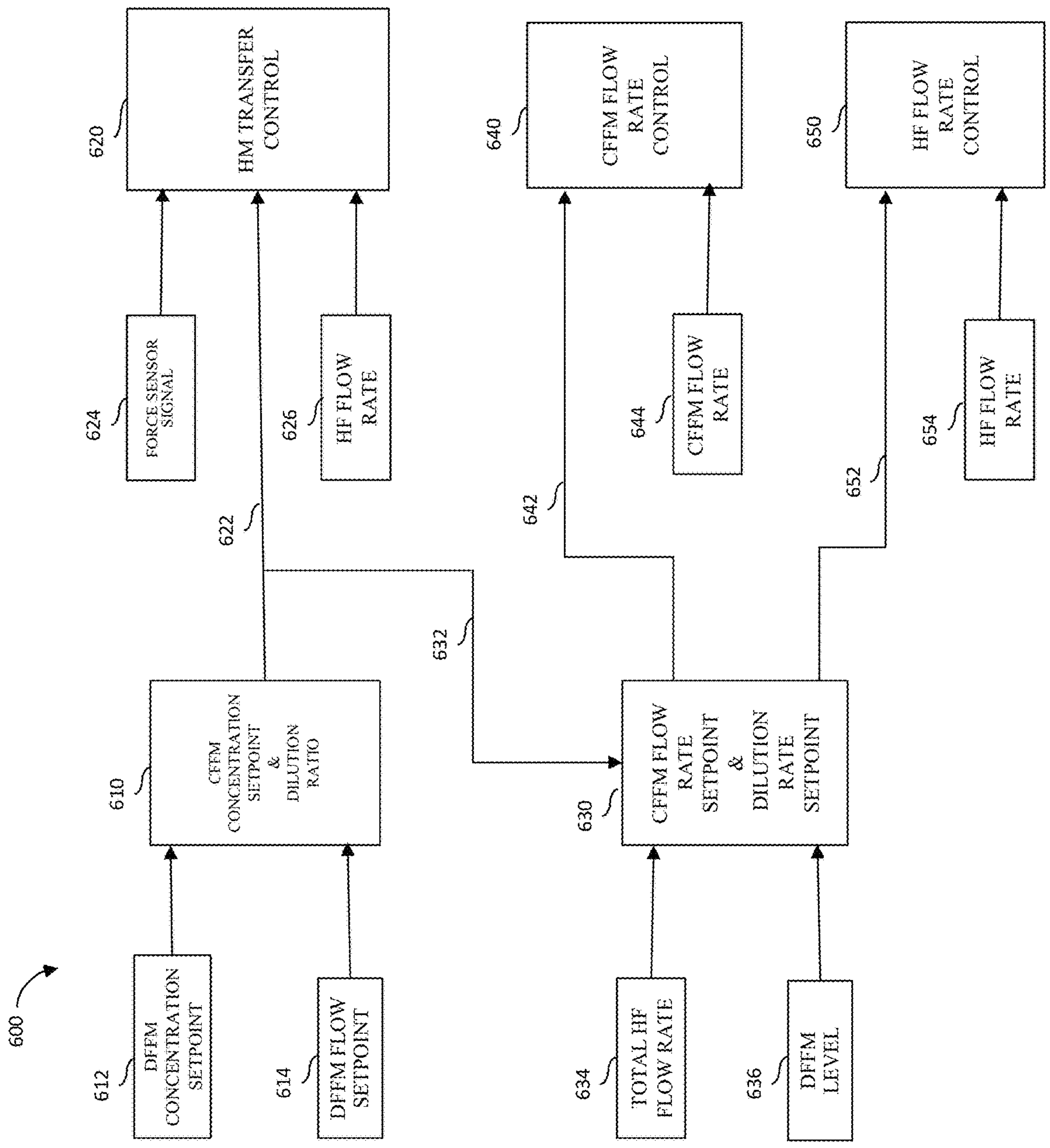
FIGS. 9-12 are flow-chart diagrams of at least portions of an example implementation of a process according to one or more aspects of the present disclosure.
Figure 11:
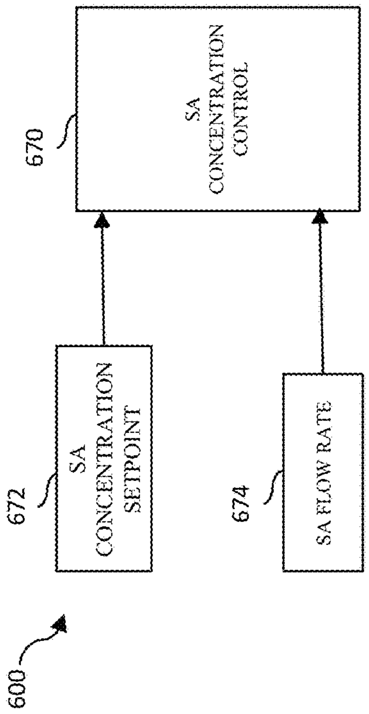
Figure 10:
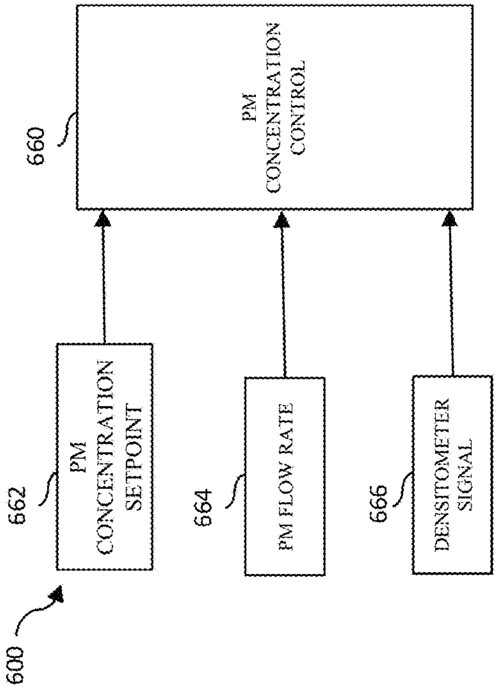
Figure 12:
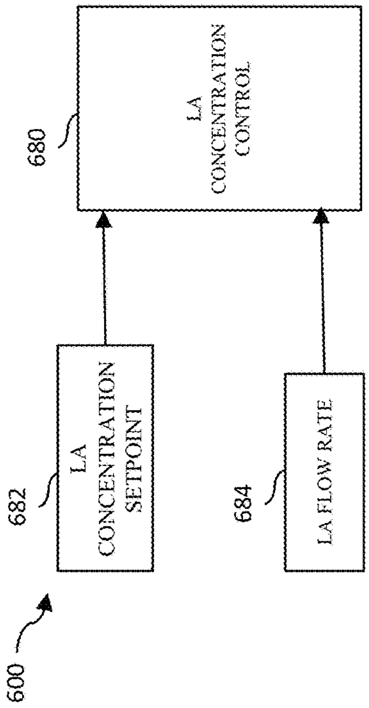

The sub-process 630 may comprise the determination of the first diluted fluid mixture flow rate setpoint, which includes determination of the concentrated first fluid mixture flow rate setpoint and the hydrating fluid flow rate setpoint (indicated in FIG. 9 as "Dilution Rate Setpoint"). The inputs to the sub-process 630 may include one or more of the outputs generated by the sub-process 610, along with a total hydrating fluid flow rate 634 into the diluter 230, as determined by the flow meters 291, 293, and a first diluted fluid mixture level 636 in the second container 260, as determined by the level sensor 262.

The sub-process 640 may comprise control of the concentrated first fluid mixture flow rate into the diluter 230, which may be a function of the flow control device 245 and/or the metering pump 241. The inputs to the sub-process 640 may include a concentrated first fluid mixture flow rate setpoint 642 generated by the sub-process 630, along with an actual concentrated first fluid mixture flow rate 644, as determined by the flow meter 292.

The sub-process 650 may comprise control of the hydrating fluid flow rate into the diluter 230, such as to control dilution of the concentrated first fluid mixture. Inputs to the sub-process 650 may include a dilution rate setpoint 652 generated by the sub-process 630, along with a hydrating fluid flow rate 654 into the diluter 230, as determined by the flow meter 293.

The sub-process 660 may comprise the control of the particulate material ("PM") transfer devices 267, which may be implemented as the metering gates operable for metering the particulate material into the second mixers 265. Inputs to the sub-process 660 may include a particulate material concentration setpoint 662. Another input to the sub-process 660 may include the particulate material flow rate 664, which may be based on or comprise the control signal sent to the particulate material transfer devices 267. Another input may include the signal 666 generated by the densitometers 268. The densitometer signal 666 may be compared with the particulate material setpoint 662.

The sub-process 670 may comprise the control of the solid additive ("SA") transfer devices 281 for metering the solid additive into the second mixers 214. Inputs to the sub-process 670 may include solid additive concentration setpoint 672. Another input to the sub-process 670 may include the solid additive flow rate 674, which may be based on or comprise the control signal sent to the solid additive transfer devices 281. The solid additive flow rate 674 may be compared with the solid additive concentration setpoint 672.

The sub-process 680 may comprise the control of the liquid additive ("LA") pump 273 for metering the liquid additive into the diluted first fluid mixture or the second fluid mixture. Inputs to the sub-process 680 may include a liquid additive concentration setpoint 682. Another input to the sub-process 680 may include the liquid additive flow rate 684, as determined by the flow meter 296. The liquid additive flow rate 684 may be compared with the liquid additive concentration setpoint 682.

Similarly to the concentration and flow setpoints 612, 614, the particulate material concentration setpoint 662, the solid additive concentration setpoint 672, and the liquid additive concentration setpoint 682 may be predetermined or selected parameters that are specific to the wellsite operation to be executed utilizing the wellsite system 100, such as a hydraulic fracturing operation. The setpoints 662, 672, 682 may be determined based on other information that is relevant to the wellsite operation, such as characteristics of a subterranean formation (e.g., size, location, content, etc.) into which the second fluid mixture discharged by the mixing unit 200 is to be injected. The setpoints 662, 672, 682 may be entered into the controller 510 in a suitable manner, such as via the input devices 526, wherein the controller 510 may determine and output parameters utilized during mixing operations based on the entered setpoints 662, 672, 682, and/or other inputs. The controller 510 may then communicate the other parameters to one or more equipment controllers (not shown) associated with the mixing unit components.

Figure 13:
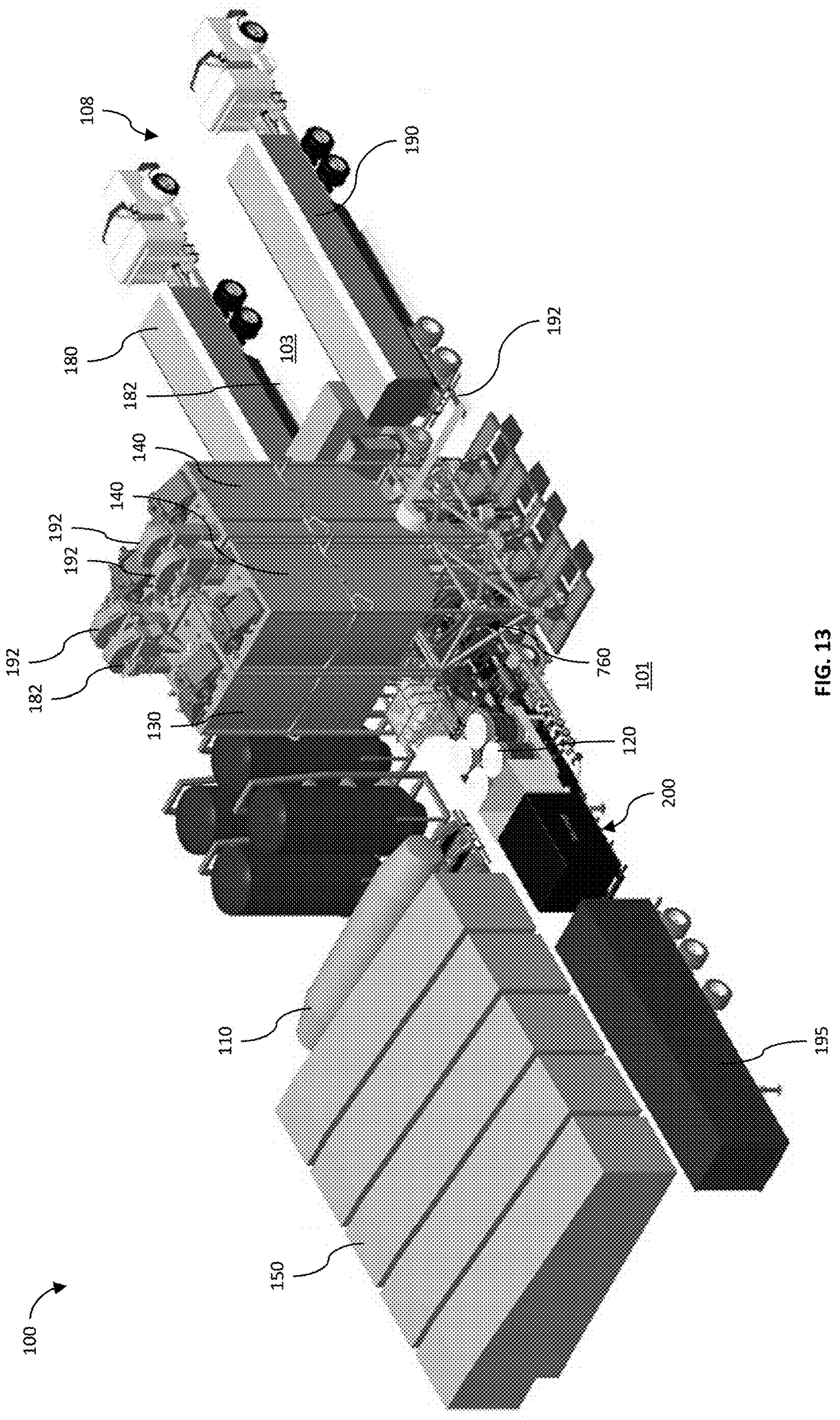
FIG. 13 is a perspective view of an example implementation of the apparatus shown in FIG. 1 according to one or more aspects of the present disclosure.

FIG. 13 is a perspective view of an example implementation of the wellsite system 100 located on a wellsite surface 101 shown in FIG. 1 according to one or more aspects of the present disclosure. The wellsite system 100 comprises the mixing unit 200 disposed within a support structure 760 and operatively connected with the bulk containers storing various fluids, solid additives, and particulate materials (hereinafter referred to collectively as "plurality of materials") via transfer mechanisms (not shown) operable to transfer or otherwise convey the plurality of materials from the bulk containers to the mixing unit 200.

The bulk container 110 is depicted in FIG. 13 as a tank for storing the hydratable material. The bulk container 120 is depicted in FIG. 13 as a plurality of tanks for storing the liquid additives. The bulk container 130 is depicted in FIG. 13 as a vertical silo for storing the solid additives and disposed on top of the support structure 760. The bulk container 140 is depicted in FIG. 13 as a plurality of silos for storing the particulate material, such as a proppant material, and disposed on top of the support structure 760. The bulk container 150 is depicted in FIG. 13 as a plurality of tanks for storing the hydrating fluid.

As described above with respect to FIG. 1, the wellsite system 100 comprises a plurality of transfer mechanisms operable to transfer or otherwise convey the plurality of materials from corresponding delivery vehicles 108 to the bulk containers 110, 120, 130, 140, 150. During mixing operations, the delivery vehicles 108 may enter a material delivery area 103 of the wellsite surface 101 for unloading of the plurality of materials.

The hydratable material may be periodically delivered to the wellsite via a delivery vehicle (not shown in FIG. 13) comprising a container storing the hydratable material. During delivery, the delivery vehicle may be positioned adjacent a corresponding transfer mechanism (not shown in FIG. 13) in a manner permitting the hydratable material to be conveyed by the transfer mechanism from the delivery vehicle to the bulk container 110.

The liquid additive may be periodically delivered to the wellsite via another delivery vehicle (not shown in FIG. 13) comprising a container storing the liquid additive. During delivery, the delivery vehicle may be positioned adjacent a corresponding transfer mechanism (not shown in FIG. 13) in a manner permitting the liquid additive to be conveyed by the transfer mechanism from the delivery vehicle to the bulk container 120.

The solid additive may be periodically delivered to the wellsite via delivery vehicle 180 comprising a container storing the solid additive. During delivery, the delivery vehicle 180 may be positioned adjacent the transfer mechanism 182 in a manner permitting the solid additive to be conveyed by the transfer mechanism 182 from the delivery vehicle 180 to the bulk container 130.

The particulate material may be periodically delivered to the wellsite via the delivery vehicle 190 comprising a container storing the particulate material. During delivery, the delivery vehicle 190 may be positioned adjacent the transfer mechanism 192 in a manner permitting the particulate material to be conveyed by the transfer mechanism 192 from the delivery vehicle 190 to the bulk container 140.

FIG. 13 depicts the delivery vehicles 180, 190 as being larger than the bulk containers 130, 140. However, it is to be understood that the bulk containers 130, 140 have a storage capacity that may be about equal to or greater than a storage capacity of the corresponding delivery vehicle 180, 190.

Figure 14:
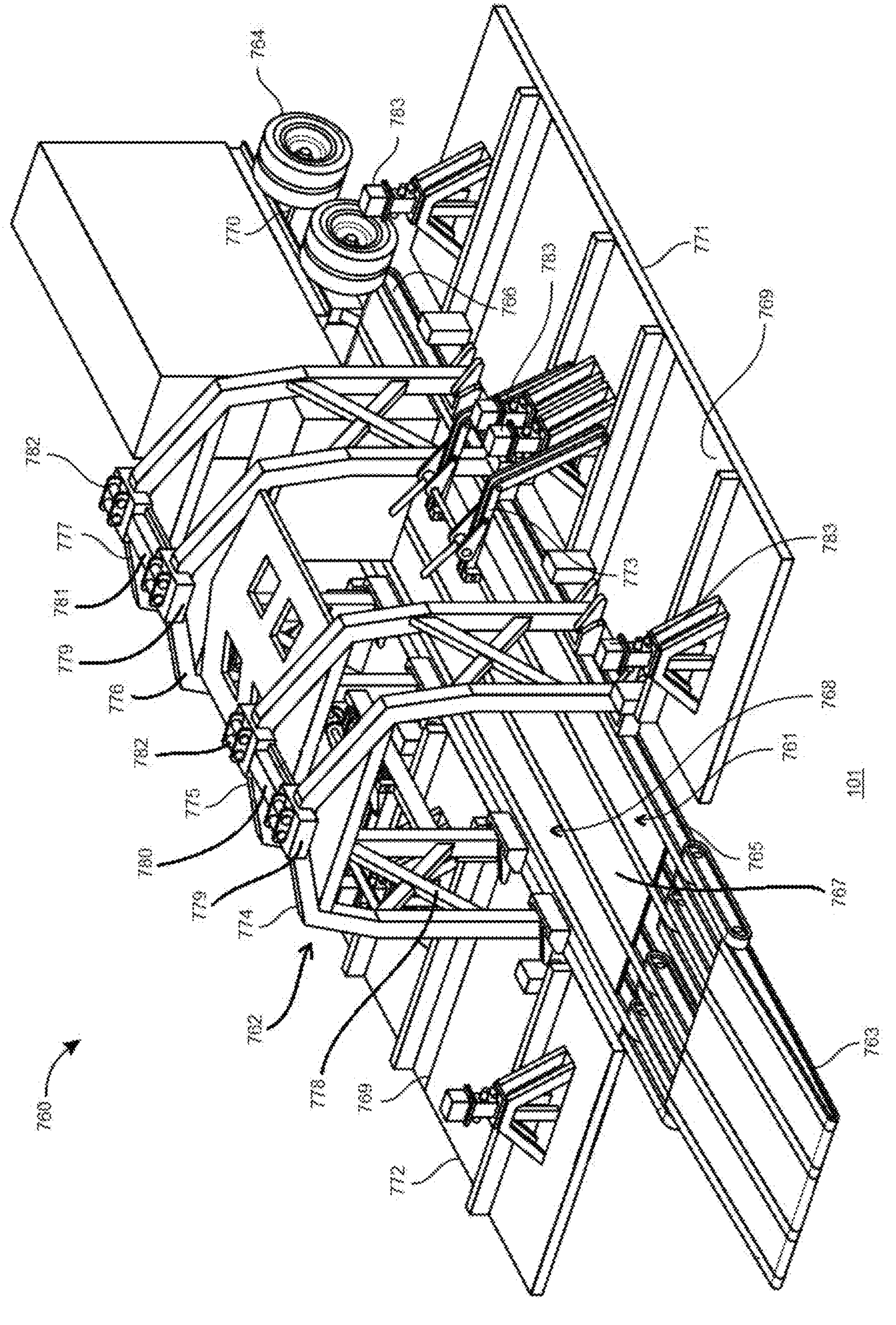
FIG. 14 is a perspective view of an example implementation of a portion of the apparatus shown in FIG. 13 according to one or more aspects of the present disclosure.

FIG. 14 is a perspective view of at least a portion of the support structure 760 shown in FIG. 13. The support structure 760 may be transported onto the wellsite surface 101 and may comply with various state, federal, and international regulations for transport over roadways and highways. The following description refers to FIGS. 13 and 14, collectively.

The support structure 760 may include a support base 761, a frame structure 762, a gooseneck portion 763, and a plurality of wheels 764 for supporting the support base 761, the frame structure 762, and the gooseneck portion 763. The gooseneck portion 763 may be attached to a prime mover (not shown) such that the prime mover may move the support structure 760 between various locations, such as between the wellsite surface 101 and another wellsite surface. The support structure 760 may thus be transported to the wellsite surface 101 and then set up to support one or more bulk containers 130, 140. Although the depicted example of the support structure 760 may support up to four bulk containers 130, 140, it should be understood that the support structure 760 may be configured to support more or less of the bulk containers 130, 140.

The support base 761 may include a first end 765, a second end 766, and a top surface 767. The frame structure 762 may extend above the support base 761 to define a passage 768 generally located between the top surface 767 of the support base 761 and the frame structure 762. The frame structure 762 includes one or more silo-receiving regions 769 each configured to receive a bulk containers 130, 140. For example, the frame structure 762 is shown defining four silo-receiving regions 769, each configured to support a corresponding one of the bulk containers 130, 140.

The gooseneck portion 763 may extend from the first end 765 of the support base 761. Axles 770 supporting wheels 764 may be located proximate the second end 766 of the support base 761, proximate the first end 765 of the support base 761, and/or at other locations relative to the support base 761. Although FIG. 14 shows the support structure 760 comprising two sets of wheels 764 and axles 770 (second axle obstructed from view), it should be understood that more than two sets of wheels 764 and axles 770, positioned at various locations relative to the support base 761, may be utilized.

The support structure 760 may further comprise a first extendable base 771 on one side of the support base 761, and a second extendable base 772 on the opposing side of the support base 761. In such implementations, the first and second extendable bases 771, 772 may aid in laterally supporting or stabilizing the frame structure 762, and thus the bulk containers 130, 140, such as may aid in preventing the bulk containers 130, 140 and the frame structure 762 from falling over. The first and second extendable bases 771, 772 may also serve as a loading base for a truck during mounting of the bulk containers 130, 140 onto the support structure 760, as explained below.

The first and second extendable bases 771, 772 may be movably connected to the frame structure 762 and the support base 761 via one or more mechanical linkages 773, such that the first and second extendable bases 771, 772 may be selectively positioned between a transportation configuration, with the bases 771, 772 in the raised position, and an operational configuration, with the bases 771, 772 in the lowered position, as shown in FIG. 14. In the operational configuration, the first and second extendable bases 771, 772 may extend substantially horizontally from the frame structure 762, such as may aid in laterally supporting the bulk containers 130, 140 and/or to provide a loading base for transports (not shown) operable to mount the bulk containers 130, 140 onto the support structure 760.

The frame structure 762 may comprise a plurality of frames 774, 775, 776, 777 interconnected by a plurality of struts 778. The frames 774, 775, 776, 777 may be substantially parallel to each other and may be substantially similar in construction and function. Each frame 774, 775, 776, 777 may comprise a plurality of frame members, such as may be connected to form a closed structure surrounding at least a portion of the passage 768. Each frame 774, 775, 776, 777 may form an arch, such as may increase the structural strength of each frame 774, 775, 776, 777. Each frame 774, 775, 776, 777 may include an apex 779 located at the top center of each frame 774, 775, 776, 777, wherein each apex 779 may be connected with another apex 779 by first and second connecting members 780, 781. Each frame 774, 775, 776, 777 may be formed from suitable materials operable to support the load from the bulk containers 130, 140. For example, the frames 774, 775, 776, 777 may be constructed from steel tubulars, I-beams, channels, and/or other suitable material, and may be connected together via various mechanical fastening techniques, such as may utilize one or more threaded fasteners, plates, welds, and/or other connection means.

A first set of connectors 782 may be disposed at the apex 779 of each frame 774, 775, 776, 777 within corresponding silo-receiving regions 769, wherein each of the first set of connectors 782 may couple or engage with a corresponding connector on the bulk containers 130, 140 or a corresponding portion of the bulk containers 130, 140 during and after installation. A second set of connectors 783 may be disposed within the corresponding silo-receiving regions 769 on the first expandable base 771 and/or the second expandable base 772 at a lower elevation than the first set of connectors 782. Each of the second set of connectors 783 may couple or engage with a corresponding connector on the bulk container 130, 140 or a corresponding portion of the bulk containers 130, 140 during and after installation.

The first and second sets of connectors 782, 783 within each of the silo-receiving regions 769 may be configured to attach to or otherwise engage the bulk containers 130, 140. Once the bulk container 130, 140 are connected with the connectors 782, 783 on top of the frame structure 762, the support base 761 and the first and second expandable bases 771, 772 may be deployed to the operational configuration and the prime mover may be disconnected from the gooseneck portion 763 of the support structure 760. Thereafter, the gooseneck portion 763 may be manipulated to lie on the ground, perhaps substantially co-planar with the support base 761, such as to form a ramp to aid the positioning the mixing unit 200 at least partially within the passage 768, as shown in FIG. 13. The mixing unit 200 may be positioned within the passage 768 defined by the frame structure 762 such that the solid material receiving portion 266 is aligned with respect to the transfer mechanism 132, 142, such as a discharge chute, of the bulk containers 130, 140 to enable gravity feed. Thereafter, the other transfer mechanisms 112, 122 may be connected with the mixing unit 200.

Figure 15:
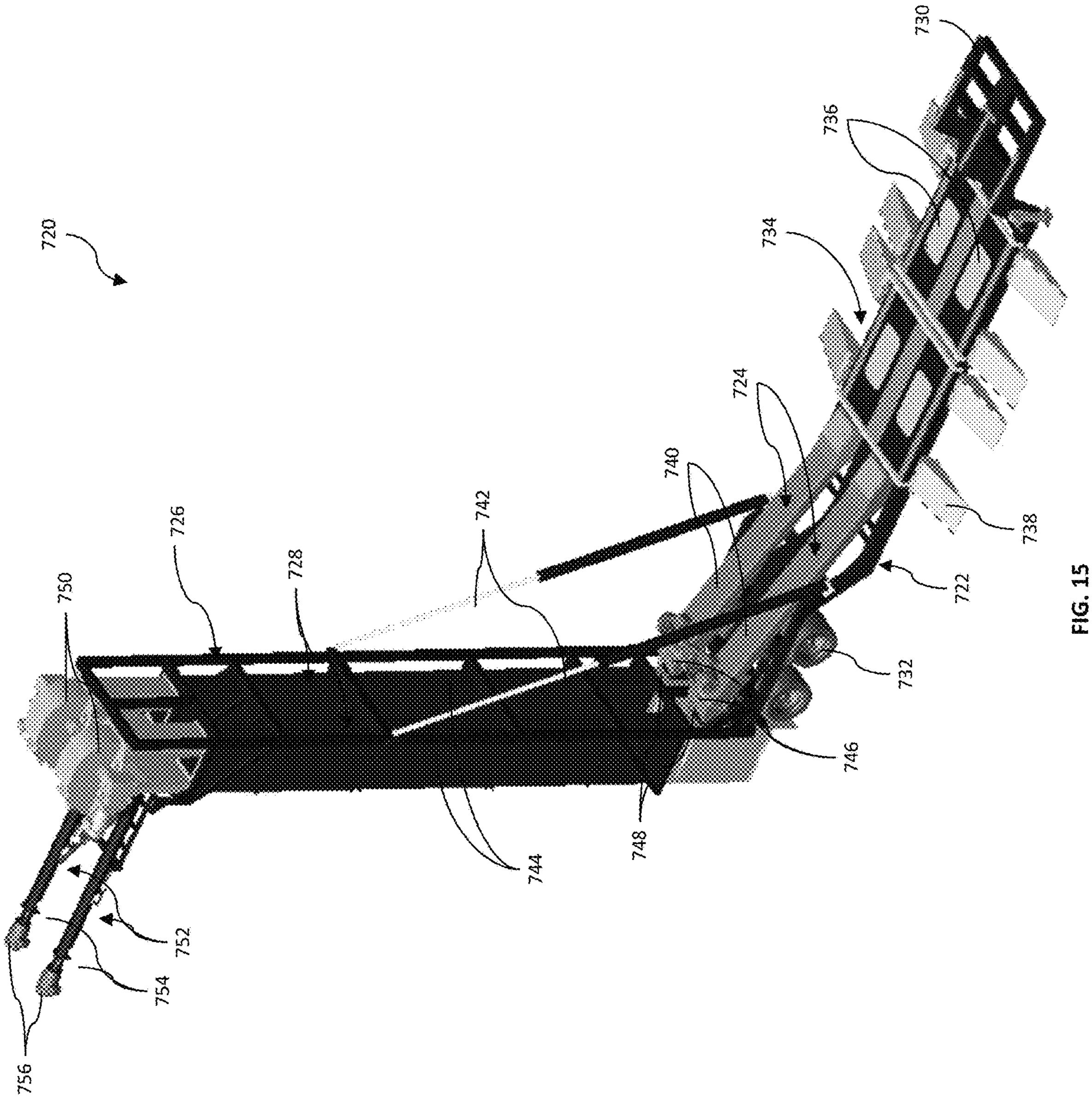
FIG. 15 is a perspective view of at least a portion of an example implementation of apparatus according to one or more aspects of the present disclosure.
Figure 16:
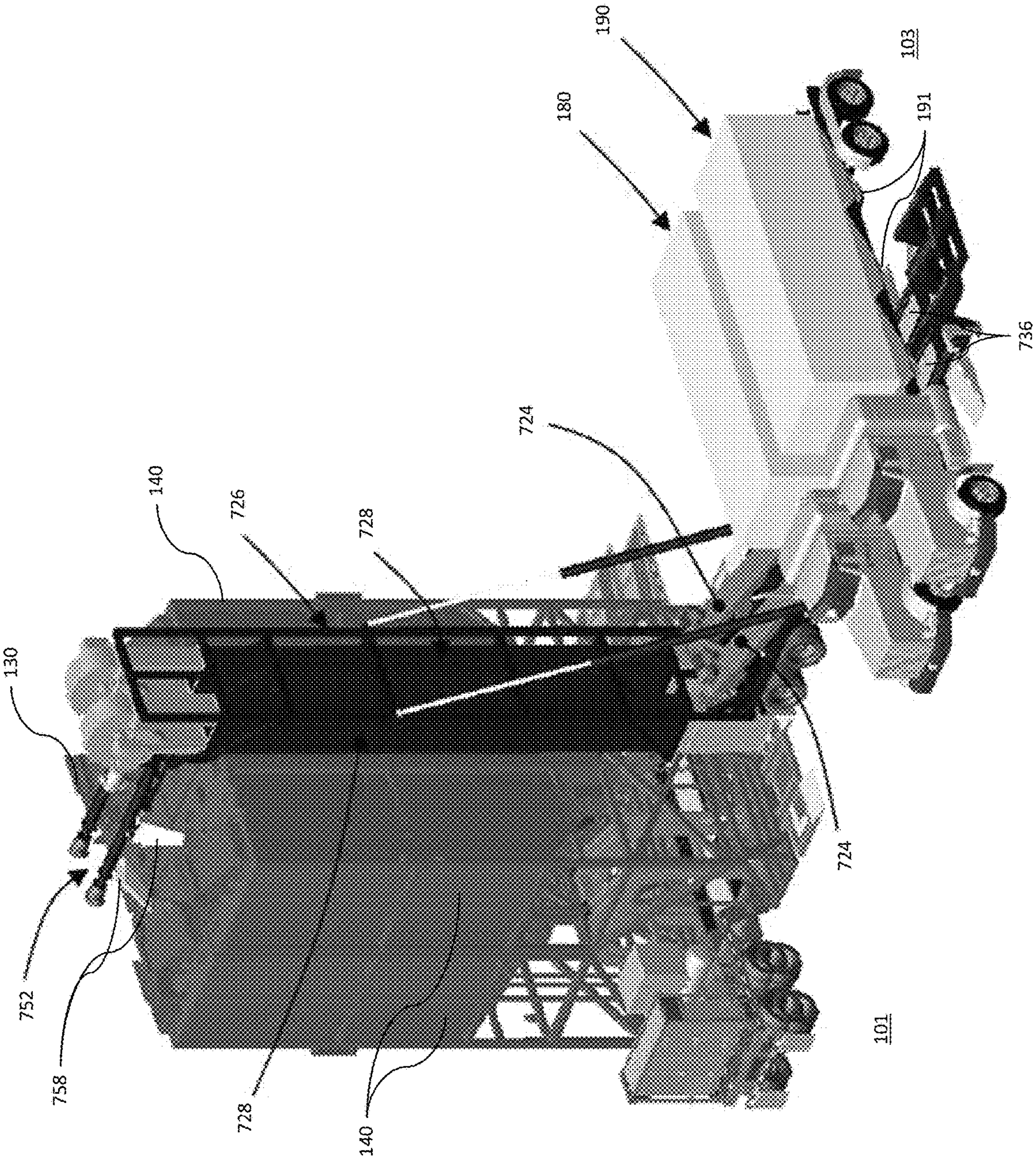
FIG. 16 is a perspective view of an example implementation of the apparatus shown in FIG. 15 according to one or more aspects of the present disclosure.

FIGS. 15 and 16 are a perspective view of an example implementation of at least a portion of the transfer mechanisms 182, 192 shown in FIG. 1 according to one or more aspects of the present disclosure. The figures show the transfer mechanisms 182, 192 implemented as a mobile transfer unit 720 comprising a chassis 722 supporting one or more horizontal conveyor systems 724 and a mast 726 supporting one or more vertical conveyor systems 728. The following description refers to FIGS. 15 and 16, collectively.

The chassis 722 may be implemented as a plurality of interconnected steel beams, channels, I-beams, H-beams, wide flanges, universal beams, rolled steel joists, or any other suitable structures. The first end of the chassis 722 may comprise a gooseneck portion 730 operable for connection with a prime mover, such as may permit the mobile transfer unit 720 to be pulled by the prime mover to the wellsite surface 101. The second end of the chassis 722, opposite the first end, may comprise a plurality of wheels 732 rotatably connected to the chassis 722 and supporting the chassis 722 on the wellsite surface 101. The horizontal conveyor systems 724 may extend between the first and second ends of the chassis 722. The horizontal conveyor systems 724 may include screw feeders, augers, conveyors, belts, and/or other transfer means operable to move the solid additives and/or the particulate material. A portion of the horizontal conveyor systems 724 may be covered or enclosed by a shroud 740, while another portion of the horizontal conveyor systems 724 may extend through a material unloading platform 734.

The material unloading platform 734 may be connected to and/or disposed on the chassis 722 adjacent the first end of the chassis 722. The material unloading platform 734 may cover or enclose a portion of the horizontal conveyor systems 724 and comprise a plurality of vertical openings 736 on a top surface thereof, such as may permit the solid additives, the particulate material, and/or other high volume or bulk material to be dropped, fed, or otherwise introduced onto the horizontal conveyor systems 724 extending through or underneath the material unloading platform 734. The material unloading platform 734 may further include one or more ramps 738, which may help the delivery vehicles 180, 190 to move over or onto the material unloading platform 734 and permit alignment of the container chutes 191 of the delivery vehicles 180, 190 above the openings 736. The ramps 738 may be pivotably or otherwise movably connected with the material unloading platform 734. During delivery, the chutes may be disposed above the openings 736 and then opened to permit the solid additives and/or the particulate material to be dropped, fed, or otherwise introduced onto the horizontal conveyor systems 724.

As further shown in FIGS. 15 and 16, the mast 726 may be pivotably connected with the chassis 722 via one or more mechanical linkages and, along with the vertical conveyor systems 728, may be movable between raised and lowered positions via one or more actuators 742 extending between the mast 726 and the chassis 722. The mechanical linkages may be implemented in a variety of manners, such as rails, hydraulic or pneumatic arms, gears, worm gear jacks, cables, or combinations thereof. In some implementations the actuators 742 may be hydraulic or pneumatic actuators. The mast 726 may be implemented as a plurality of interconnected steel beams, channels, I-beams, H-beams, wide flanges, universal beams, rolled steel joists, or any other suitable structures. The vertical conveyor systems 728 may include screw feeders, augers, belts, conveyors, bucket elevators, belts, pneumatics, and/or other transfer means operable to move the solid additives and/or the particulate material vertically. The vertical conveyor systems 728 may also be covered or enclosed by one or more shrouds 744.

The mast 726 and the vertical conveyor systems 728 may be configured to lay substantially parallel with the chassis 722, and supported, at least in part, by the gooseneck portion 730 when the mobile transfer unit 720 is transported. The range of motion of the mast 726 and the vertical conveyor systems 728 may extend from substantially horizontal to slightly past vertical (e.g., more than a 90 degree range of motion) when deployed to account for angular misalignment due to ground height differences.

During operations, the horizontal conveyor systems 724 may be operable to move the solid additives and/or the particulate material introduced through the openings 736 toward the vertical conveyor systems 728. As the solid additives and/or the particulate material reaches the end of the horizontal conveyor systems 724, the solid additives and/or the particulate material may be transferred onto the vertical conveyor systems 728 and moved in the upward direction. For example, the horizontal conveyor systems 724 may terminate with one or more outlets 746, which may permit the transfer means to drop, feed, or otherwise introduce the solid additives and/or the particulate material into one or more inlets 748 of the vertical conveyor systems 728. The inlets 748, in turn, may direct the solid additives and/or the particulate material onto the transfer means of the vertical conveyor systems 728 to be moved vertically toward outlets 750 of the vertical conveyor systems 726.

Once the solid additives and/or the particulate material reach the top of the vertical conveyor systems 728, upper conveyor systems 752 may be operable to move the solid additives and/or the particulate material from the vertical conveyor systems 728 into the bulk containers 130, 140. For example, the upper conveyor systems 752 may comprise auger conveyors 754 driven by motors 756 to move the solid additives and/or the particulate material horizontally away from the vertical conveyor system 728. The upper conveyor system 752 may comprise inlets (obstructed from view), which may be operable to receive the solid additives and/or the particulate material from the outlets 750 of the vertical conveyor systems 728 and direct the solid additives and/or the particulate material to the auger conveyors 754. The upper conveyor system 752 may further comprise outlets 758, which may be disposed above or otherwise aligned with the inlets to the bulk containers 130, 180, such as may be operable to direct the solid additives and/or the particulate material from the upper conveyor system 752 into the bulk containers 130, 180.

Figure 17:
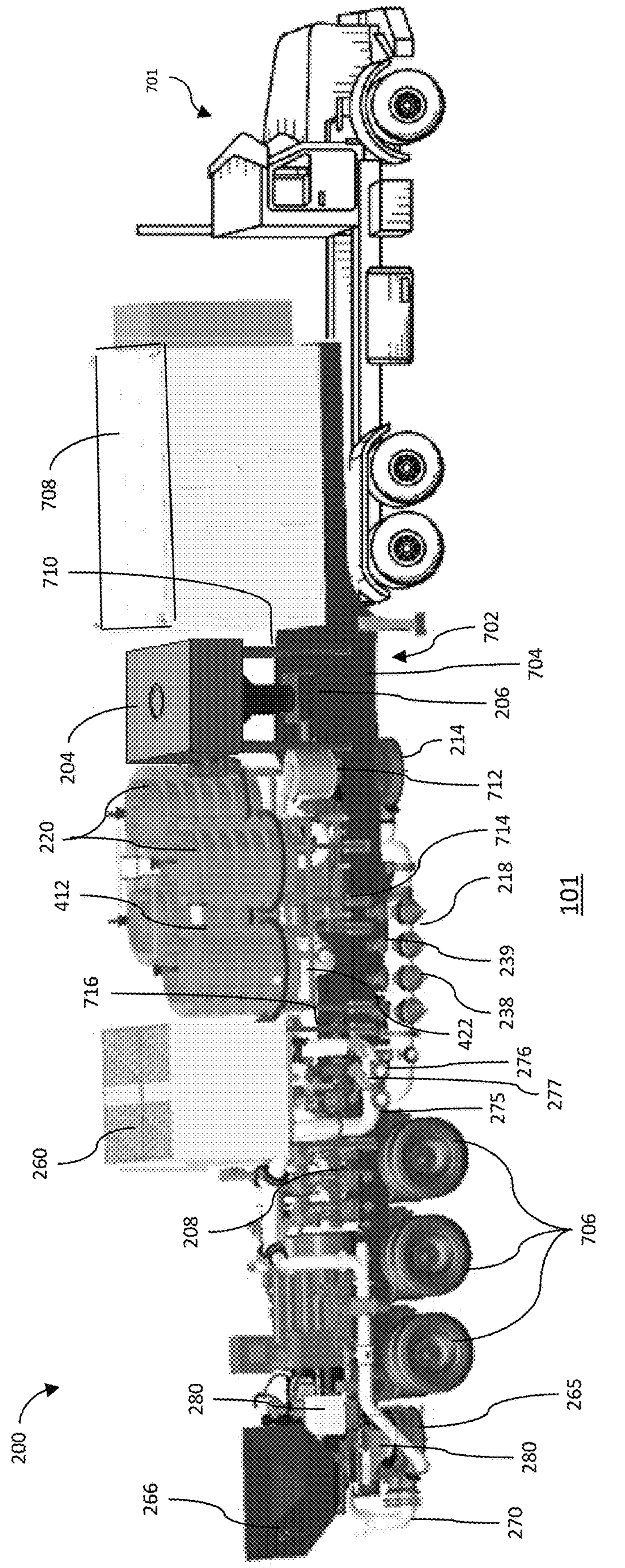
FIG. 17 is a perspective view of an example implementation of the apparatus shown in FIGS. 2, 3, and 4 according to one or more aspects of the present disclosure.

FIG. 17 is a perspective view of an example implementation of the mixing unit 200 shown in FIGS. 1-4 and 13 according to one or more aspects of the present disclosure. The mixing unit 200 is depicted in FIG. 17 as being implemented as a mobile mixing unit detachably connected with a prime mover 701. The mixing unit 200 comprises a mobile carrier 702 having a frame 704 and a plurality of wheels 706 rotatably connected to the frame 704 and supporting the frame 704 on the wellsite surface 101. The mobile mixing unit 200 may further comprise a control cabin 708, which may be referred to in the art as an E-house, connected with the frame 704. The control cabin 708 may comprise one or more controllers, such as the controller 510 shown in FIGS. 4 and 8, and which may be operable to monitor and control the mixing unit 200 as described above.

The hydratable material container 204 is depicted in FIG. 17 as being implemented as a hopper or bin operable to receive hydratable material therein. The hydratable material container 204 is connected to the frame 704 by, for example, a plurality of support members 710.

The mixing unit 200 further comprises the first mixer 214 and the hydratable material transfer device 206, such as a screw feeder and/or other device operable to meter the hydratable material into the first mixer 214. The first mixer 214 is connected with the frame 704 and comprises a motor 712 operable to drive the first mixer 214. The first mixer 214 may be or comprise the solid-fluid first mixer 214 as depicted in FIG. 5 or another mixer operable to mix or blend hydrating fluid with hydratable material. The hydrating fluid may be supplied to the first mixer 214 from the hydrating fluid source 218, which is depicted in FIG. 13 as being implemented as a manifold operable to receive hydrating fluid via the ports 249. Each of the ports 249 may comprise a valve 239, such as may be operable to control the flow of hydrating fluid into the hydrating fluid source 218.

After the hydratable material and hydrating fluid are blended within the first mixer 214 to form the concentrated first fluid mixture, the concentrated first fluid mixture may be communicated into and through one or more instances of the first container 220. The first container 220 is depicted in FIG. 13 as being implemented as four enclosed hydrating containers each comprising a substantially continuous flow pathway extending therethrough, such as the example implementation depicted in FIG. 6. Thus, each first container 220 may comprise first and second ports 412, 422 operable to receive or discharge the concentrated first fluid mixture into or from each first container 220. Each first container 220 may be connected to the frame 704 by, for example, a plurality of support members 714.

After the concentrated first fluid mixture is passed through the first containers 220, the concentrated first fluid mixture may be communicated into the second container 260, which is depicted in FIG. 17 as being implemented as a header tank. The second container 260 may be connected to the frame 704 by, for example, a plurality of support members 716.

Prior to being introduced into the second container 260, additional hydrating fluid may be combined with or added to the concentrated first fluid mixture via the diluter 230 (obscured from view in FIG. 13). The hydrating fluid may be transferred from the hydrating fluid source 218 to the diluter 230 by the pump (obscured from view in FIG. 13). The hydrating fluid and the concentrated first fluid mixture may be combined within the diluter 230 to form the first diluted fluid mixture, as described above, and communicated into the second container 260.

The diluted first fluid mixture may be discharged from the second container 260 and introduced into the second mixers 265 via a supply conduit 270. The particulate material may be introduced to the second mixers 265 via the solid material receiving portion 266, and the solid additives may be introduced to the second mixers 265 via the additional solid material receiving portions 280.

FIG. 17 also depicts the liquid injection system 208, which may be utilized to introduce the liquid additives to the diluted first fluid mixture or the second fluid mixture. As the diluted first fluid mixture, the solid additives, the liquid additives, and the particulate material are substantially continuously mixed within the second mixers 265, the second fluid mixture is substantially continuously transferred to the discharge manifold 275. When the valves 277 open, the second fluid mixture may be discharged from the discharge manifold 275 via the ports 276. The wellsite system 100 may also comprise at least one bulk liquid chemicals storage container, such as may be operable to gravity feed liquid chemicals to the liquid injection system 208 via a hose assembly.

FIG. 17 also depicts the power source 195 described above, such as may be operable to provide centralized electric power distribution to the mixing unit 200 and/or other components of the wellsite system 100. Utilizing the centralized electric power source 195 at the wellsite to drive one or more pieces of backside process equipment of the wellsite system 100 may make the mixing unit components power agnostic, whether an onsite diesel generator is being utilized or the power is obtained from the area power distribution network. It is to be noted that the centralized power may also be hydraulic. Utilization of centralized power may aid in increasing overall system reliability, whereas utilizing individual prime movers (e.g., diesel engines) on each piece of equipment may adversely affect system reliability, increase environment footprint, increase maintenance cost, and/or limit equipment capabilities.

The mixing unit 200 may be an intelligent piece of process equipment comprising the metering, mixing, and blending functions that may utilize precision control, calibration, and specialized machinery to deliver the fracturing fluid. Peripheral equipment, such as the bulk containers (i.e., bulk containers 102), may be kept basic for storage and gravity feed, utilizing minimal supervision and controls. The mixing unit 200 may also comprise a motor control center within or adjacent the control cabin 708, which may control the electric motors driving the mixers (i.e., first and second mixers 214, 265) and metering equipment (i.e., material transfer devices 206, 267, 281), on the mixing unit 200.

The example mobile implementation of the mixing unit 200 depicted in FIG. 17 combines gel mixing and solids blending on a single frame or chassis (i.e., frame 704). Such integration may aid in providing process piping standardization, a reduced footprint, improved reliability, reduced health, safety, and environment (HSE) exposure, and/or improved controllability. The mixing unit 200 may serve as a standardized backside manifold, and may be the one wet piece of process equipment on location where the gel mixing, solids blending, and the liquid and dry additives metering takes place.

The mixing unit 200 may also reduce duplication of pumps (i.e., hydrating fluid pump 260, metering pump 261) to transfer fluids from one piece of equipment to another. For example, the first mixer 214 may be utilized as to transfer the hydrating fluid from the bulk containers 150 to the mixing unit 200, the metering pump 241 may transfer the first mixture from the first containers 220 to the second container 260, and the hydrating fluid pump 240 may transfer the hydrating fluid from the bulk containers 150 to the second container 260. Duplication of suction and discharge manifolds may thus be reduced.

The mixing unit 200 may further comprise built-in system redundancies. For example, the first mixer 214 may serve as a backup to a failed external hydrating fluid transfer pump.

The mixing unit 200 may also combine multiple instances of liquid injection systems 208 in a single unit. The mixing unit 200 may deliver chemistry processes for heterogeneous proppant and/or fiber pulsing techniques where, in addition to proppant pulsing, gel concentration may be pulsed or slick water pumped with certain additives, on one side of the second mixer 265, may be combined with cross linked gel, pumped on the other side of the second mixer 265, to generate heterogeneous fluid at the discharge.

The mixing unit 200 may include at least one low volume solids-liquid mixing system, which may utilize certain hydration time, and at least one high volume solids-liquid mixing system, which may be executed one after the other or independently and delivered to the discharge piping either separately or together. The low volume solids-liquid mixing system may have an option of using multiple types of solids simultaneously. Similarly, a high volume solids-liquid mixing system may blend multiple solids simultaneously. The mixing unit 200 may include a storage capacity for low volume solids and/or liquids utilized for preparing the fracturing fluid.

The mixing unit 200 may be operable for multiple different job types, such as a slick water dirty job, a slick water split-stream job, a cross-link job, and a hybrid job. For example, the mixing unit 200 may be utilized in slick water jobs that, instead of gel, utilize water with multiple additives at a high rate. In dirty operations, the water may be transferred into the second container 260, and the flow control device 250 may be a proportional flow control valve utilized to control the flow rate of water into the second container 260 to match the flow rate into one or both of the second mixers 265. The fluid level within the second container 260 may be maintained, and a control loop may be utilized to fine tune the proportional control valve to make up the difference in level from a target value to an actual value. A suitable feedback or control loop may be utilized, such as PID control loop.

Such control may also be utilized for split-stream operation (SSO) jobs. However, less than 100% of the flow may be communicated through the second mixers 265. For example, a predetermined split between clean to dirty, such as 60:40, may be utilized. The hydrating fluid pump 260 may also discharge water into the discharge manifold 275 directly. Valving may ensure that the clean and dirty operations are not mixed unless intended. The gel forming components may be entirely shut off and not utilized. However, in the event of transfer pump failure, the first mixer 214 may instead be utilized as a redundancy.

During crosslink jobs, the gel forming components may be activated. The concentrated first fluid mixture being metered by the metering pump 261 may be displaced into a location downstream. The resulting flow dynamics may permit homogenous mixing of the two fluids, and the diluted first fluid mixture may be communicated into the second container 260. The downstream process may remain the same. For controls, the suction flow rate of the first mixer 214 may be utilized to meter the guar or other hydratable material into the first mixer 214 to achieve a selected concentration. The ratio of corresponding flows may be kept fixed to achieve the selected concentration of the diluted first fluid mixture communicated into the second container 260. The flow rate downstream of the second container 260 may be utilized as a target for the total flow rate into the second container 260. This may aid in maintaining a substantially constant level inside the second container 260 under steady state. However, due to transients, the level inside the second container 260 may drop or rise from an optimal level. Thus, a control loop may be utilized to achieve a proper rate at the inlet of the second container 260.

In the event of a failure of a major component, such as the pump 240, the conduits associated with the first mixer 214 may be configured to permit fluid (e.g., water or other hydrating fluid) to be displaced directly into the second container 260, thus bypassing the first containers 220 and the pump 241, such as to permit the well to be flushed. Another system backup may regard failure of the pump 241, in which case the pump 241 may be bypassed and the flow control device 245 may be utilized to meter the first fluid mixture. If operation of the first mixer 214 is stopped, the pump 241 may enter recirculation with the first containers 220, such as to maintain motion of the entire volume. If suction of the first mixer 214 is found to be insufficient in terms of suction from the bulk containers 150, the discharge of the pump 240 may also be utilized to boost the suction side of the first mixer 214, such as may provide a net positive suction head.

Figure 18:
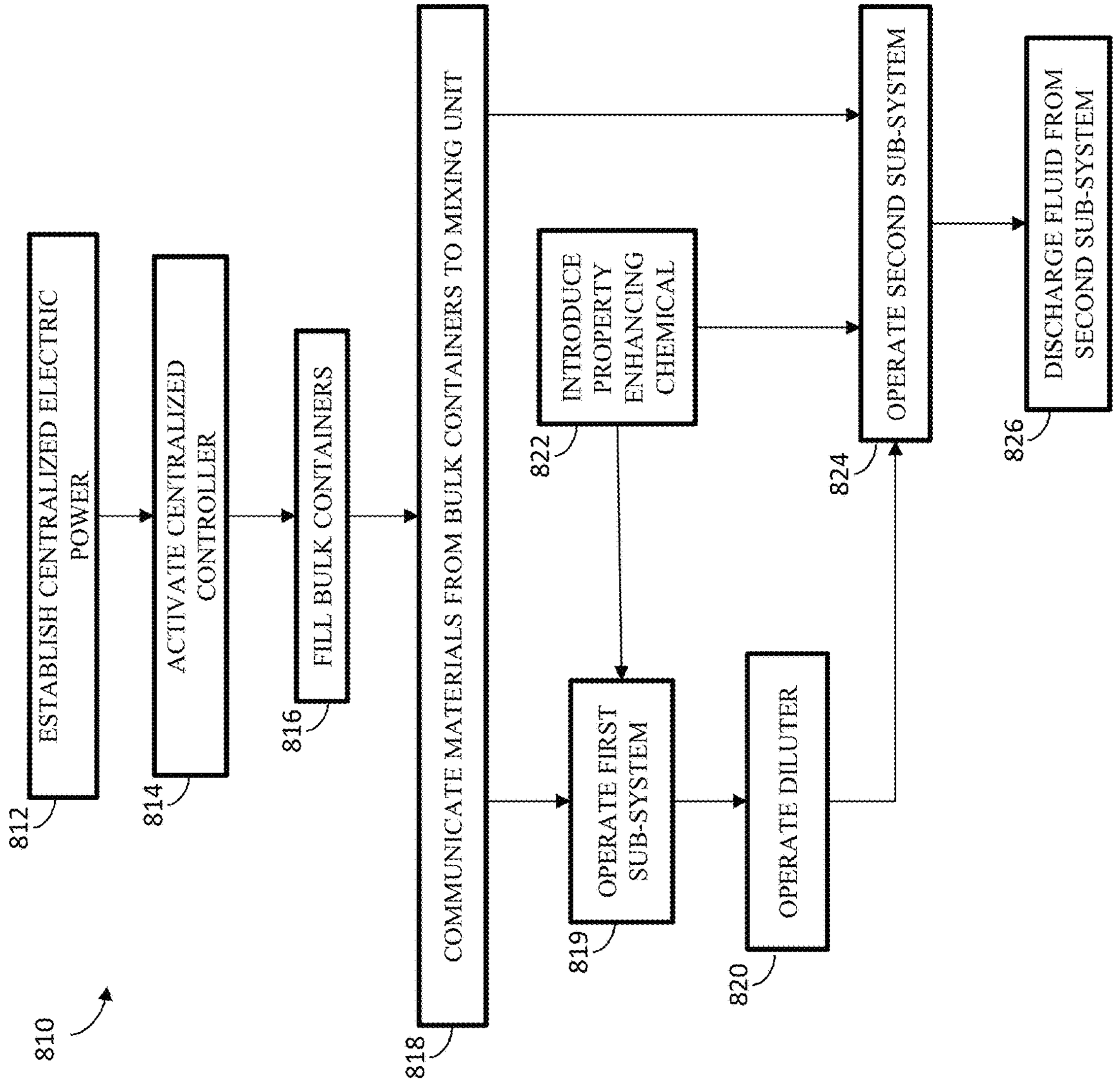
FIG. 18 is a flow-chart diagram of at least a portion of an example implementation of a method according to one or more aspects of the present disclosure.

FIG. 18 is a flow-chart diagram of at least a portion of an example implementation of a method (810) according to one or more aspects of the present disclosure. The method (810) may be performed utilizing at least a portion of one or more implementations of the apparatus shown in one or more of FIGS. 1-17 and/or other apparatus within the scope of the present disclosure.

The method (810) comprises establishing (812) centralized electric power at a wellsite. For example, establishing (812) centralized electric power may comprise installing and/or activating the centralized power source 195 described above, such as by connecting with a local electrical grid, starting a gen-set, and/or otherwise. The centralized electric power may be established (812) to drive one or more components of the mixing unit 200 shown in one or more of FIGS. 1-4, 8, 13, and 17, one or more components of the mobile transfer unit 720 shown in FIGS. 15 and 16, and/or other equipment shown in FIGS. 1 and/or 13.

The method (810) also comprises activating (814) a centralized controller. For example, the centralized controller may be the controller 510 described above. The centralized controller may be part of a centralized motor control house integrated to one or more pieces of equipment to distribute power and control material handling, fluid handling, mixing, metering, blending, conditioning, and/or transferring functions utilized to prepare fracturing fluid at the wellsite. For example, the centralized motor control house may be the control cabin 708 described above. The centralized controller may be or comprise a local control system, such as the controller 510 and/or other controllers implemented on or more components at the wellsite, that may interface with prime movers, power supply components, valves, actuators, process monitoring systems, sensors, and/or other components, and that may provide setpoints and system level job parameters.

The method (810) also comprises filling (816) bulk containers at the wellsite. For example, the bulk containers may include one or more of the containers 110, 120, 130, 140, and filling (816) the containers may include operating one or more of the transfer mechanisms 162, 172, 182, 192 described above.

The method (810) also comprises communicating (818) materials from one or more of the bulk containers to a mixing unit. For example, the mixing unit may be the mixing unit 200 described above, and communicating (818) materials to the mixing unit 200 may include operating one or more of the transfer mechanisms 112, 122, 132, 142 described above. The communicating (818) may include splitting an incoming fluid medium, such as from the one or more inlets 218, into at least two sub-systems of the mixing unit, such as the rheology control portion 202 and the high-volume solids blending portion 210 of the mixing unit 200.

The method (810) also comprises operating (819) a first sub-system of the mixing unit. For example, the first sub-system may be the solids dispersing and/or mixing system 214 and/or other component of the rheology control portion 202 of the mixing unit 200. Such operation (819) may, for example, create a substantially continuous stream or other quantity of a gel, such as the concentrated first fluid mixture described above. Operating (819) the first sub-system may include performing a rheology modifying process that may result in a fluid mixture having a higher concentration of certain compositional components (e.g., guar or other hydratable material) than the final downhole concentration intended to be utilized.

The method (810) also comprises operating (824) a second sub-system of the mixing unit. An input to the second sub-system may include the discharge from the first sub-system. For example, the second sub-system may be one or more of the solids blending systems 265 and/or other component of the high-volume solids blending portion 210 of the mixing unit 200. Such operation (824) may, for example, create a substantially continuous stream or other quantity of a fracturing fluid, such as the second fluid mixture described above. Operating (824) the second sub-system may include feeding the discharge from the operation (819) of the first sub-system to the second sub-system where a second set of rheology modifying solids may be metered in using conventional methods and/or high-volume solids (e.g., proppant and/or other particulate materials) may be introduced by gravity feed from silos or other containers, such as the bulk containers 130 and/or 140.

The method (810) also comprises discharging (826) fluid from the second sub-system of the mixing unit. For example, such discharge (826) may comprise one or more substantially continuous streams or other quantities of a fracturing fluid and/or other fluid mixtures through one or more outlets 275 of the mixing unit 200.

The method (810) may also comprise operating (820) a diluter to dilute the concentration of the fluid discharged from the first subs-system. However, operating (820) the diluter may form part of the operation (819) of the first sub-system. The diluter may be the diluter 230 described above. Operating (820) the diluter may include a process of diluting, on the fly, a rheology-modified fluid obtained by operating (819) the first sub-system, to obtain a fluid near final concentration.

The method (810) may also comprise introducing (822) one or more property enhancing chemicals into the input materials or discharge fluids of operating (819) the first sub-system and/or operating (824) the second sub-system. For example, such introduction (822) may be via operation of the liquid metering systems 208 described above.

Figure 19:
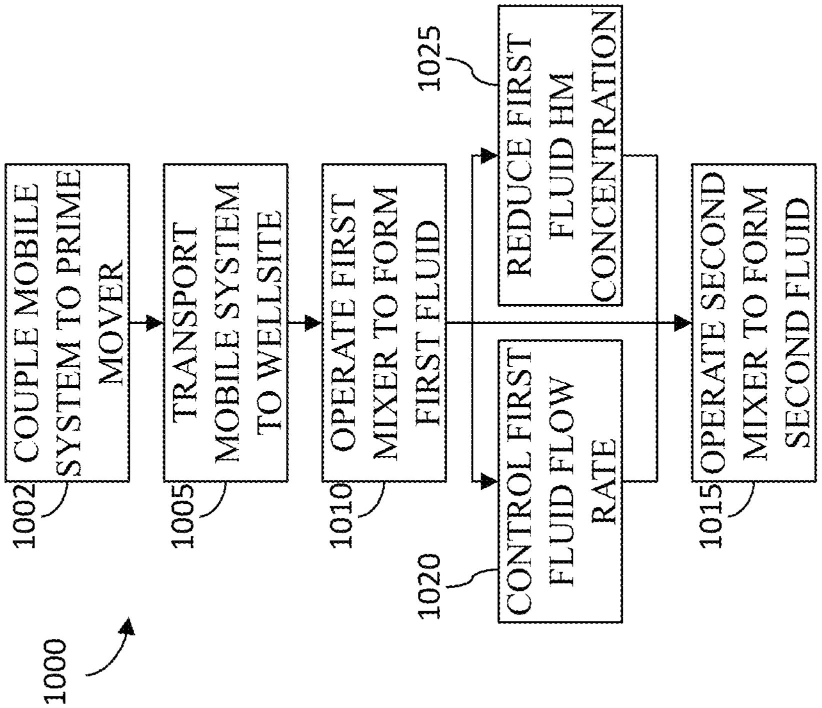
FIG. 19 is a flow-chart diagram of at least a portion of an example implementation of a method according to one or more aspects of the present disclosure.

FIG. 19 is a flow-chart diagram of at least a portion of an example implementation of a method (1000) according to one or more aspects of the present disclosure. The method (1000) may be performed utilizing at least a portion of one or more implementations of the apparatus shown in one or more of FIGS. 1-17 and/or other apparatus within the scope of the present disclosure. One or more aspects of implementations of the method (1000) shown in FIG. 19 may be substantially similar to one or more aspects of implementations of the method (810) shown in FIG. 18. One or more aspects of the method (810) shown in FIG. 18 may be substantially the same as corresponding aspects of the method (1000) shown in FIG. 19. One or more aspects of the method (810) shown in FIG. 18 may be combined with one or more aspects of the method (1000) shown in FIG. 19 in various additional methods within the scope of the present disclosure.

The method (1000) comprises transporting (1005) a mobile system over ground to a wellsite. The mobile system may be or comprise the mobile mixing unit 200 shown in FIG. 17, and/or other systems within the scope of the present disclosure. The method (1000) may further comprise coupling (1002) the mobile system with the prime mover 701 prior to moving (1005) the mobile system to the wellsite.

After moving (1005) the mobile system to the wellsite, the first mixer 214 is operated (1010) to mix hydratable material and hydrating fluid to form a first fluid communicated through one or more instances of the first container 220 and/or the buffer tank 260. The first fluid may be the concentrated first fluid mixture or the diluted first fluid mixture described above. The second mixer 265 is also operated (1015) to mix particulate material and the first fluid discharged from the containers 220 and/or the buffer tank 260 to form a second fluid at least partially forming a subterranean formation fracturing fluid. The second fluid may be the second fluid mixture described above.

As described above, operating (1010) the first mixer 214 may comprise operating the first mixer 214 to mix substantially continuous supplies of the hydratable material and the hydrating fluid to form a substantially continuous supply of the first fluid. The substantially continuous supply of the first fluid may be substantially continuously conveyed from the first mixer 214 to the second mixer 265 through the containers 220 and/or the buffer tank 260. Operating (1015) the second mixer 265 may comprise operating the second mixer 265 to mix a substantially continuous supply of the particulate material with the substantially continuous supply of the first fluid discharged from the containers 220 and/or the buffer tank 260 to form a substantially continuous supply of the second fluid.

The method (1000) may further comprise controlling (1020) a flow rate of the first fluid from the containers 220 and/or the buffer tank 260 to the second mixer 265. Controlling (1020) the flow rate of the first fluid may comprise controlling the pump 241 and/or another pump in fluid communication between the second mixer 265 and one or more of the containers 220 and/or the buffer tank 260.

The method (1000) may further comprise reducing (1025) a concentration of the hydratable material in the first fluid received by the second mixer 265. Such reduction (1025) may comprise operating the pump 240 to add aqueous fluid to the first fluid discharged from the first container(s) 220, operating the pump 240 to adjust a flow rate of the aqueous fluid added to the first fluid, operating the valve 250 to adjust the flow rate of the aqueous fluid added to the first fluid, operating the pump 241 to adjust a flow rate of the first fluid from the containers 220 and/or the buffer tank 260 to the second mixer 265, operating the valve 245 to adjust the flow rate of the first fluid from the containers 220 and/or the buffer tank 260 to the second mixer 265, or a combination thereof.

Figure 20:
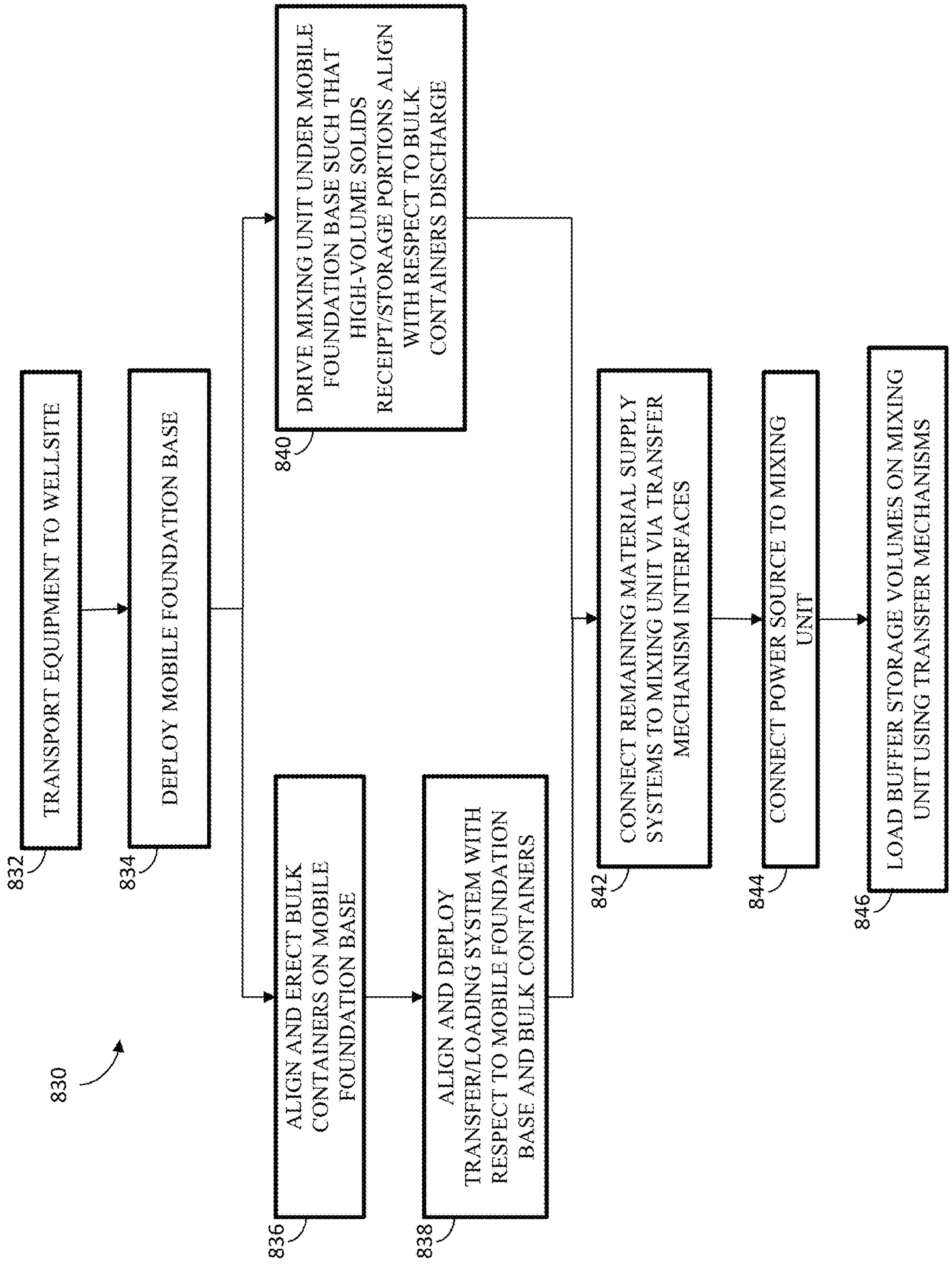
FIG. 20 is a flow-chart diagram of at least a portion of an example implementation of a method according to one or more aspects of the present disclosure.

FIG. 20 is a flow-chart diagram of at least a portion of an example implementation of a method (830) according to one or more aspects of the present disclosure. The method (830) may be performed utilizing at least a portion of one or more implementations of the apparatus shown in one or more of FIGS. 1-17 and/or other apparatus within the scope of the present disclosure.

The method (830) comprises transporting (832) equipment to a wellsite. For example, the transported (832) equipment may include the support structure 760 shown in FIG. 14, the mobile transfer unit 720 shown in FIGS. 15 and 16, the bulk containers 130, 140 shown in FIG. 16, the mobile mixing unit 200 shown in FIG. 17, and other equipment shown in FIGS. 1 and/or 13.

The method (830) also comprises deploying (834) a mobile foundation base at the wellsite. For example, the mobile foundation base may be the support structure 760 shown in FIG. 14.

The method (830) also comprises erecting (836) silos and/or other vertical bulk containers on the deployed (834) mobile foundation base. For example, the erected (836) containers may be the bulk containers 130, 140 shown in FIG. 16. Erecting (836) the containers may also include aligning the containers with the mobile foundation base, such as via the alignment features described above with respect to the support structure 760 shown in FIG. 14.

The method (830) also comprises deploying (838) a transfer/loading system with respect to the deployed (834) mobile foundation base and the erected (836) bulk containers. For example, the transfer/loading system may be the mobile transfer unit 720 shown in FIGS. 15 and 16. Deploying (838) the transfer/loading system may also include aligning the transfer/loading system with the mobile foundation base, such as via the alignment features described above with respect to the support structure 760 shown in FIG. 14.

The method (830) also comprises driving (840) a mixing unit under the deployed (834) mobile foundation base such that receipt/storage portions of the mobile mixing unit align with respect to discharge locations of the erected (836) bulk containers. The mobile mixing unit may be the mobile mixing unit 200 shown in FIG. 17, such that driving (840) the mixing unit may entail operating the prime mover 701. Driving (840) the mixing unit under the deployed (834) mobile foundation base may be performed before, during, or after erecting (836) the bulk containers and/or deploying (838) the transfer/loading system.

The method (830) also comprises connecting (842) other material supply systems to the mixing unit via the various transfer mechanisms described above. Such connection (842) may include connecting the transfer mechanism 112 between the bulk container 110 and the mixing unit 200, connecting the transfer mechanism 122 between the bulk container 120 and the mixing unit 200, connecting the transfer mechanism 132 between the bulk container 130 and the mixing unit 200, and/or connecting the transfer mechanism 142 between the bulk container 140 and the mixing unit 200, unless the bulk containers were among those previously erected (836).

The method (830) also comprises connecting (844) a power source to the mixing unit. For example, the power source may be the centralized power source 195 described above.

The method (830) also comprises loading (846) buffer storage volumes on the mixing unit using the associated transfer mechanisms. For example, such loading (846) may include loading the solids receiving and/or storage means 204, solids receiving and/or storage means 280, and/or the high-volume solids receiving and/or storage means 266 described above.

Figure 21:
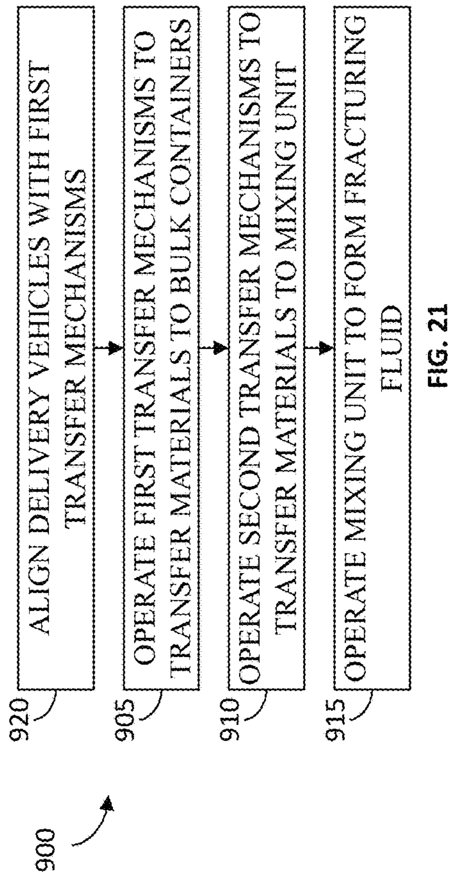
FIG. 21 is a flow-chart diagram of at least a portion of an example implementation of a method according to one or more aspects of the present disclosure.

FIG. 21 is a flow-chart diagram of at least a portion of an example implementation of a method (900) according to one or more aspects of the present disclosure. The method (900) may be performed utilizing at least a portion of one or more implementations of the apparatus shown in one or more of FIGS. 1-17 and/or other apparatus within the scope of the present disclosure. One or more aspects of implementations of the method (900) shown in FIG. 21 may be substantially similar to one or more aspects of implementations of the method (830) shown in FIG. 20. One or more aspects of the method (830) shown in FIG. 20 may be substantially the same as corresponding aspects of the method (900) shown in FIG. 21. One or more aspects of the method (830) shown in FIG. 20 may be combined with one or more aspects of the method (900) shown in FIG. 21 in various additional methods within the scope of the present disclosure.

The method (900) comprises operating (905) one or more of the transfer mechanisms 162, 172, 182, 192 to transfer materials received from corresponding delivery vehicles 160, 170, 180, 190 to the corresponding bulk containers 110, 120, 130, 140. One or more of the transfer mechanisms 112, 122, 132, 142 are also operated (910) to transfer corresponding materials from the corresponding bulk containers 110, 120, 130, 140 to the mixing unit 200. The mixing unit 200 is operated (915) to at least partially form a subterranean formation fracturing fluid utilizing each of the materials received from the transfer mechanisms 112, 122, 132, 142. Operating (910) the transfer mechanisms 112, 122, 132, 142 to transfer the materials from the bulk containers 110, 120, 130, 140 to the mixing unit 200 may comprise operating each of the transfer mechanisms 112, 122, 132, 142 while not operating at least one of the transfer mechanisms 162, 172, 182, 192. The method (900) may further comprise physically aligning (920) each of the delivery vehicles 160, 170, 180, 190 with the corresponding transfer mechanisms 162, 172, 182, 192.

Operating (915) the mixing unit 200 to at least partially form the subterranean formation fracturing fluid utilizing each of the materials received from each of the transfer mechanisms 112, 122, 132, 142 may comprise substantially continuously operating the mixing unit 200 to form a substantially continuous supply at least partially forming the subterranean formation fracturing fluid when not operating at least one of the transfer mechanisms 162, 172, 182, 192.

Figure 22:
FIG. 22 is a flow-chart diagram of at least a portion of an example implementation of a method according to one or more aspects of the present disclosure.

FIG. 22 is a flow-chart diagram of at least a portion of an example implementation of a method (930) according to one or more aspects of the present disclosure. The method (930) may be performed utilizing at least a portion of one or more implementations of the apparatus shown in one or more of FIGS. 1-17 and/or other apparatus within the scope of the present disclosure.

The method (930) comprises operating (935) the controller 510 of the mixing unit 200 to enter a hydratable material concentration setpoint of a first fluid. The first fluid may be the concentrated first fluid mixture or the diluted first fluid mixture described above, such as may be discharged by the first mixer 214, the first container(s) 220, the diluter 230, or the second container 260. The controller 510 is also operated (940) to enter a proppant material concentration setpoint of a second fluid at least partially forming a subterranean formation fracturing fluid. The second fluid may be the second fluid mixture described above, such as may be discharged by the second mixer 265 or the mixing unit 200 as a whole. The controller 510 is then operated (945) to commence operation of the mixing unit 200 to form a substantially continuous supply of the second fluid having the proppant material concentration.

Operating (945) the controller 510 to commence operation of the mixing unit 200 may cause the controller 510 to control a rate at which the hydratable material transfer device 206 and/or another metering device meters the hydratable material into the first mixer 214 based on the hydratable material concentration setpoint. Operating (945) the controller 510 to commence operation of the mixing unit 200 may also or instead cause the controller 510 to control a rate at which 281 the particulate material metering device 267 and/or another metering device meters the proppant material into the second mixer 265 based on the proppant material concentration setpoint.

The method (930) may further comprise operating (950) the controller 510 to enter a diluted hydratable material concentration setpoint. In such implementations, operating (945) the controller 510 to commence operation of the mixing unit 200 may cause the controller 510 to, based on the diluted hydratable material concentration setpoint, control corresponding flow control devices to control a flow rate of the first fluid to the second mixer 265, to form the first fluid having the diluted hydratable material concentration, and/or to control a flow rate of a diluting fluid that is combined with the first fluid before the first fluid is received by the second mixer 265, to form the first fluid having the diluted hydratable material concentration.

The method (930) may further comprise operating (955) the controller 510 to enter a liquid additive concentration setpoint of the second fluid. In such implementations, operating (945) the controller 510 to commence operation of the mixing unit 200 may cause the controller 510 to, based on the liquid additive concentration setpoint, control a rate at which a liquid additive is added to one of the first and second fluids to form the first or second fluid having the liquid additive concentration.

The method (930) may further comprise operating (960) the controller 510 to enter a solid additive concentration setpoint of the second fluid. In such implementations, operating (945) the controller 510 to commence operation of the mixing unit 200 may cause the controller 510 to, based on the solid additive concentration setpoint, control a rate at which a metering device meters a solid additive into the second mixer 265 to form the second fluid having the solid additive concentration.

Operating (945) the controller 510 to commence operation of the mixing unit 200 may also cause the controller 510 to control the various flow control devices to control the flow of the hydrating fluid, the first fluid, and the second fluid based on at least one of the hydrating material concentration setpoint and the proppant material concentration setpoint. Operating (945) the controller 510 to commence operation of the mixing unit 200 may also cause the controller 510 to control the various metering devices to meter the hydratable material and the proppant material based on at least one of the hydrating material concentration setpoint and the proppant material concentration setpoint. As also described above, the mixing unit 200 may comprise various sensors in communication with the controller 510 and operable to generate information related to flow rates of the hydrating fluid, the hydratable material, the first fluid, the proppant material, and the second fluid. In such implementations, the controller 510 may be operable to control the various flow control and metering devices based on the generated information.

In view of the entirety of the present disclosure, including the claims and the figures, a person having ordinary skill in the art should readily recognize that the present disclosure introduces an apparatus comprising: a mobile system comprising: a frame; a plurality of wheels operatively connected with and supporting the frame on the ground; a first mixer connected with the frame and operable to receive and mix hydratable material and hydrating fluid to form a first fluid; a container connected with the frame and comprising a flowpath traversed by the first fluid for a period of time sufficient to permit viscosity of the first fluid to increase to a predetermined level; and a second mixer connected with the frame and operable to mix particulate material and the first fluid discharged from the container to form a second fluid at least partially forming a subterranean formation fracturing fluid.

The first mixer may be operable to substantially continuously form the first fluid, the container may be operable to substantially continuously convey the first fluid between the first and second mixers, and the second mixer may be operable to substantially continuously form the second fluid.

The first mixer may be operable to: receive a substantially continuous supply of the hydratable material; receive a substantially continuous supply of the hydrating fluid; and substantially continuously mix the substantially continuous supply of the hydratable material and the substantially continuous supply of the hydrating fluid to form a substantially continuous supply of the first fluid. In such implementations, the substantially continuous supply of the first fluid may be substantially continuously conducted through the flowpath of the container; and the second mixer may be operable to: receive a substantially continuous supply of the particulate material; receive the substantially continuous supply of the first fluid from the container; and substantially continuously mix the substantially continuous supply of the particulate material and the substantially continuous supply of the first fluid discharged from the container to form a substantially continuous supply of the second fluid.

The mobile system may further comprise a fluid junction between the container and the second mixer and operable to add aqueous fluid to the first fluid discharged from the container. The fluid junction may comprise: a first passage operable to receive the aqueous fluid; a second fluid passage operable to receive the first fluid discharged from the container; and a third passage operable to communicate both the aqueous fluid and the first fluid discharged from the container. The hydrating fluid and the aqueous fluid may be the same and may be received by the first mixer and the fluid junction from a single source. The mobile system may further comprise at least one of: a first flow control device operable to control a first flow rate of the first fluid discharged from the container to the fluid junction; and a second flow control device operable to control a second flow rate of the aqueous fluid to the fluid junction. At least one of the first and second flow control devices may comprise a flow control valve. At least one of the first and second flow control devices may comprise a pump.

The container may be a first container, the mobile system may further comprise a second container fluidly coupled between the first container and the second mixer, the second container may receive the first fluid discharged from the first container, and the second mixer may be operable to receive the first fluid from the second container.

The hydratable material may substantially comprise guar. The hydratable material may substantially comprise a polymer, a synthetic polymer, a galactomannan, a polysaccharide, a cellulose, a clay, or a combination thereof. The hydrating fluid may substantially comprise water. The particulate material may comprise a proppant material. The proppant material may comprise one or more of sand, sand-like particles, silica, and quartz. The particulate material may further comprise a fibrous material. The fibrous material may comprise one or more of fiberglass, phenol formaldehyde, polyester, polylactic acid, cedar bark, shredded cane stalks, mineral fiber, and hair.

The container may be a first-in-first-out continuous fluid container.

The mobile system may be operable for connection with a prime mover.

The present disclosure also introduces a method comprising: moving a mobile system over ground to a wellsite, wherein the mobile system comprises: a frame; a plurality of wheels operatively connected with and supporting the frame on the ground; a first mixer connected with the frame; a container connected with the frame and in fluid communication with the first mixer; and a second mixer connected with the frame and in fluid communication with the container; operating the first mixer to mix hydratable material and hydrating fluid to form a first fluid communicated through the container; and operating the second mixer to mix particulate material and the first fluid discharged from the container to form a second fluid at least partially forming a subterranean formation fracturing fluid.

Operating the first mixer may comprise operating the first mixer to mix substantially continuous supplies of the hydratable material and the hydrating fluid to form a substantially continuous supply of the first fluid. The substantially continuous supply of the first fluid may be substantially continuously conveyed from the first mixer to the second mixer through the container. Operating the second mixer may comprise operating the second mixer to mix a substantially continuous supply of the particulate material with the substantially continuous supply of the first fluid discharged from the container to form a substantially continuous supply of the second fluid.

The container may internally conduct the first fluid for a period of time sufficient to permit viscosity of the first fluid to increase to a predetermined level.

Operating the first mixer may sufficiently pressurize the first fluid to cause the first fluid to be communicated through the container.

The method may further comprise controlling a flow rate of the first fluid from the container to the second mixer. Controlling the flow rate of the first fluid may comprise controlling a pump in fluid communication between the container and the second mixer.

The mobile system may further comprise a pump, and the method may further comprise operating the pump to add aqueous fluid to the first fluid discharged from the container to reduce a concentration of the hydratable material in the first fluid received by the second mixer. The pump may be a first pump, and the method may further comprise at least one of: operating the first pump to adjust a first flow rate of the aqueous fluid added to the first fluid; operating a first valve downstream of the first pump to adjust the first flow rate; operating a second pump in fluid communication between the container and the second mixer to adjust a second flow rate of the first fluid from the container to the second mixer; and operating a second valve downstream of the second pump to adjust the second flow rate.

The container may be a first container, the mobile system may further comprise a second container in fluid communication between the container and the second mixer, operating the first mixer to form the first fluid communicated through the first container may communicate the first fluid through the first container to the second container, and the first fluid mixed with the particulate material by the second mixer may be obtained from the second container. In such implementations, the mobile system may further comprise a pump, and the method may further comprise operating the pump to add aqueous fluid to the first fluid discharged from the first container and received by the second container.

The method may further comprise coupling the mobile system with a prime mover.

The present disclosure also introduces an apparatus comprising: a wellsite system for utilization in a subterranean fracturing operation, wherein the wellsite system comprises: a plurality of containers; a plurality of first transfer mechanisms each operable to transfer a corresponding one of a plurality of materials from a corresponding one of a plurality of delivery vehicles to a corresponding one of the containers; a mixing unit; and a plurality of second transfer mechanisms each operable to transfer a corresponding one of the materials from a corresponding one of the containers to the mixing unit, wherein the mixing unit is operable to mix the materials received from each of the second transfer mechanisms to form a subterranean formation fracturing fluid.

The plurality of materials may comprise hydratable material, liquid additives, solid additives, and proppant material, and the plurality of first transfer mechanisms may comprise: a hydratable material transfer mechanism operable to transfer the hydratable material to a first one of the containers; a liquid additive transfer mechanism operable to transfer the liquid additives to a second one of the containers; a solid additive transfer mechanism operable to transfer the solid additives to a third one of the containers; and a proppant material transfer mechanism operable to transfer the proppant material to a fourth one of the containers. In such implementations, the plurality of second transfer mechanisms may comprise: an additional hydratable material transfer mechanism operable to transfer the hydratable material from the first one of the containers to the mixing unit; an additional liquid additive transfer mechanism operable to transfer the liquid additives from the second one of the containers to the mixing unit; an additional solid additive transfer mechanism operable to transfer the solid additives from the third one of the containers to the mixing unit; and an additional proppant material transfer mechanism operable to transfer the proppant material from the fourth one of the containers to the mixing unit.

The wellsite system may further comprise a material delivery area adjacent the first transfer mechanisms, and the containers may each be physically located between the mixing unit and the material delivery area.

Each of the containers may be operable to receive therein an entire quantity of the corresponding material transported by the corresponding delivery vehicle.

Each of the containers may have a storage capacity that is about equal to or greater than a storage capacity of the corresponding delivery vehicle.

The first transfer mechanisms may be operable to periodically transfer the corresponding materials from the delivery vehicles to the corresponding containers, the second transfer mechanisms may be operable to substantially continuously transfer the corresponding materials from the corresponding containers to the mixing unit, and the mixing unit may be operable to discharge a substantially continuous supply of the fracturing fluid.

The mixing unit may be operable to substantially continuously form the fracturing fluid when one or more of the first transfer mechanisms is not transferring the corresponding one or more of the materials from the corresponding one or more delivery vehicles.

The mixing unit may comprise a mixer and a hopper associated with the mixer, and one of the second transfer mechanisms may be operable to transfer a corresponding one of the materials from a corresponding one of the containers into the hopper.

The plurality of materials may comprise hydratable material and proppant material, the mixing unit may comprise a first mixer and a second mixer, and the plurality of second transfer mechanisms may comprise: a hydratable material transfer mechanism operable to transfer the hydratable material to a first hopper operable to feed the hydratable material to the first mixer; and a proppant material transfer mechanism operable to transfer the proppant material to a second hopper operable to feed the proppant material to the second mixer.

The plurality of materials may comprise hydratable material and proppant material, and the mixing unit may comprise: a frame; a first mixer connected with the frame and operable to mix the hydratable material with a hydrating fluid to form a mixture; and a second mixer connected with the frame and operable to mix the proppant material with the mixture. The mixing unit may further comprise a plurality of wheels operatively connected with and supporting the frame on the ground. The mixing unit may further comprise a hydrating container connected with the frame and in fluid communication between the first and second mixers.

The present disclosure also introduces a method comprising: operating each of a plurality of first transfer mechanisms to transfer a corresponding one of a plurality of materials received from a corresponding one of a plurality of delivery vehicles to a corresponding one of a plurality of containers, wherein each of the plurality of materials has a different composition; operating each of a plurality of second transfer mechanisms to transfer a corresponding one of the plurality of materials from a corresponding one of the plurality of containers to a mixing unit; and operating the mixing unit to at least partially form a subterranean formation fracturing fluid utilizing each of the plurality of materials received from each of the plurality of second transfer mechanisms.

Operating each of the plurality of second transfer mechanisms to transfer a corresponding one of the plurality of materials from a corresponding one of the plurality of containers to the mixing unit may comprise operating each of the plurality of second transfer mechanisms while not operating at least one of the plurality of first transfer mechanisms.

The method may further comprise physically aligning each of the plurality of delivery vehicles with the corresponding one of the plurality of first transfer mechanisms, such as within a contiguous physical area simultaneously accessible by the plurality of delivery vehicles.

The method may further comprise storing an amount of each of the plurality of materials in each corresponding one of the plurality of containers, wherein the amount of each of the plurality of materials stored in each corresponding one of the plurality of containers may be about equal to or greater than a storage capacity of the corresponding one of the plurality of delivery vehicles.

Operating each of the plurality of first transfer mechanisms to transfer the corresponding one of the plurality of materials to the corresponding one of the plurality of containers may comprise periodically operating each of the plurality of first transfer mechanisms to periodically transfer the corresponding one of the plurality of materials to the corresponding one of the plurality of containers. In such implementations, operating each of the plurality of second transfer mechanisms to transfer the corresponding one of the plurality of materials from the corresponding one of the plurality of containers to the mixing unit may comprise substantially continuously operating each of the plurality of second transfer mechanisms to substantially continuously transfer the corresponding one of the plurality of materials from the corresponding one of the plurality of containers to the mixing unit, and operating the mixing unit to at least partially form the subterranean formation fracturing fluid utilizing each of the plurality of materials received from each of the plurality of second transfer mechanisms may comprise substantially continuously operating the mixing unit to form a substantially continuous supply at least partially forming the subterranean formation fracturing fluid.

Operating the mixing unit to at least partially form the subterranean formation fracturing fluid utilizing each of the plurality of materials received from each of the plurality of second transfer mechanisms may comprise substantially continuously operating the mixing unit to form a substantially continuous supply at least partially forming the subterranean formation fracturing fluid when not operating at least one of the plurality of first transfer mechanisms.

The plurality of second transfer mechanisms may comprise a hydratable material transfer mechanism and a proppant material transfer mechanism, and operating the mixing unit to at least partially form the subterranean formation fracturing fluid may comprise: operating a first mixer of the mixing unit to form a mixture comprising hydratable material received from the hydratable material transfer mechanism, wherein the first mixer is connected with a frame; and operating a second mixer of the mixing unit to combine the mixture with proppant material received from the proppant material transfer mechanism, wherein the second mixer is connected with the frame. The second mixer may receive the mixture discharged by the first mixer via a hydrator fluidly connected between the first and second mixers, wherein the hydrator is connected with the frame.

Operating each of the plurality of second transfer mechanisms to transfer the corresponding one of the plurality of materials from the corresponding one of the plurality of containers to the mixing unit may comprise operating at least one of the plurality of second transfer mechanisms to transfer the corresponding one of the plurality of materials from the corresponding one of the plurality of containers to a hopper of the mixing unit.

The plurality of materials may comprise a hydratable material and a proppant material. The plurality of materials may comprise a hydratable material, a proppant material, a liquid additive, and a solid additive.

The present disclosure also introduces an apparatus comprising: a first mixer operable to form a mixture by combining hydratable material and hydrating fluid; a second mixer operable to at least partially form a subterranean formation fracturing fluid by combining the mixture and proppant material; and a controller operable to control: a hydratable material concentration of the mixture; and a proppant material concentration of the subterranean formation fracturing fluid.

The controller may be further operable to control a discharge flow rate of the second mixer.

The apparatus may further comprise a frame to which the first and second mixers are connected. The apparatus may further comprise a control center comprising the controller and connected to the frame. The apparatus may further comprise a hydrator connected to the frame, wherein the mixture may be received by the second mixer via the hydrator.

The apparatus may further comprise: a plurality of flow meters in communication with the controller and operable to generate information related to corresponding flow rates of the hydrating fluid, the mixture, and the subterranean formation fracturing fluid; a plurality of flow control devices in communication with the controller, wherein the controller may be further operable to control the plurality of flow control devices to control the flow rates of the hydrating fluid, the mixture, and the subterranean formation fracturing fluid; and a plurality of metering devices in communication with the controller, wherein the controller may be further operable to control the plurality of metering devices to meter the hydratable material and the proppant material. The controller may be further operable to automatically control the plurality of flow control devices and the plurality of metering devices based on predetermined setpoints for the hydratable material concentration and the proppant material concentration. The controller may be further operable to receive user inputs, wherein the user inputs comprise the predetermined setpoints for the hydratable material concentration and the proppant material concentration.

The apparatus may further comprise: a flow control device in communication with the controller, wherein the controller may be further operable to control the flow control device to control the flow of the hydrating fluid into the first mixer; a flow meter in communication with the controller and operable to generate information related to flow of the hydrating fluid into the first mixer; and a metering device in communication with the controller, wherein controller may be further operable to control the metering device to meter the hydratable material into the first mixer and, thereby, control the hydratable material concentration of the mixture discharged by the first mixer.

The apparatus may further comprise: a diluter operable to dilute the mixture discharged by the first mixer before the mixture is received by the second mixer; at least one flow meter in communication with the controller and operable to generate information related to flow of at least one of the mixture discharged by the first mixer and a diluting fluid added to the mixture by the diluter; and at least one flow control device in communication with the controller and operable to control the flow of the at least one of the mixture discharged by the first mixer and the diluting fluid added to the mixture by the diluter, wherein the controller may be further operable to control the at least one flow control device to control the hydratable material concentration of the diluted mixture discharged by the diluter.

The apparatus may further comprise: a tank for storing the mixture discharged from the first mixer, wherein the second mixer may be operable to receive the mixture from the tank; and a level sensor in communication with the controller and operable to generate information related to the quantity of the mixture within the tank.

The apparatus may further comprise: a flow control device in communication with the controller, wherein controller may be further operable to control the flow control device to control the flow of the mixture into the second mixer; a flow meter in communication with the controller and operable to generate information related to the flow of the mixture into the second mixer; and a metering device in communication with the controller, wherein the controller may be further operable to control the metering device to meter the proppant material into the second mixer and, thereby, control the proppant material concentration of the subterranean formation fracturing fluid.

The apparatus may further comprise a liquid additive injection conduit fluidly connected with a liquid additive source for introducing a liquid additive into at least one of: the mixture received by the second mixer from the first mixer; and the fracturing fluid discharged from the second mixer. The apparatus may further comprise: at least one flow meter in communication with the controller and operable to generate information related to flow of the liquid additive through the liquid additive injection conduit; and at least one flow control device in communication with the controller and operable to control the flow of the liquid additive through the liquid additive injection conduit, wherein the controller may be further operable to control the at least one flow control device to control the flow of the liquid additive through the liquid additive injection conduit.

The apparatus may further comprise: a solid additive transfer mechanism for introducing a solid additive into at least one of: the mixture received by the second mixer from the first mixer; and the fracturing fluid discharged from the second mixer. The apparatus may further comprise at least one flow control device in communication with the controller and operable to control the rate of the introduced solid additive, wherein the controller may be further operable to control the at least one flow control device to control the rate of the introduced solid additive.

The apparatus may further comprise: a plurality of flow control devices in communication with the controller, wherein the controller may be further operable to control the plurality of flow control devices to control the flow of the hydrating fluid, the mixture, and the subterranean formation fracturing fluid; and a plurality of metering devices in communication with the controller, wherein the controller may be further operable to control the plurality of metering devices to meter the hydratable material and the proppant material.

The apparatus may further comprise: a plurality of flow control devices in communication with the controller and operable to control the flow of the hydrating fluid, the mixture, and the subterranean formation fracturing fluid; and a plurality of metering devices in communication with the controller and operable to meter the hydratable material and the proppant material; wherein the controller may be operable to control the hydratable material concentration of the mixture and the proppant material concentration of the subterranean formation fracturing fluid by controlling the plurality of flow control devices, the plurality of metering devices, and the first and second mixers.

The present disclosure also introduces a method comprising: operating a controller of a system to enter a hydratable material concentration setpoint of a first fluid, wherein the system comprises the controller and a first mixer, and wherein the first mixer is operable to mix hydratable material and hydrating fluid to form the first fluid having the hydratable material concentration; operating the controller to enter a proppant material concentration setpoint of a second fluid at least partially forming a subterranean formation fracturing fluid, wherein the system further comprises a second mixer operable to mix proppant material and the first fluid to form the second fluid having the proppant material concentration; and operating the controller to commence operation of the system to form a substantially continuous supply of the second fluid having the proppant material concentration.

Operating the controller to commence operation of the system may cause the controller to control a rate at which a metering device meters the hydratable material into the first mixer based on the hydratable material concentration setpoint.

Operating the controller to commence operation of the system may cause the controller to control a rate at which a metering device meters the proppant material into the second mixer based on the proppant material concentration setpoint.

The method may further comprise operating the controller to enter a diluted hydratable material concentration setpoint, wherein operating the controller to commence operation of the system may cause the controller to control, based on the diluted hydratable material concentration setpoint, a rate at which: a first flow control device controls a first flow rate of the first fluid to the second mixer to form the first fluid having the diluted hydratable material concentration; a second flow control device controls a second flow rate of a diluting fluid combined with the first fluid before the first fluid is received by the second mixer to form the first fluid having the diluted hydratable material concentration; or a combination thereof.

The method may further comprise operating the controller to enter a liquid additive concentration setpoint of the second fluid, wherein operating the controller to commence operation of the system may cause the controller to control, based on the liquid additive concentration setpoint, a rate at which a liquid additive is added to one of the first and second fluids to form the first or second fluid having the liquid additive concentration.

The method may further comprise operating the controller to enter a solid additive concentration setpoint of the second fluid, wherein operating the controller to commence operation of the system may cause the controller to control, based on the solid additive concentration setpoint, a rate at which a metering device meters a solid additive into the second mixer to form the second fluid having the solid additive concentration.

The system may further comprise a plurality of flow control devices in communication with the controller and a plurality of metering devices in communication with the controller, wherein operating the controller to commence operation of the system may cause the controller to control: the plurality of flow control devices to control the flow of the hydrating fluid, the first fluid, and the second fluid based on at least one of the hydrating material concentration setpoint and the proppant material concentration setpoint; and the plurality of metering devices to meter the hydratable material and the proppant material based on at least one of the hydrating material concentration setpoint and the proppant material concentration setpoint. The system may further comprise a plurality of sensors in communication with the controller and operable to generate information related to flow rates of the hydrating fluid, the hydratable material, the first fluid, the proppant material, and the second fluid, and the controller may be operable to control the plurality of flow control devices and the plurality of metering devices based on the generated information.

The present disclosure also introduces an apparatus comprising: a mobile system comprising: a frame; a plurality of wheels operatively connected with and supporting the frame on the ground; a first mixer connected with the frame and operable to receive and mix a hydratable material and a hydrating fluid to form a first fluid; a container connected with the frame and comprising a substantially continuous passageway traversed by a second fluid for a period of time sufficient to permit viscosity of the second fluid to increase to a predetermined level, wherein the second fluid comprises the first fluid; and a second mixer connected with the frame and operable to mix particulate material with a third fluid to form a fourth fluid utilized in a subterranean formation fracturing operation, wherein the third fluid comprises the second fluid discharged from the container.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method, comprising:

operating each of a plurality of first transfer mechanisms to transfer a corresponding material of a plurality of materials received from a corresponding delivery vehicle of a plurality of delivery vehicles to a corresponding container of a plurality of containers at a wellsite, wherein the plurality of delivery vehicles are driven over a corresponding inlet of the plurality of first transfer mechanisms to drop the corresponding material into the corresponding inlet through a chute of the corresponding delivery vehicle, and wherein each of the plurality of materials has a different composition;

operating each of a plurality of second transfer mechanisms to transfer a corresponding material of the plurality of materials from a corresponding container of the plurality of containers to a corresponding mixer of a mixing unit, wherein the plurality of second transfer mechanisms comprises a hydratable material transfer mechanism and a proppant material transfer mechanism; and operating each of the corresponding mixers of the mixing unit to at least partially form a substantially continuous stream of subterranean formation fracturing fluid utilizing each of the plurality of materials received from each of the plurality of second transfer mechanisms by:

operating a first mixer of the mixing unit to form a mixture comprising hydratable material received from the hydratable material transfer mechanism;

discharging the mixture under pressure into and through a hydrating system, wherein the hydrating system comprises at least one container defining a continuous flow channel therein to increase hydration of the hydratable material to a predetermined hydration level while the mixture is being pumped through the at least one container, wherein the first mixer is operable to pressurize the mixture sufficiently to pump the mixture through the container of the hydrating system and wherein the container of the hydrating system comprises a series of spiral stages that define a continuous flow channel; and operating a second mixer of the mixing unit to receive the hydrated mixture from the hydrating system and combine the mixture with proppant material received from the proppant material transfer mechanism.

2. The method of claim 1, wherein the first mixer is connected with a frame, and wherein the second mixer is connected with the frame.

3. The method of claim 2, further comprising, before operating the plurality of first transfer mechanisms, the plurality of second transfer mechanisms, and the mixing unit:

establishing centralized electric power for driving the plurality of first transfer mechanisms, the plurality of second transfer mechanisms, and the mixing unit; and activating a centralized controller operable for distributing electric power and controlling the plurality of first transfer mechanisms, the plurality of second transfer mechanisms, and the mixing unit, wherein operating the plurality of first transfer mechanisms, the plurality of second transfer mechanisms, and the mixing unit comprises operating the centralized controller.

4. The method of claim 3, wherein the centralized controller is part of the mixing unit and connected with the frame.

5. The method of claim 4, wherein operating the centralized controller comprises utilizing feedback signals from at least one of the mixing unit, the mixers of the mixing unit, the plurality of first transfer mechanisms, the plurality of second transfer mechanisms, and the plurality of containers, the feedback signals utilized by the centralized controller for monitoring and/or controlling operation of at least one of the mixing unit, the mixers of the mixing unit, the plurality of first transfer mechanisms, the plurality of second transfer mechanisms, and the plurality of containers.

6. The method of claim 1, further comprising positioning the containers of the delivery vehicles adjacent a corresponding first transfer mechanism of the plurality of first transfer mechanisms.

7. The method of claim 6, wherein positioning comprises physically aligning each of the delivery vehicles with the corresponding first transfer mechanism of the plurality of first transfer mechanisms.

8. The method of claim 1, further comprising:

deploying, prior to operating, a mobile base frame at the wellsite, wherein the mobile base frame comprises an open area extending at least partially therethrough, the mobile base frame separate from the plurality of delivery vehicles and the containers;

erecting, prior to operating, the plurality of containers on the mobile base frame; and transporting, prior to operating, the mixing unit into the open area such that a material receiving means of the mixing unit align with a gravity-fed discharge from at least one of the containers, wherein the material receiving means receive and direct gravity-fed discharge materials to the first and second mixers.

9. The method of claim 8, further comprising deploying a mobile transfer system in alignment with respect to the mobile base frame and the containers.

10. The method of claim 9, further comprising:

connecting a centralized power source to the mixing unit and the mobile transfer system;

connecting other material transfer devices to the mixing unit; and loading buffer material containers of the mixing unit via operation of the other material transfer devices.

11. The method of claim 1, wherein the at least one continuous fluid flow channel has a length greater than a circumferential length of a corresponding outer wall of the at least one container.

12. The method of claim 1, wherein the spiral stages that define the continuous flow channel minimize a pressure drop of the mixture as the mixture flows through the stages of the container of the hydrating system.

13. A method, comprising:

operating each of a plurality of first transfer mechanisms to transfer a corresponding material of a plurality of materials received from a corresponding delivery vehicle of a plurality of delivery vehicles to a corresponding container of a plurality of containers at a wellsite, wherein the plurality of delivery vehicles are driven over a corresponding inlet of the plurality of first transfer mechanisms to drop the corresponding material into the corresponding inlet through a chute of the corresponding delivery vehicle, and wherein each of the plurality of materials has a different composition;

operating each of a plurality of second transfer mechanisms to substantially continuously transfer a corresponding material of the plurality of materials from a corresponding container of the plurality of containers to a corresponding mixer of a mixing unit, wherein the plurality of second transfer mechanisms comprises a hydratable material transfer mechanism and a proppant material transfer mechanism; and operating each of the corresponding mixers of the mixing unit to at least partially form a substantially continuous stream of subterranean formation fracturing fluid utilizing each of the plurality of materials received from each of the plurality of second transfer mechanisms, wherein operating the mixing unit to at least partially form the substantially continuous stream of subterranean formation fracturing fluid comprises:

operating a first mixer of the mixing unit to form a mixture comprising hydratable material received from the hydratable material transfer mechanism, wherein the first mixer is connected with a frame, wherein the hydrating system is connected with the frame and wherein the first mixer is operable to pressurize the mixture sufficiently to pump the mixture through the container of the hydrating system;

discharging the mixture under pressure into and through a hydrating system, wherein the hydrating system comprises at least one container including a plurality of chambers that each define a substantially continuous spiral flow pathway extending therethrough to increase hydration of the hydratable material to a predetermined hydration level while the mixture is being pumped through the container;

operating a second mixer of the mixing unit to receive the hydrated mixture from the hydrating system and combine the mixture with proppant material received from the proppant material transfer mechanism, wherein the second mixer is connected with the frame; and discharging the substantially continuous stream of subterranean formation fracturing fluid from the mixing unit for further processing and/or injection into a wellbore.

14. The method of claim 13, further comprising, before operating the plurality of first transfer mechanisms, the plurality of second transfer mechanisms, and the mixing unit:

establishing centralized electric power for driving the plurality of first transfer mechanisms, the plurality of second transfer mechanisms, and the mixing unit; and activating a centralized controller operable for distributing electric power and controlling the plurality of first transfer mechanisms, the plurality of second transfer mechanisms, and the mixing unit, wherein operating the plurality of first transfer mechanisms, the plurality of second transfer mechanisms, and the mixing unit comprises operating the centralized controller.

15. The method of claim 14, wherein the centralized controller is part of the mixing unit and connected with the frame.

16. The method of claim 13, further comprising:

deploying, prior to operating, a mobile base frame at the wellsite, wherein the mobile base frame comprises an open area extending at least partially therethrough, the mobile base frame separate from the plurality of delivery vehicles and the containers;

erecting, prior to operating, the plurality of containers on the mobile base frame; and transporting, prior to operating, the mixing unit into the open area such that a material receiving means of the mixing unit align with a gravity-fed discharge from at least one of the containers, wherein the material receiving means receive and direct gravity-fed discharge materials to the first and second mixers.

17. The method of claim 16, further comprising deploying a mobile transfer system in alignment with respect to the mobile base frame and the containers.

18. The method of claim 17, further comprising:

connecting a centralized power source to the mixing unit and the mobile transfer system;

connecting other material transfer devices to the mixing unit; and loading buffer material containers of the mixing unit via operation of the other material transfer devices.

19. The method of claim 13, further comprising positioning the containers of the delivery vehicles adjacent a corresponding first transfer mechanism of the plurality of first transfer mechanisms.

20. The method of claim 19, wherein positioning comprises physically aligning each of the delivery vehicles with the corresponding first transfer mechanism of the plurality of first transfer mechanisms.

21. The method of claim 13, wherein the at least one continuous fluid flow channel has a length greater than a circumferential length of a corresponding outer wall of the at least one container.

22. The method of claim 13, wherein the spiral chambers that define the continuous flow channel minimize a pressure drop of the mixture as the mixture flows through the chambers of the container of the hydrating system.

* * * * *